May 29, 1962 R. R. EVERETT 3,037,192
DATA PROCESSING SYSTEM
Filed Dec. 27, 1957 51 Sheets-Sheet 3

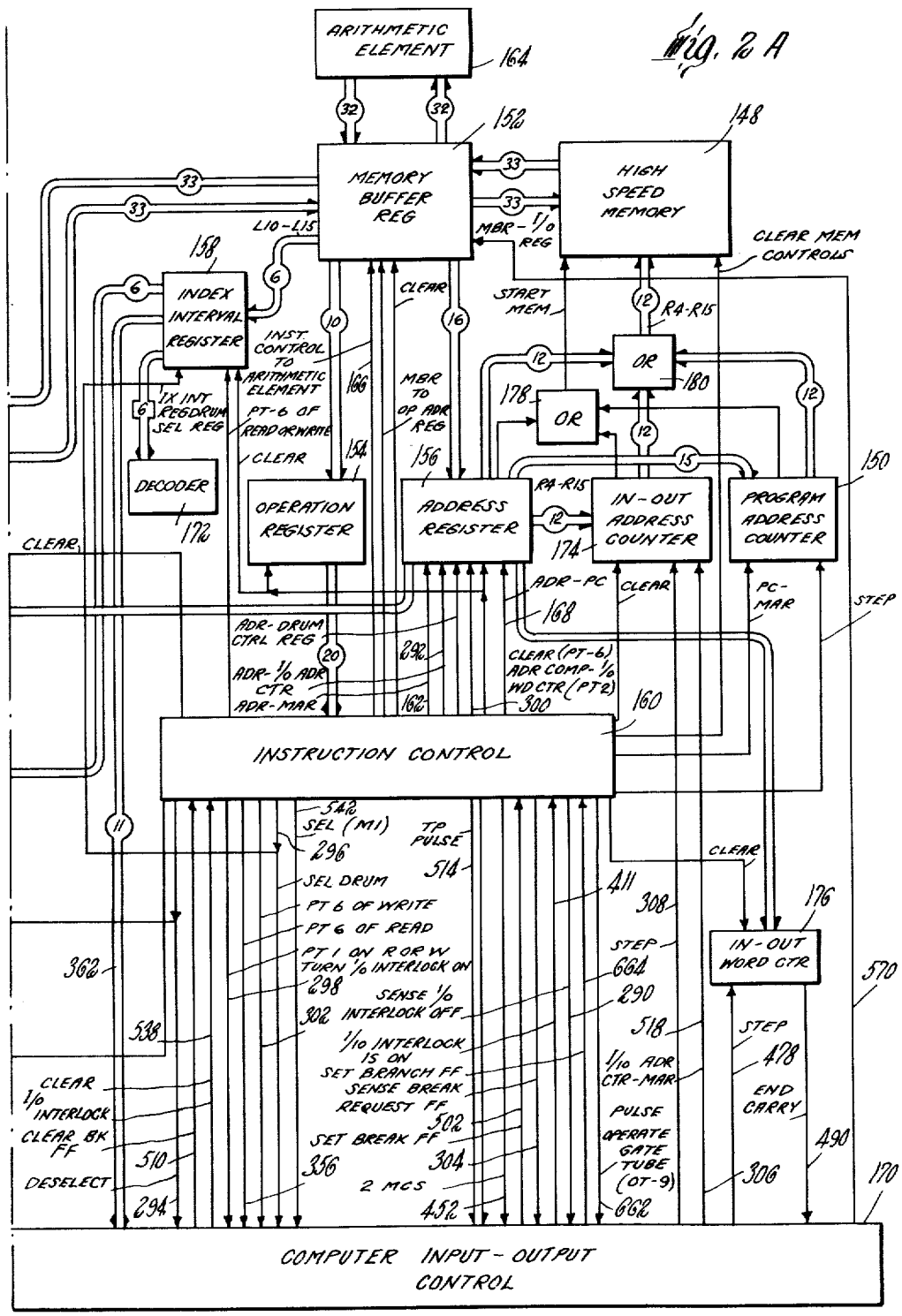

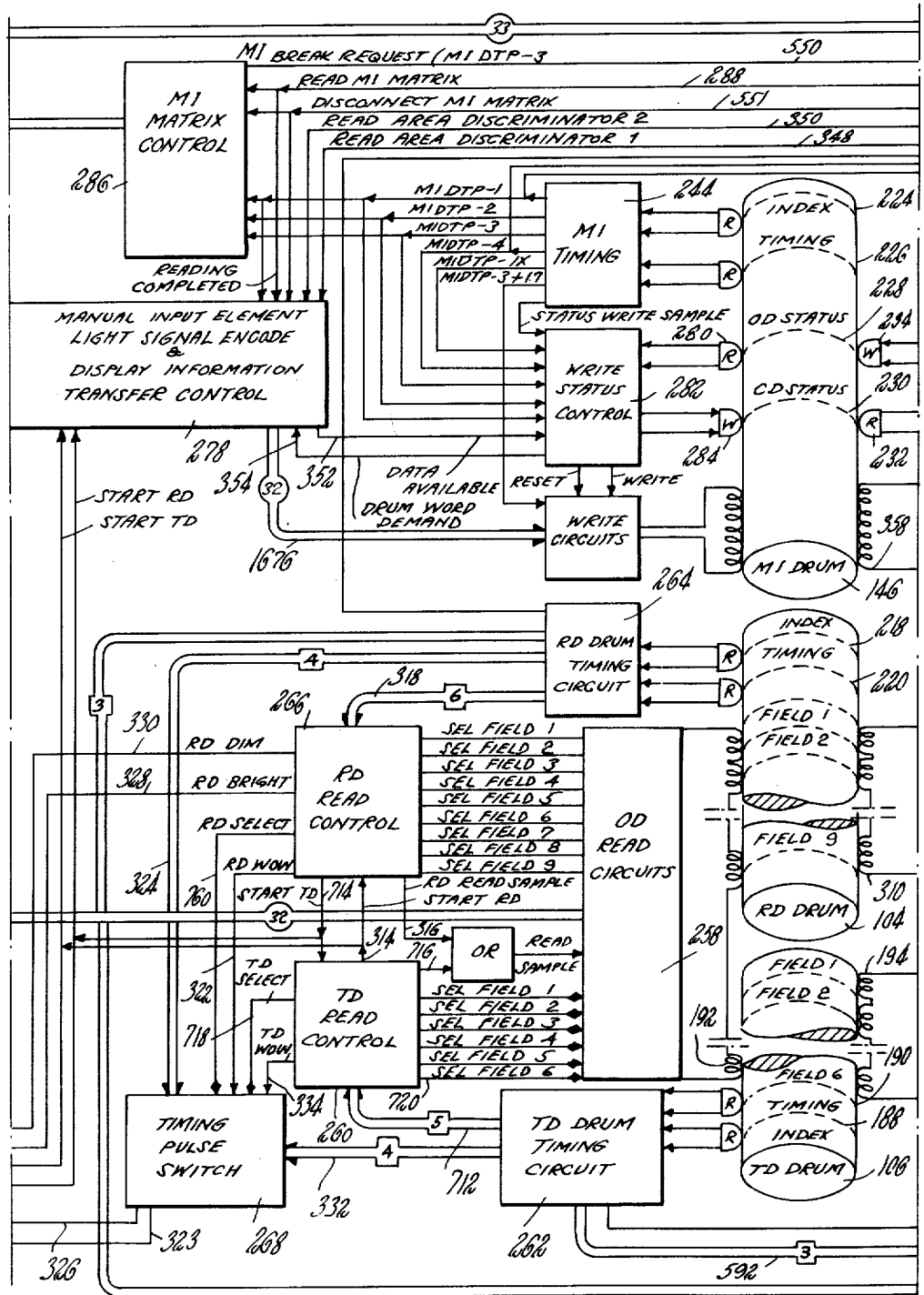

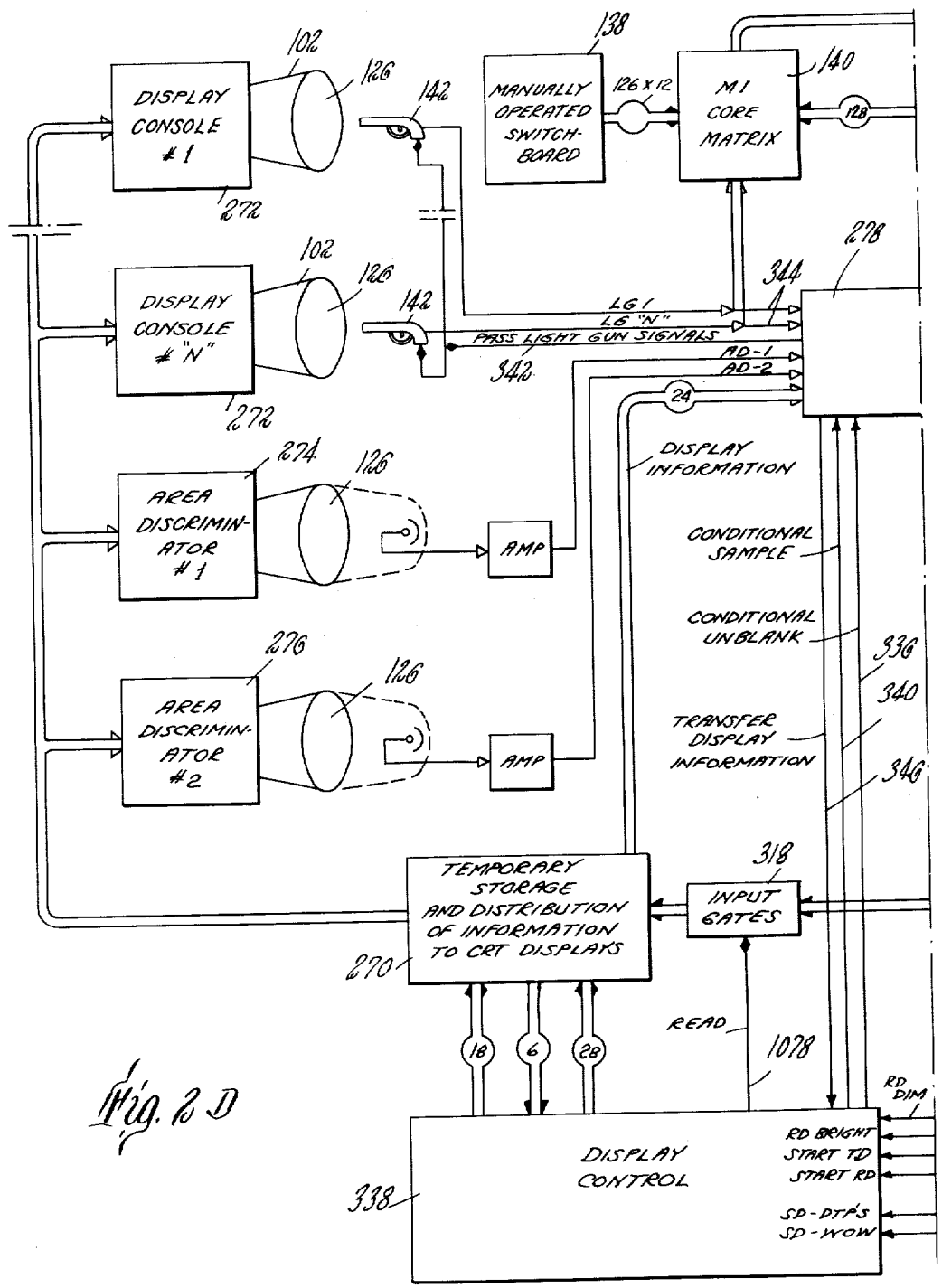

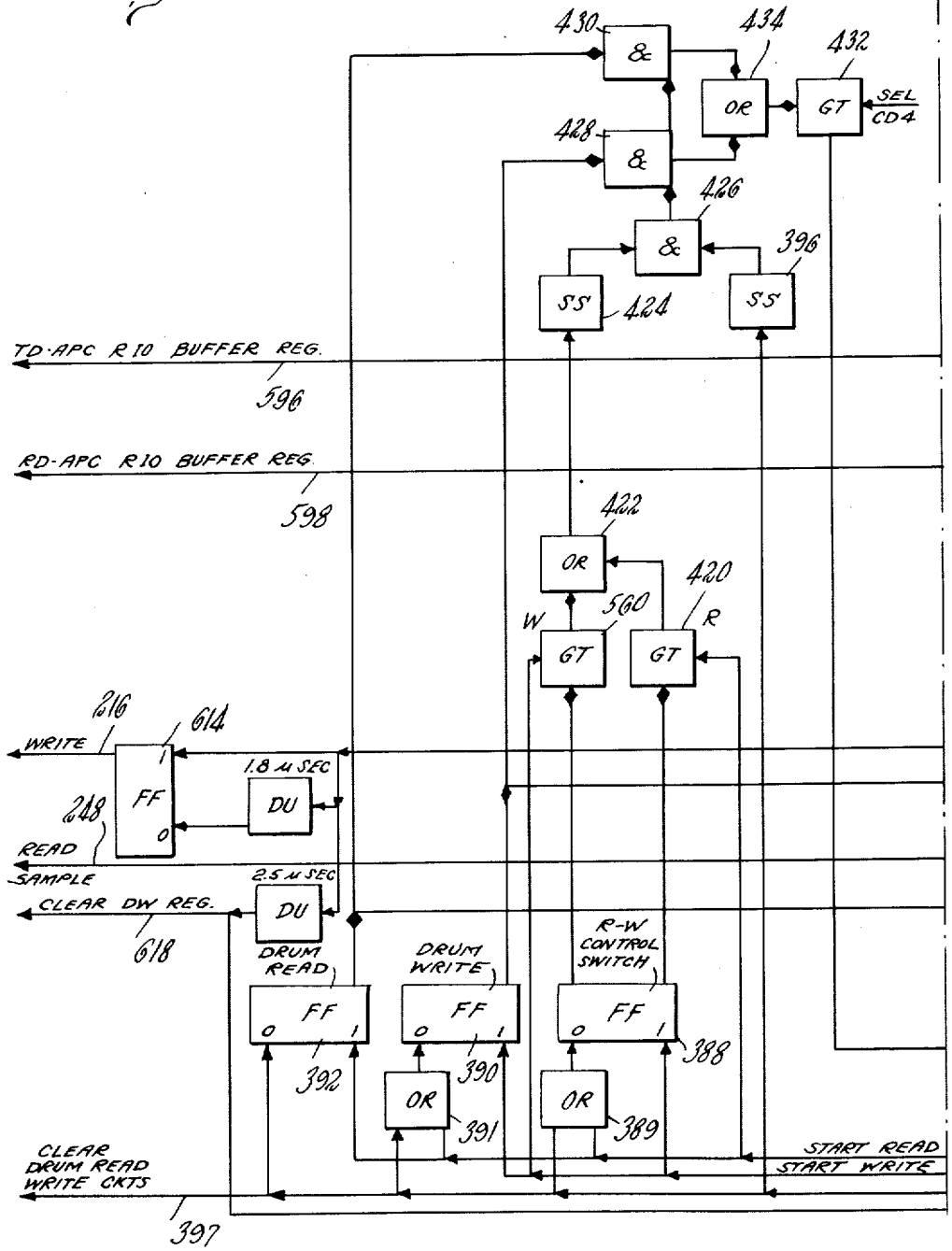

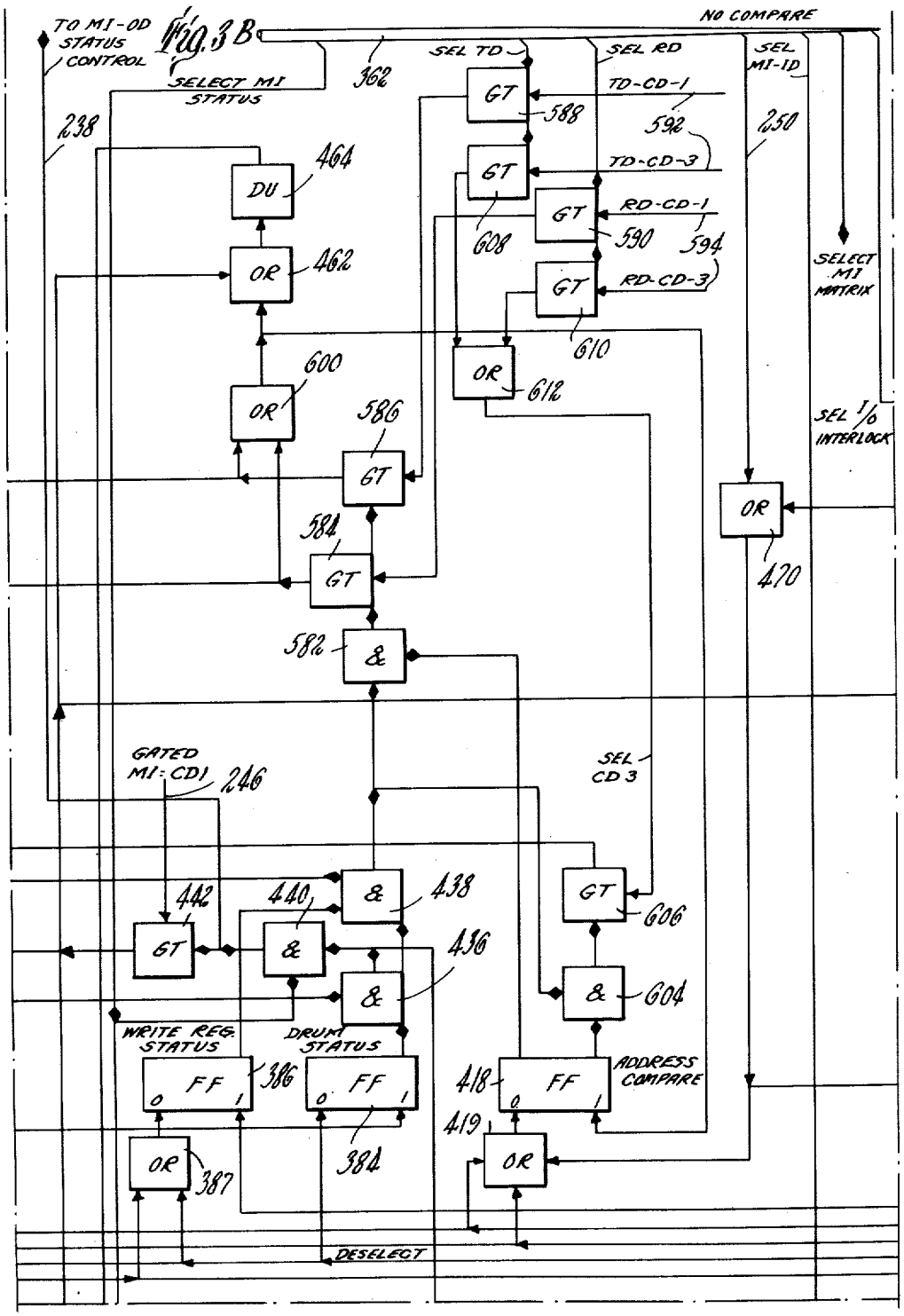

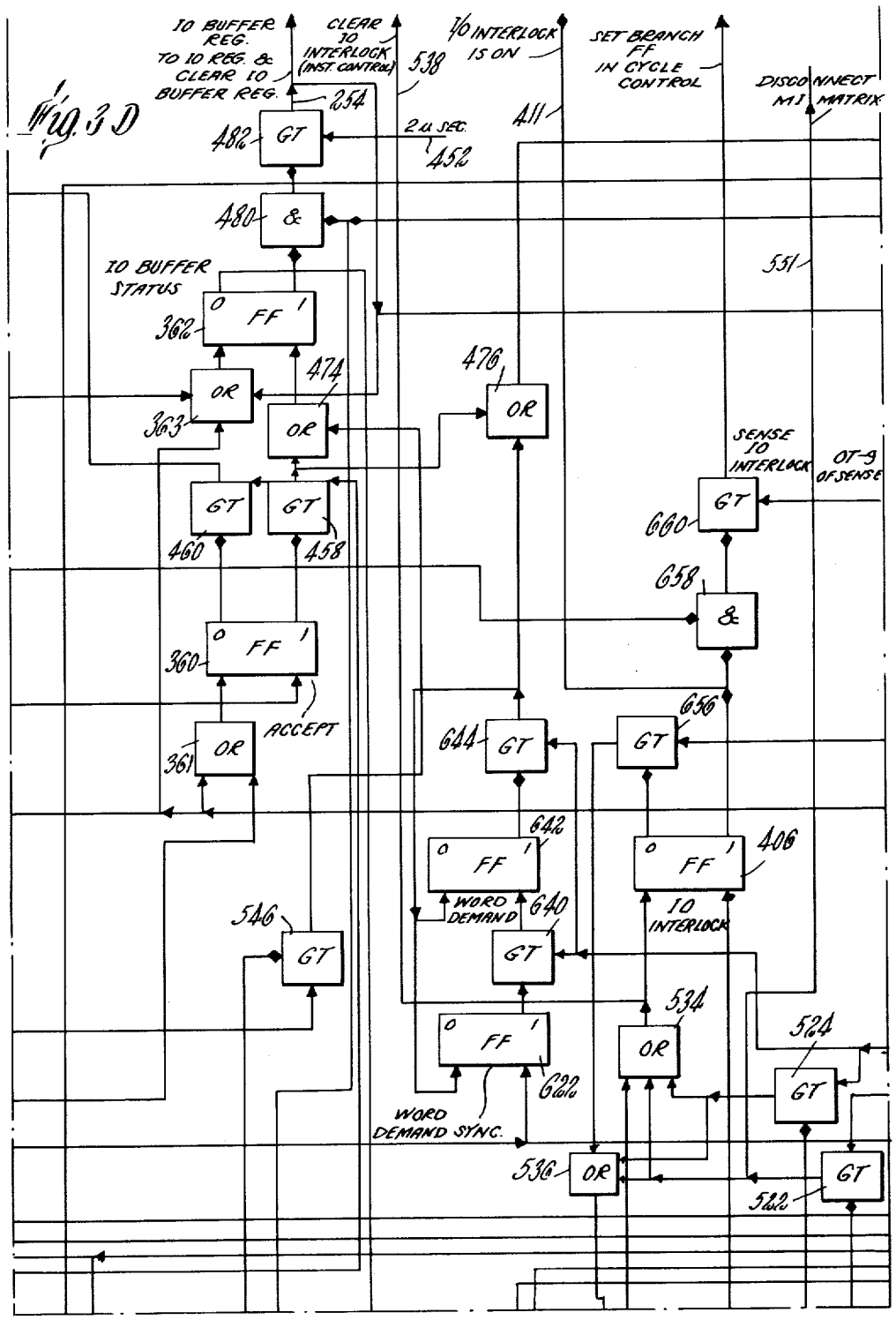

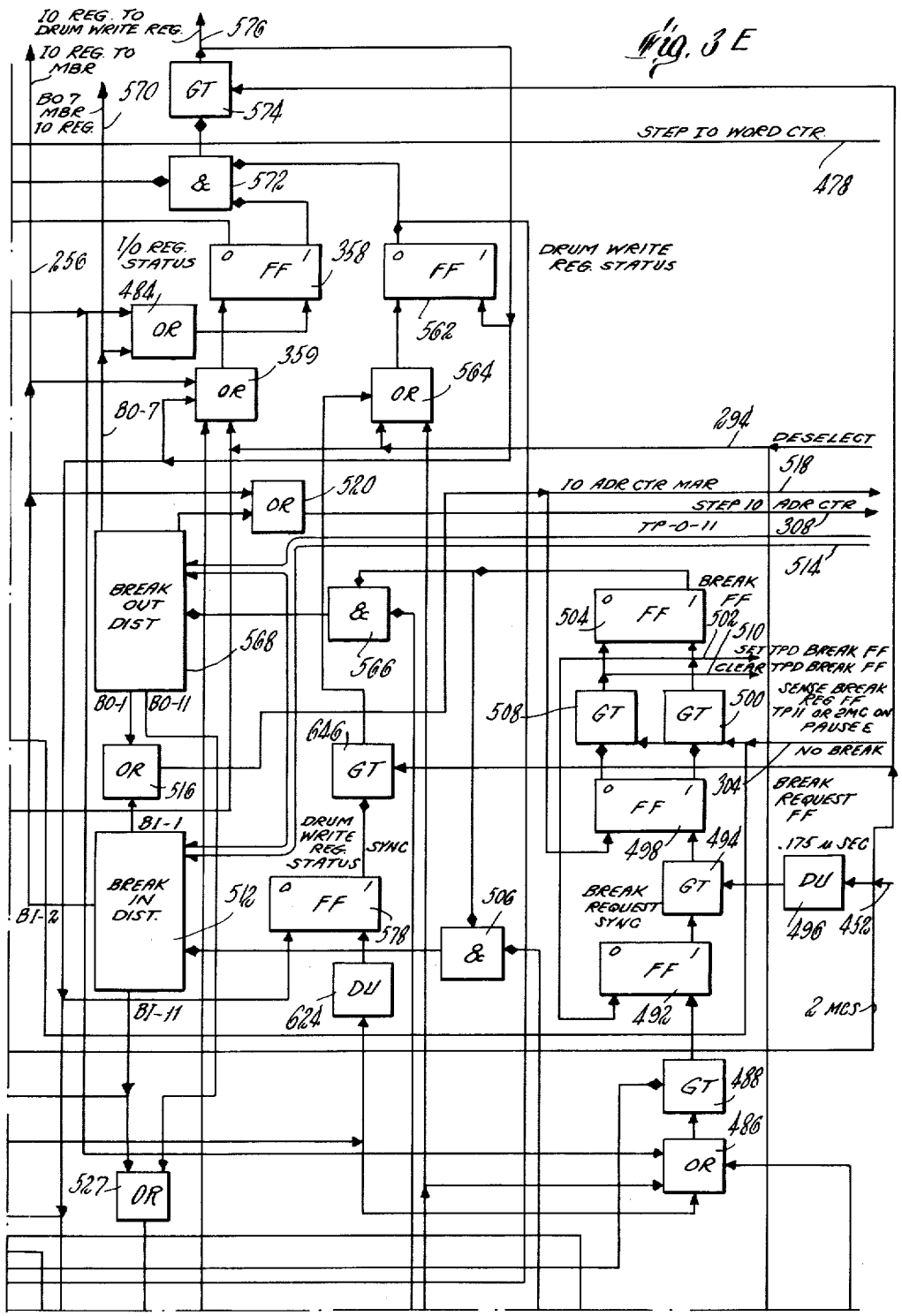

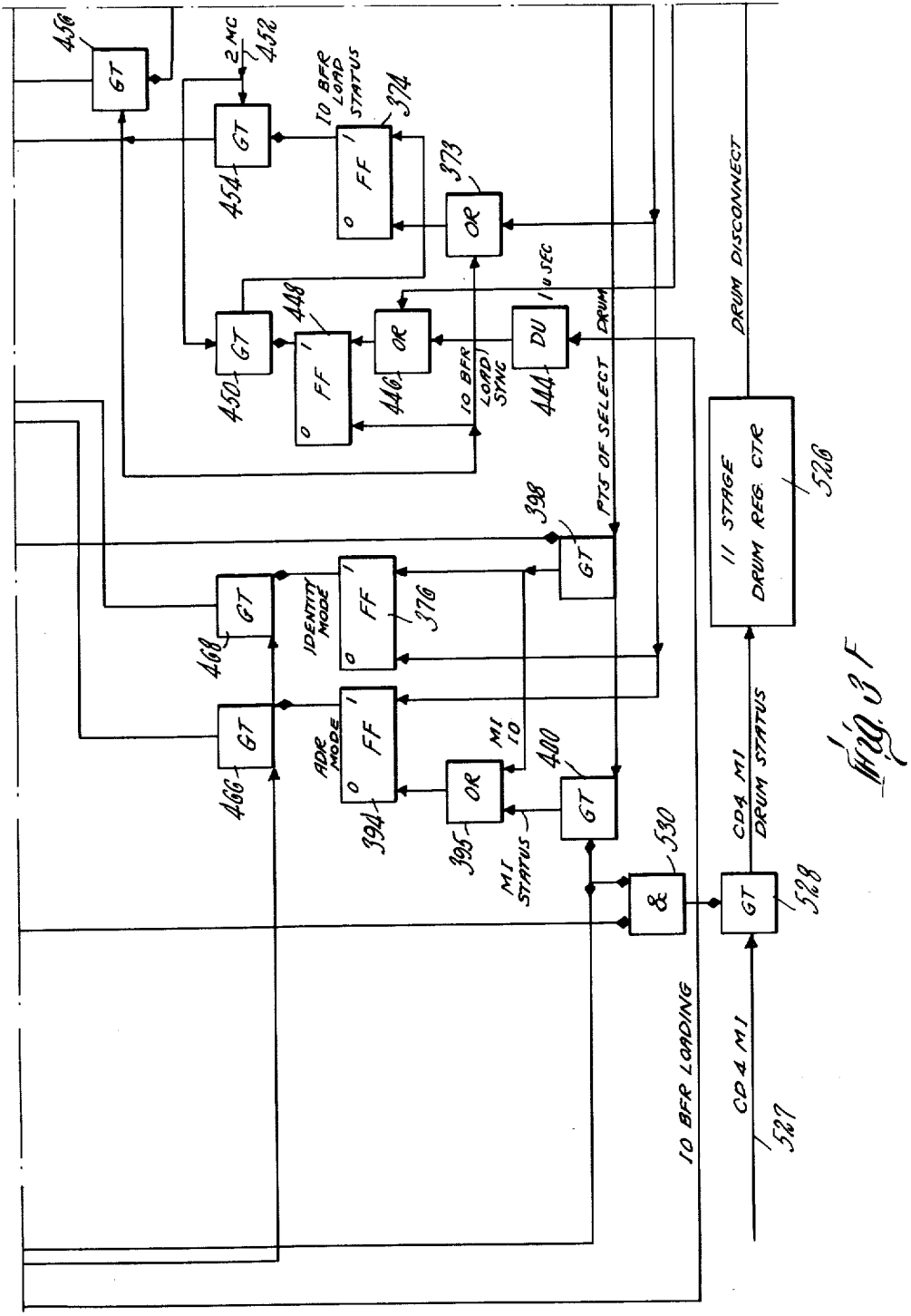

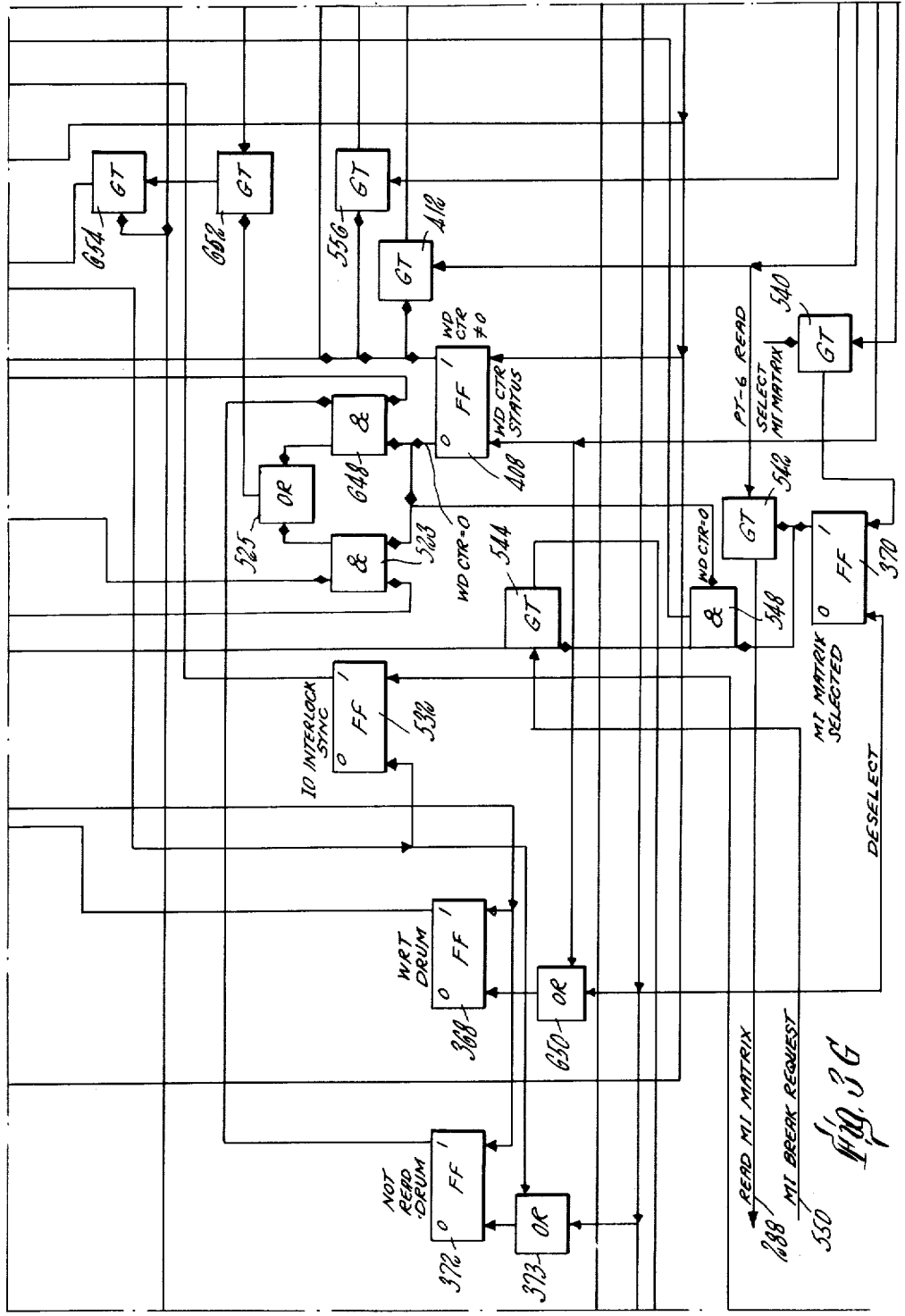

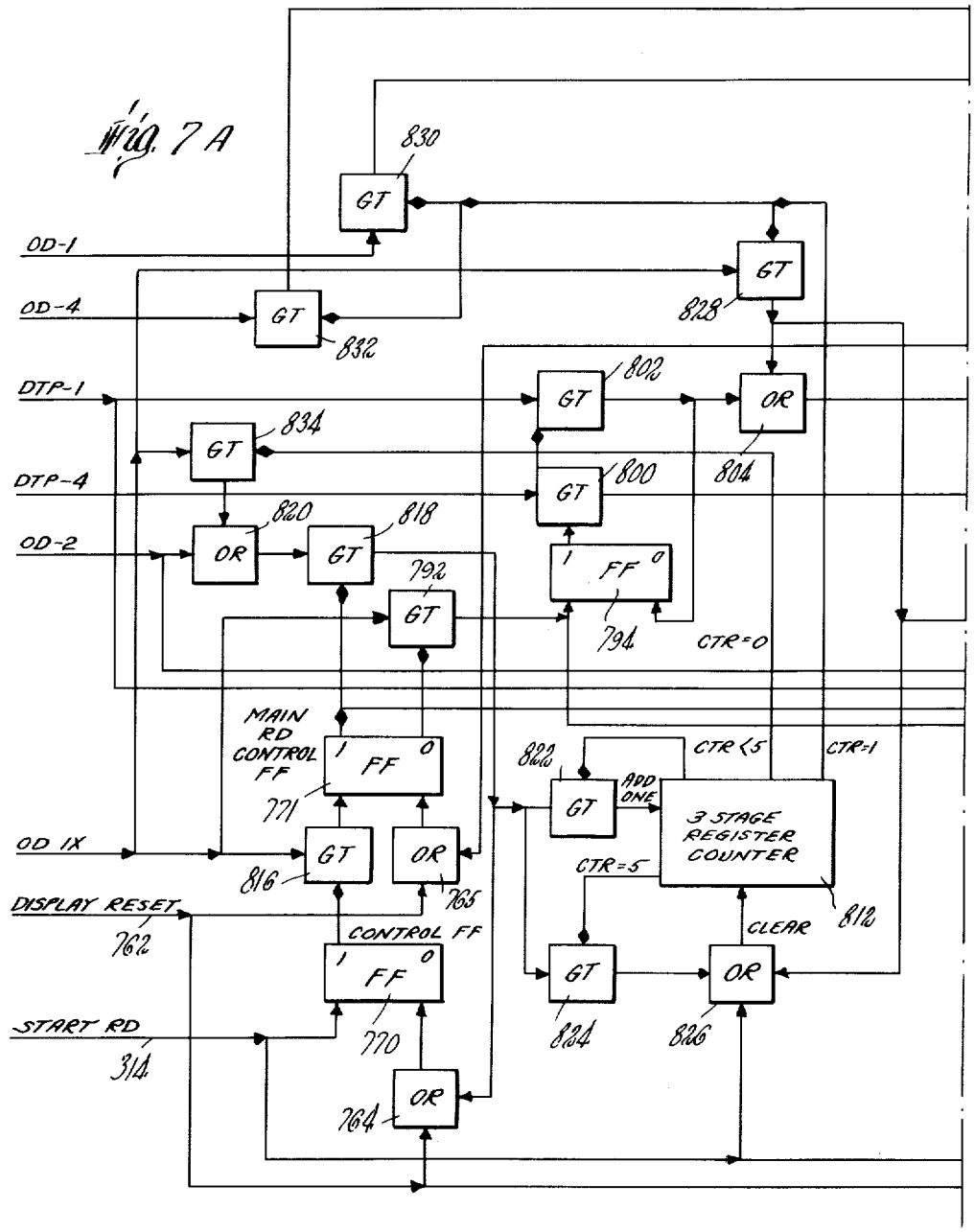

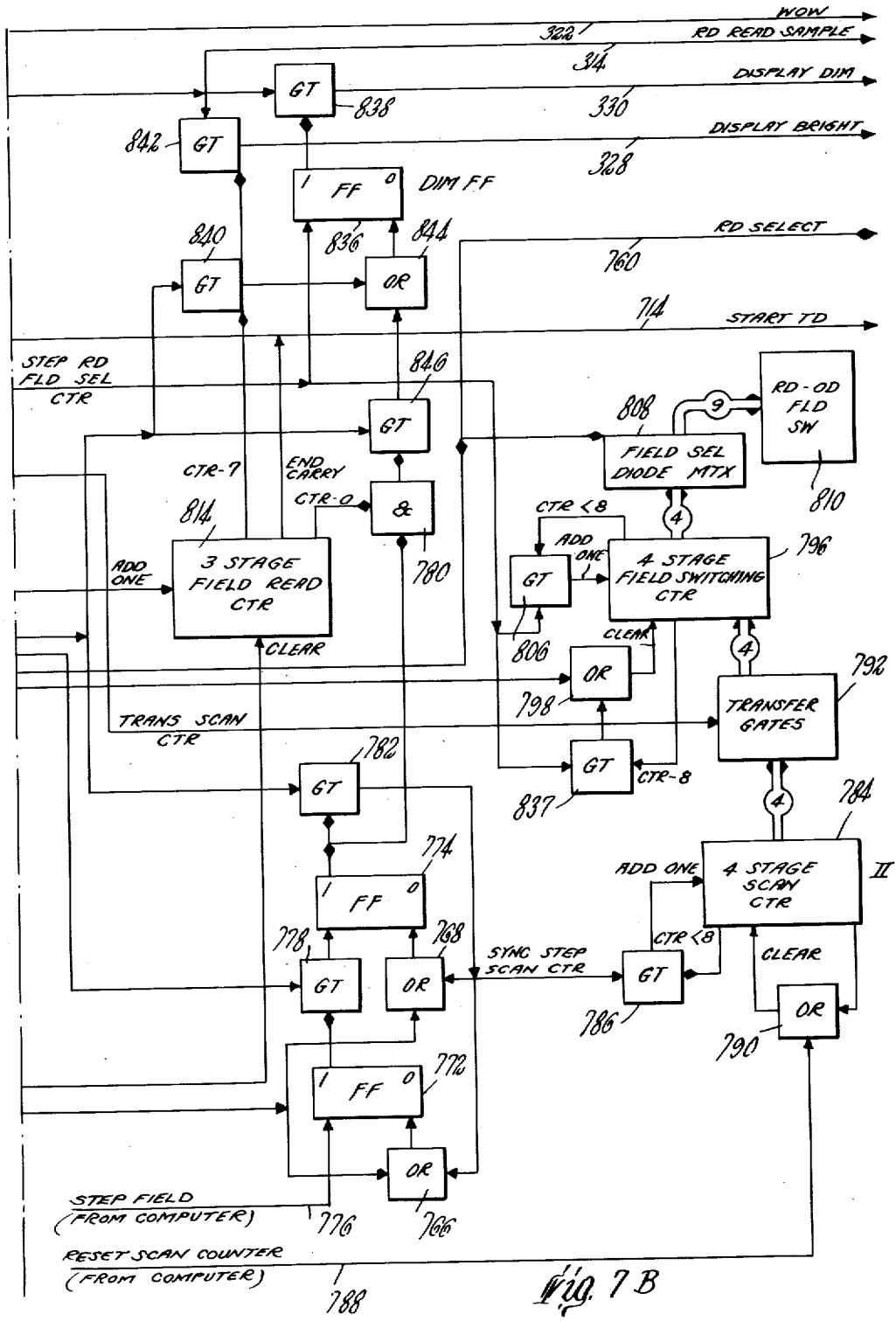

May 29, 1962 R. R. EVERETT 3,037,192
DATA PROCESSING SYSTEM
Filed Dec. 27, 1957 51 Sheets-Sheet 18
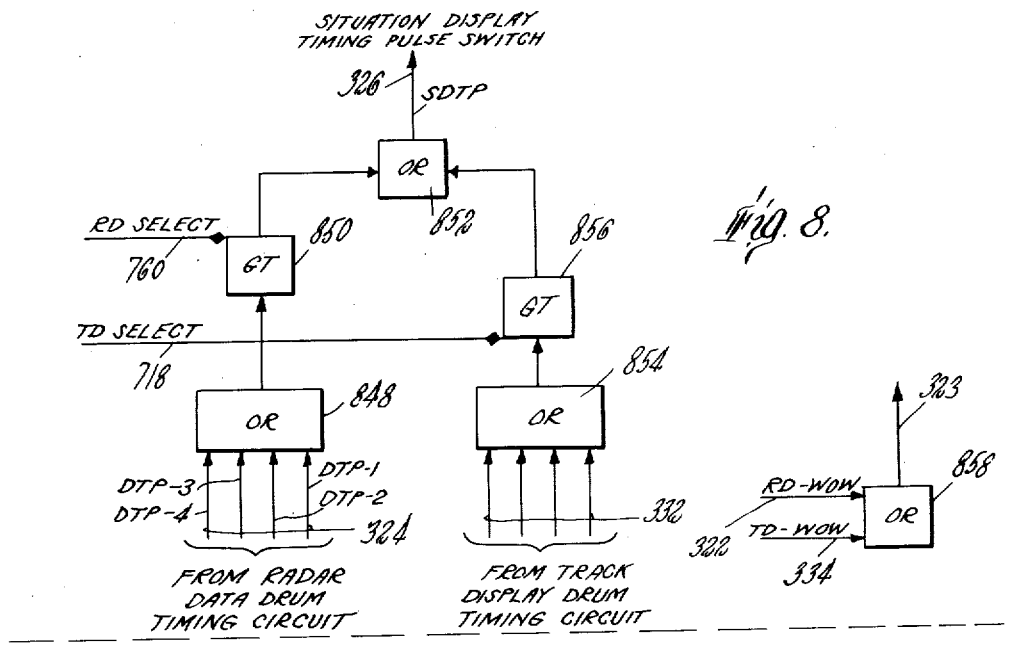
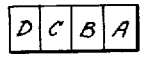
Fig. 2.
Fig. 7.
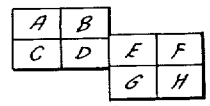
Fig. 17.
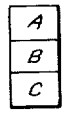
Fig. 20.
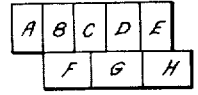
Fig. 3.
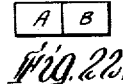
Fig. 22.
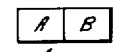
Fig. 23.
Fig. 25.
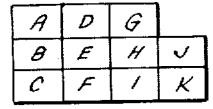
Fig. 18.
Fig. 21.
Fig. 26.

May 29, 1962   R. R. EVERETT   3,037,192
DATA PROCESSING SYSTEM
Filed Dec. 27, 1957   51 Sheets-Sheet 20
Fig. 10.
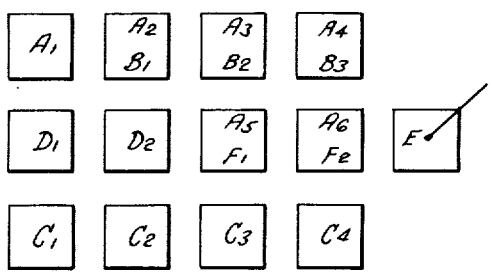
Fig. 12.
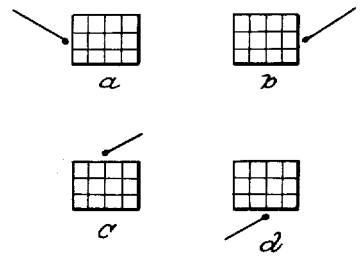
Fig. 13.
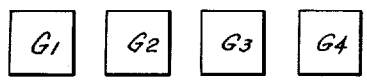
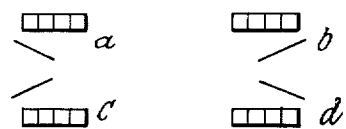
Fig. 16.
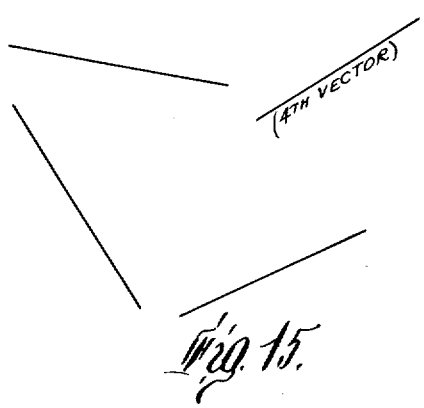
Fig. 15.

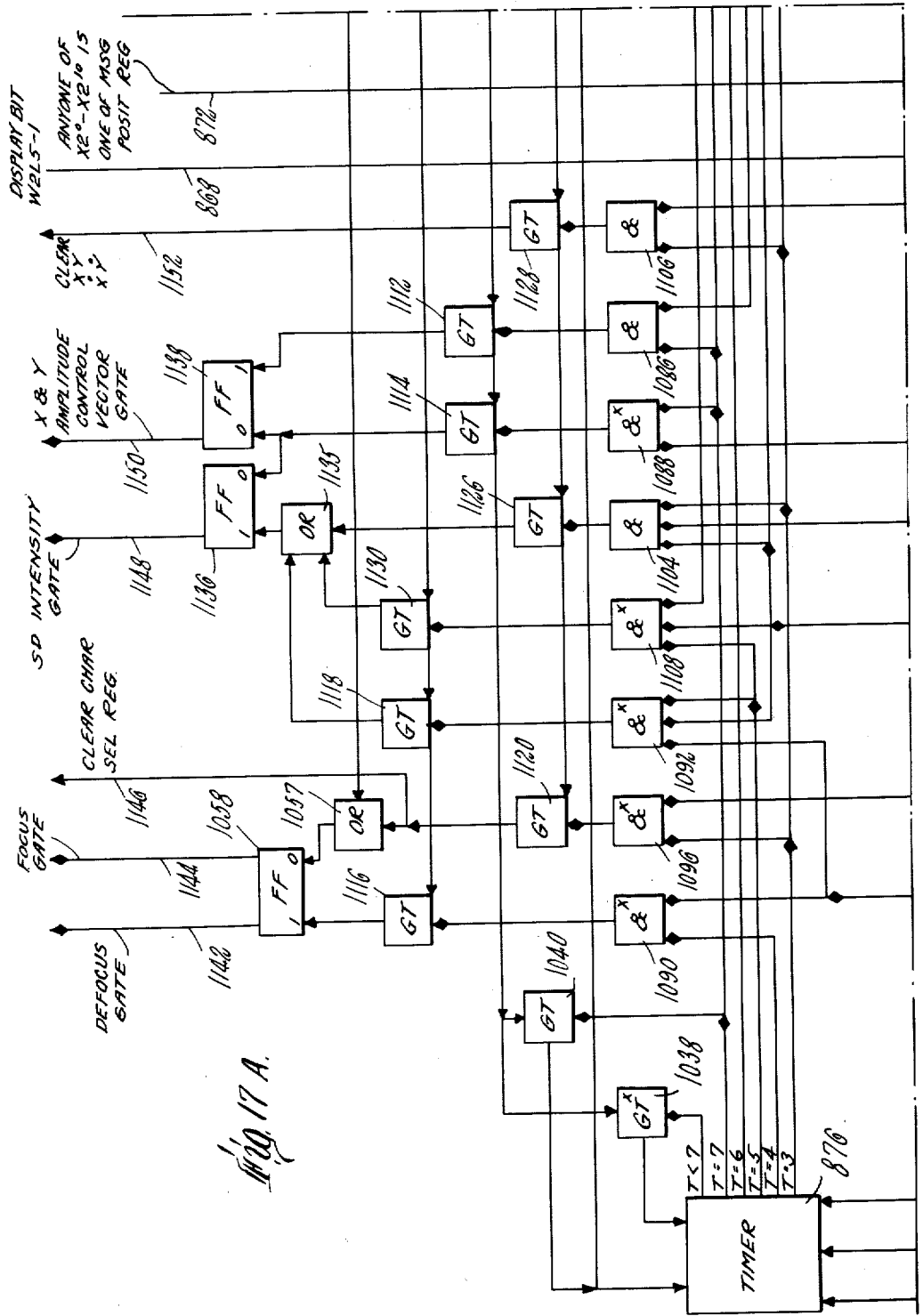

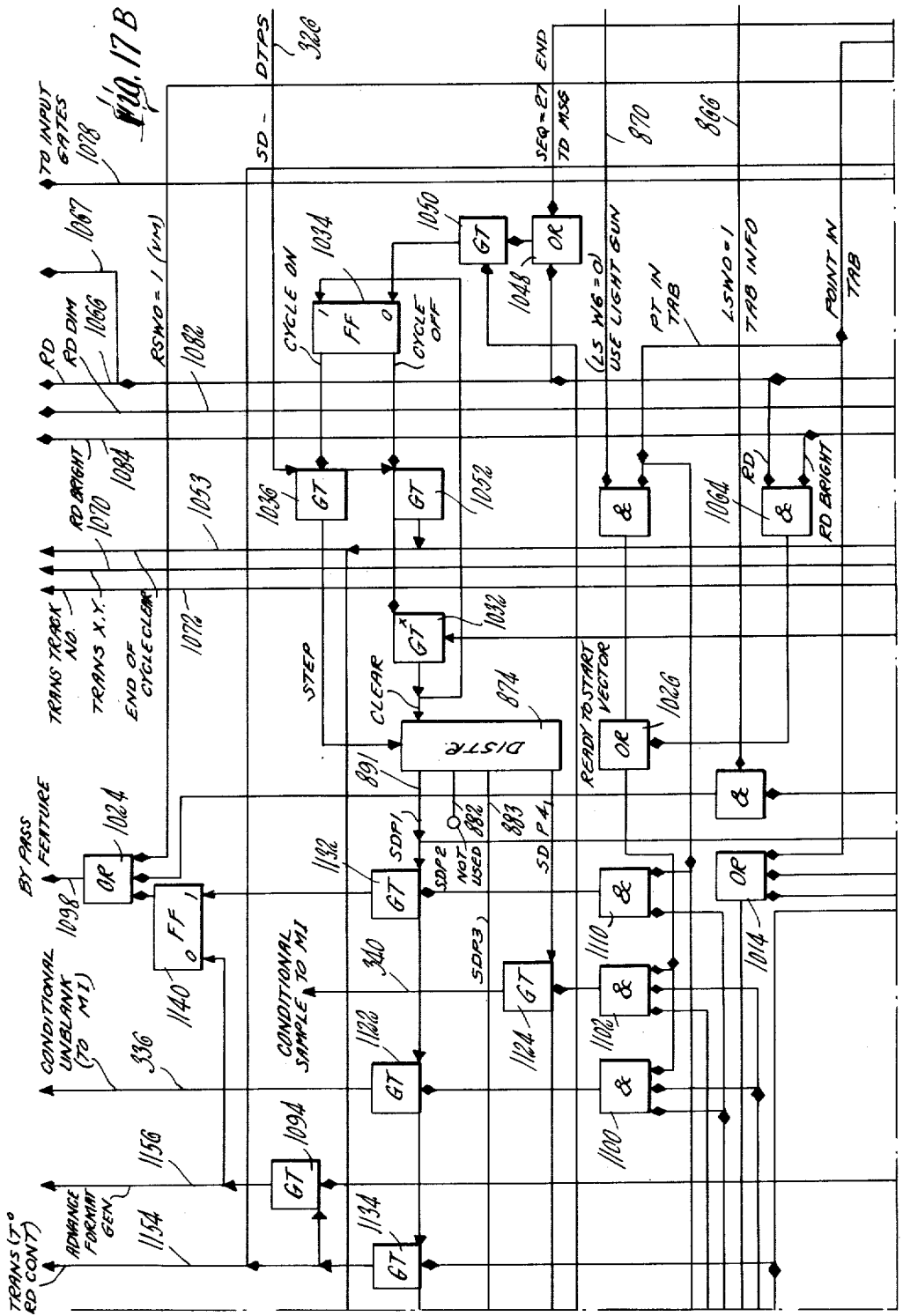

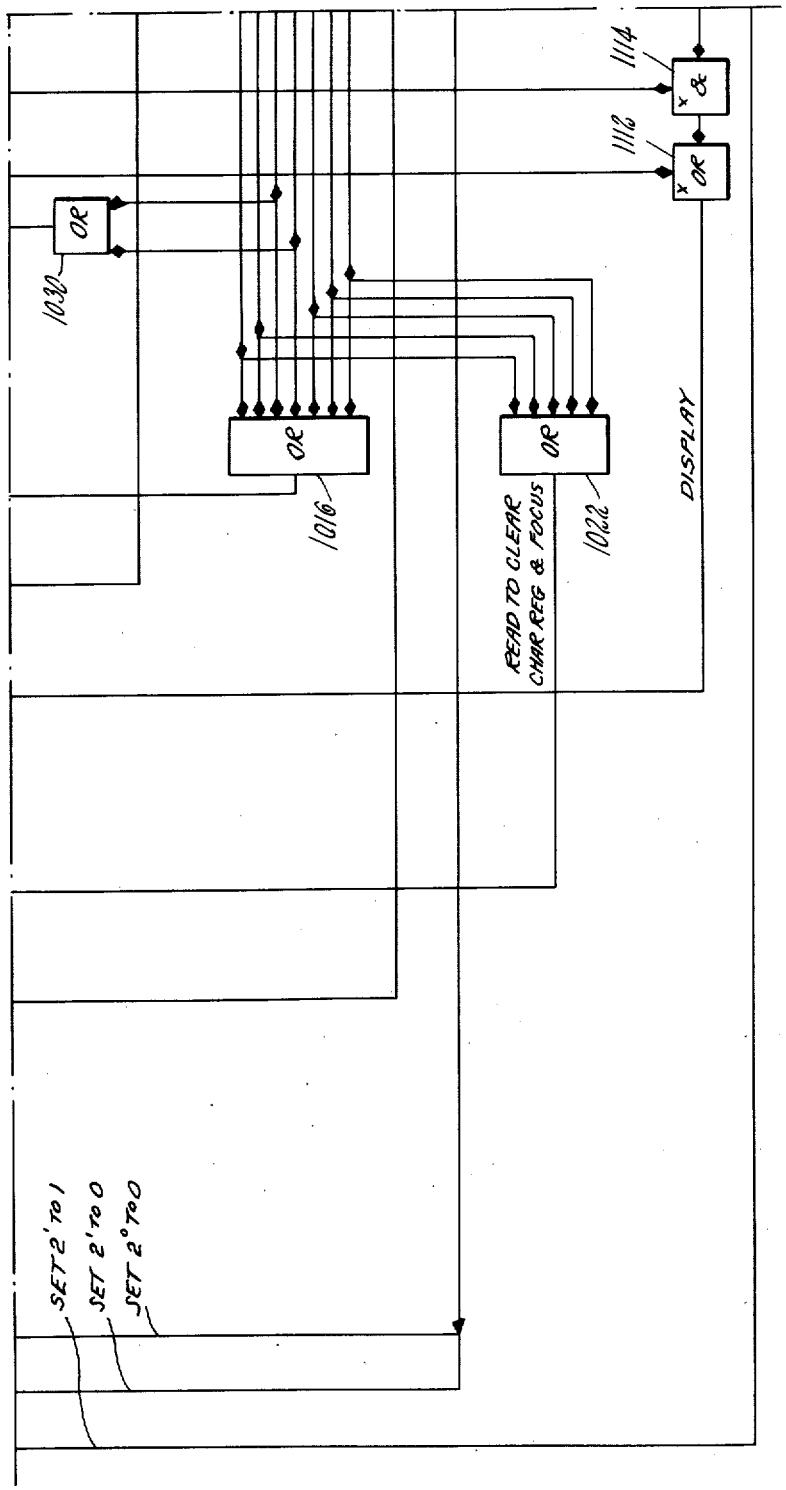

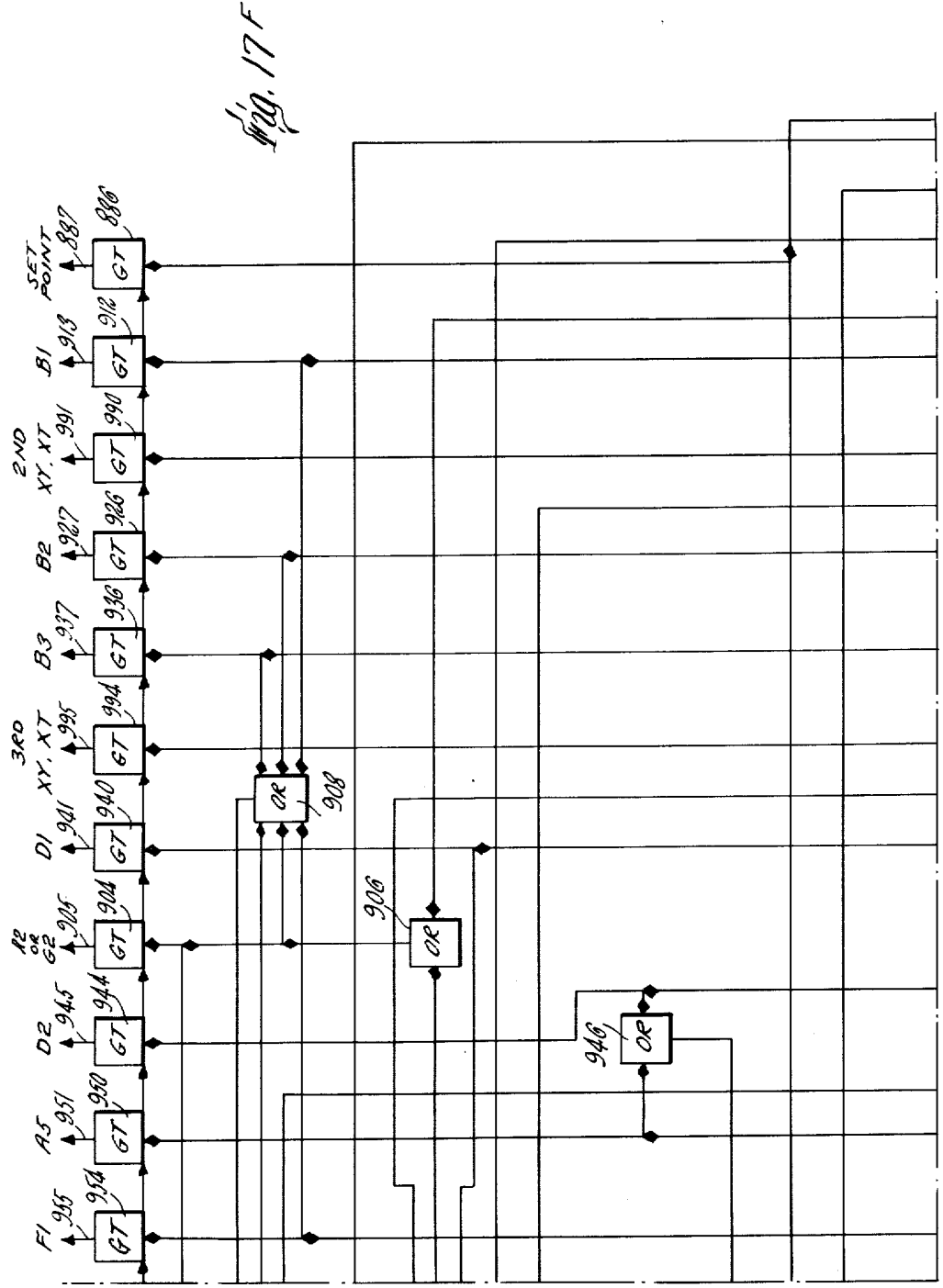

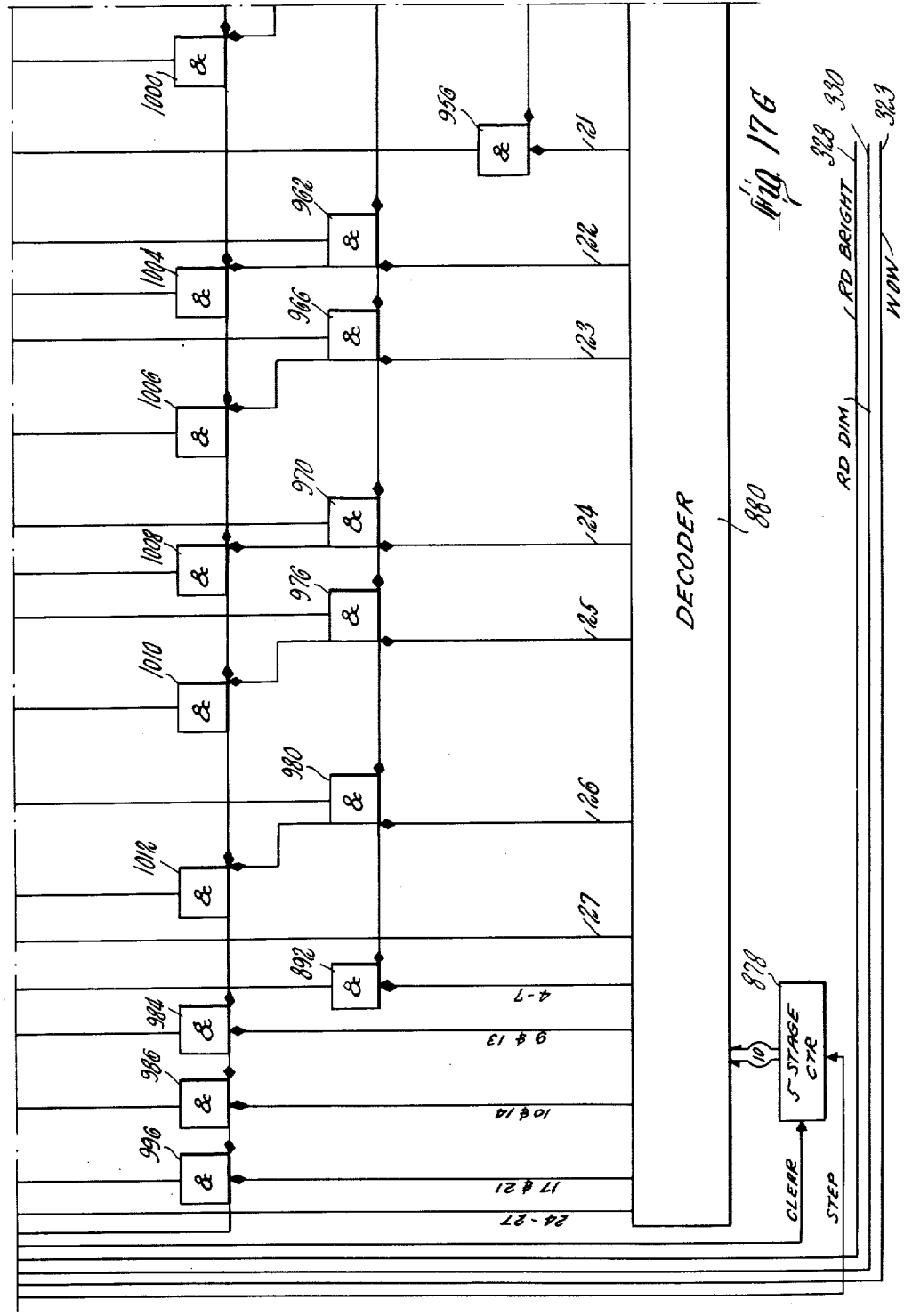

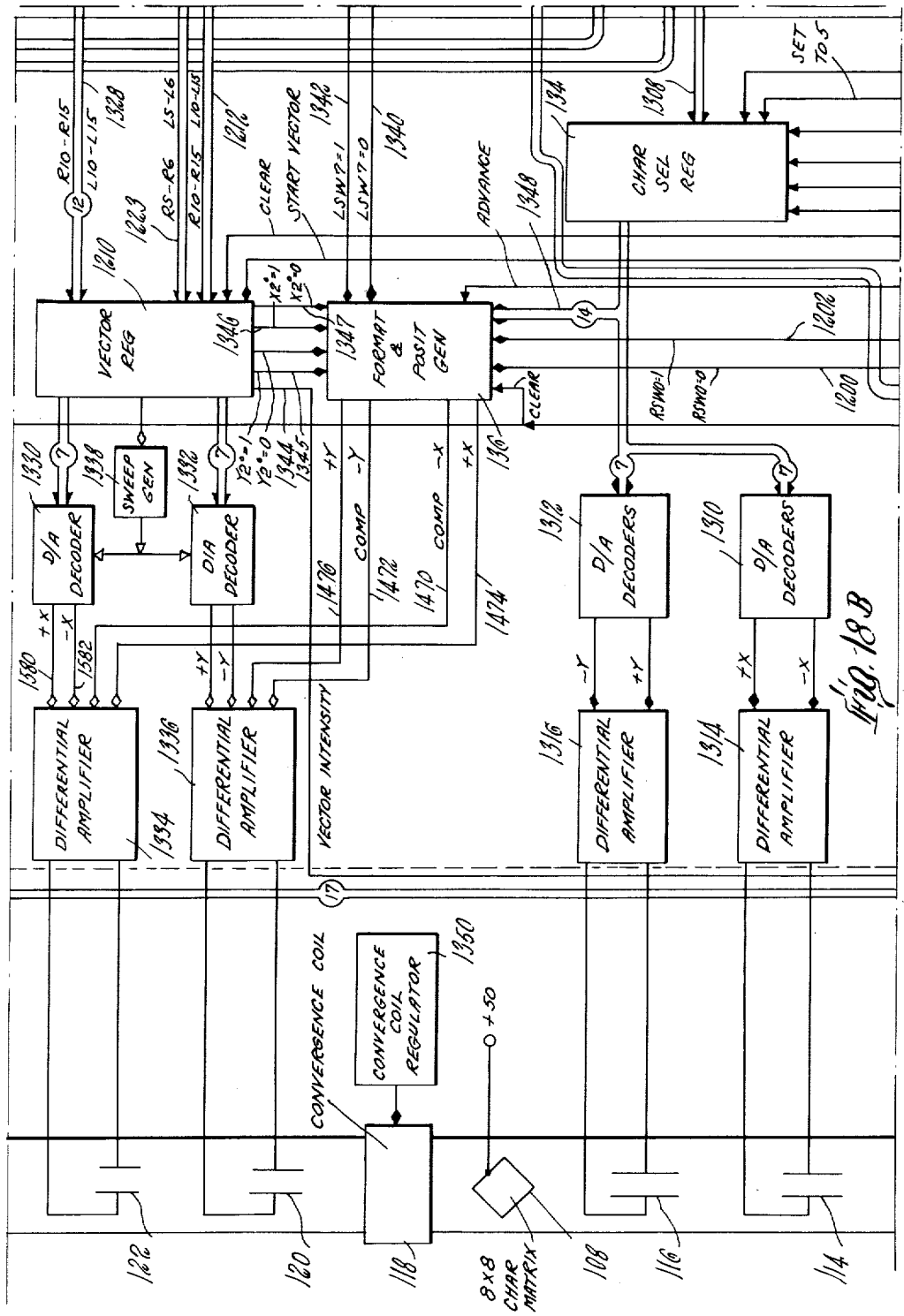

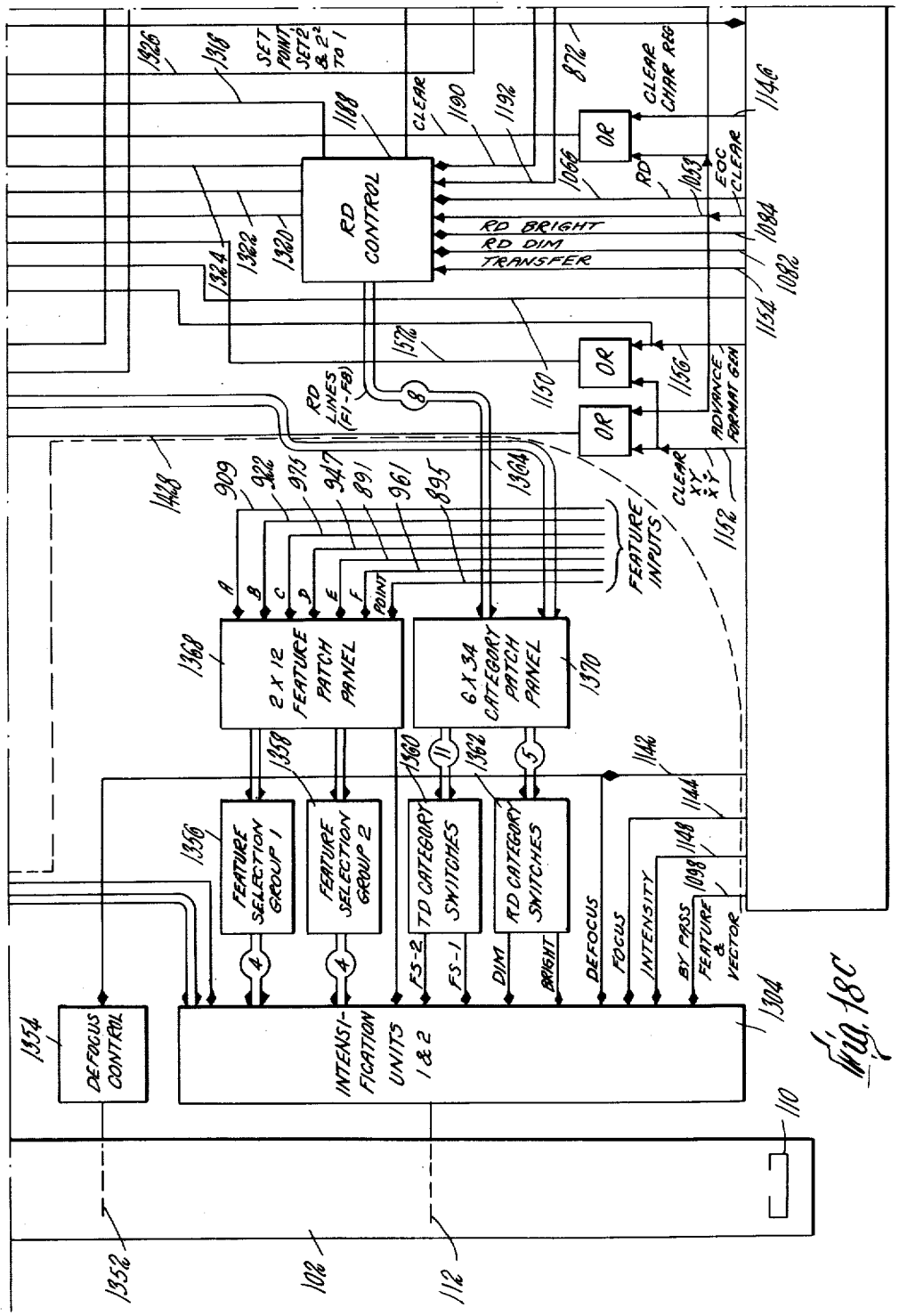

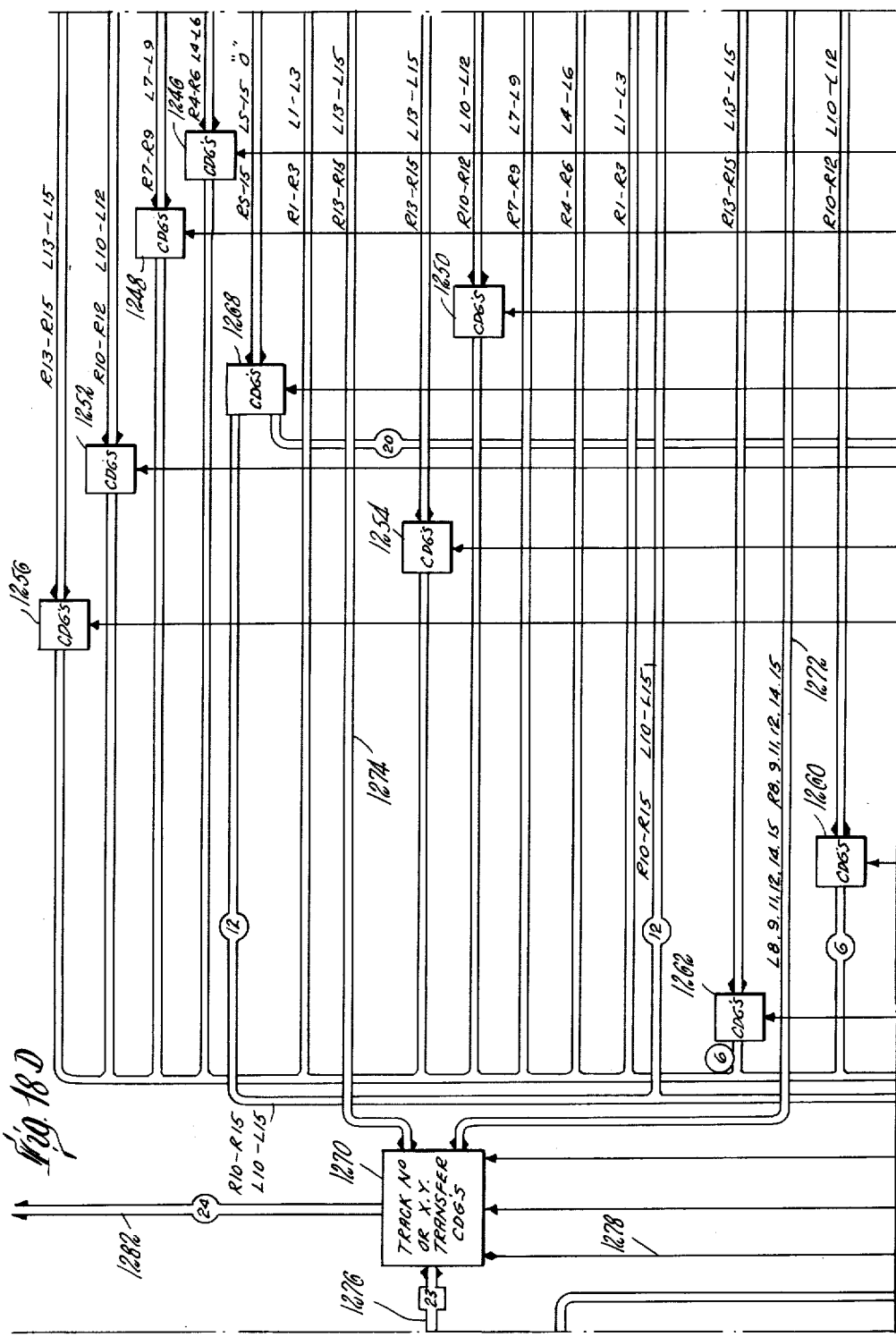

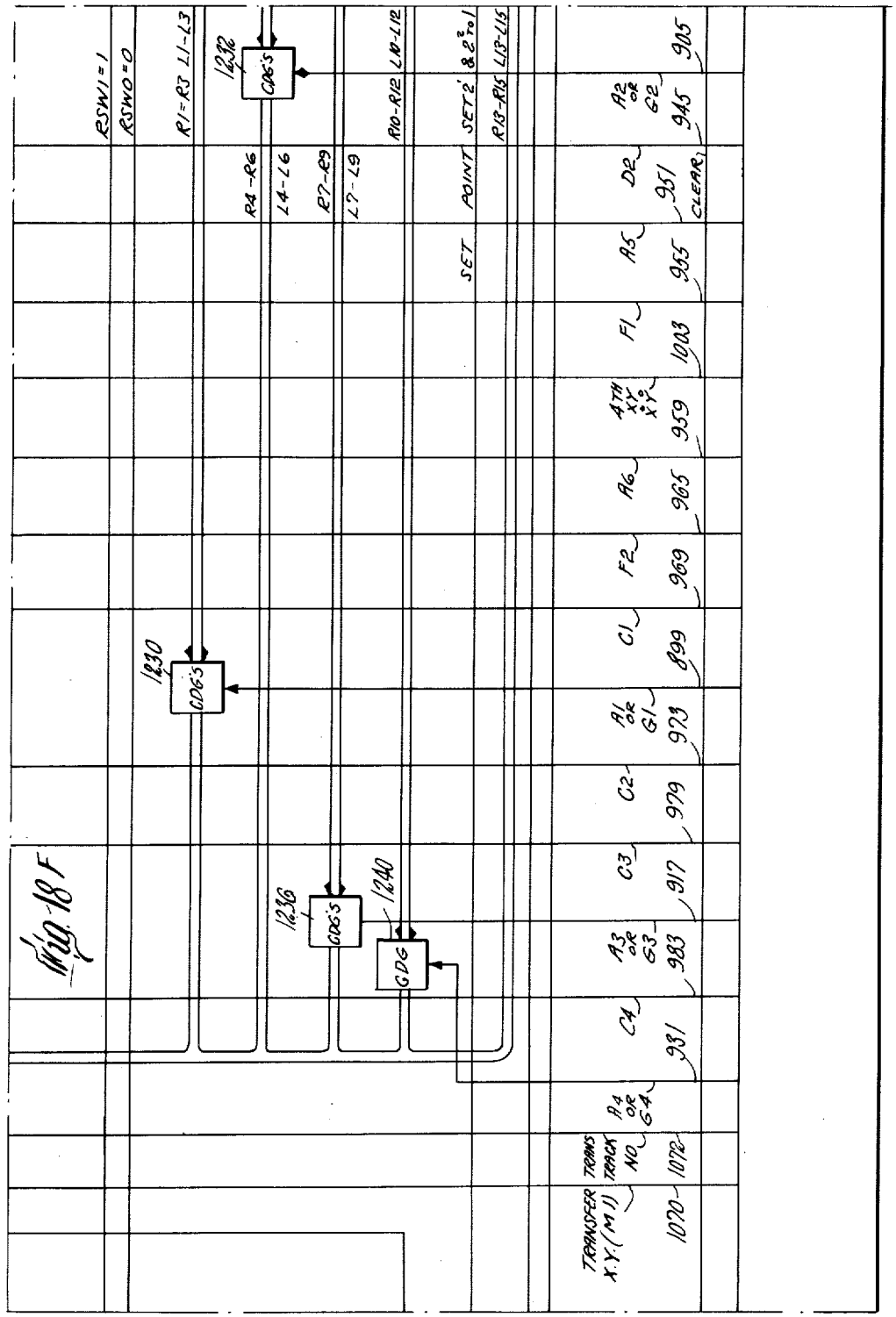

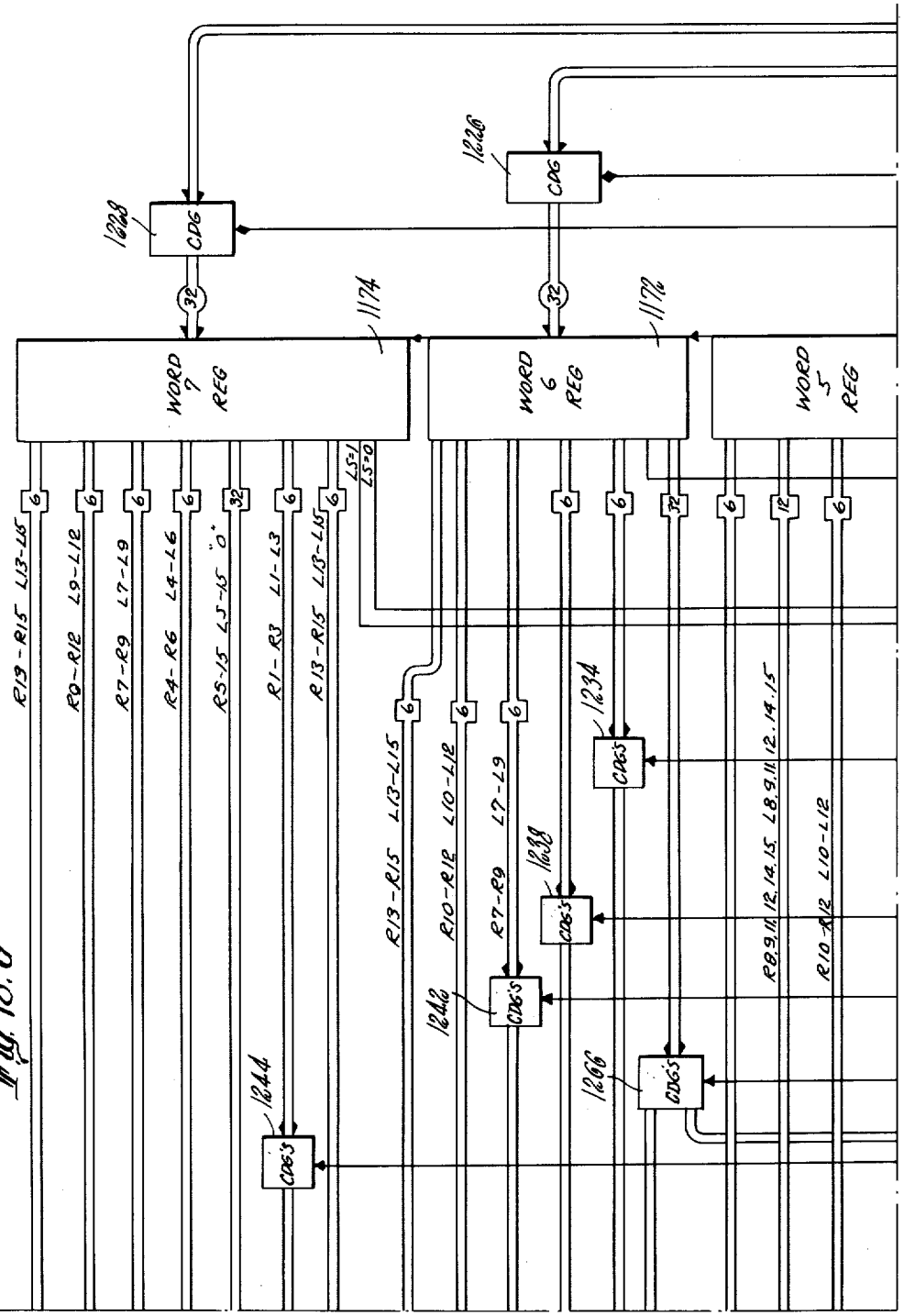

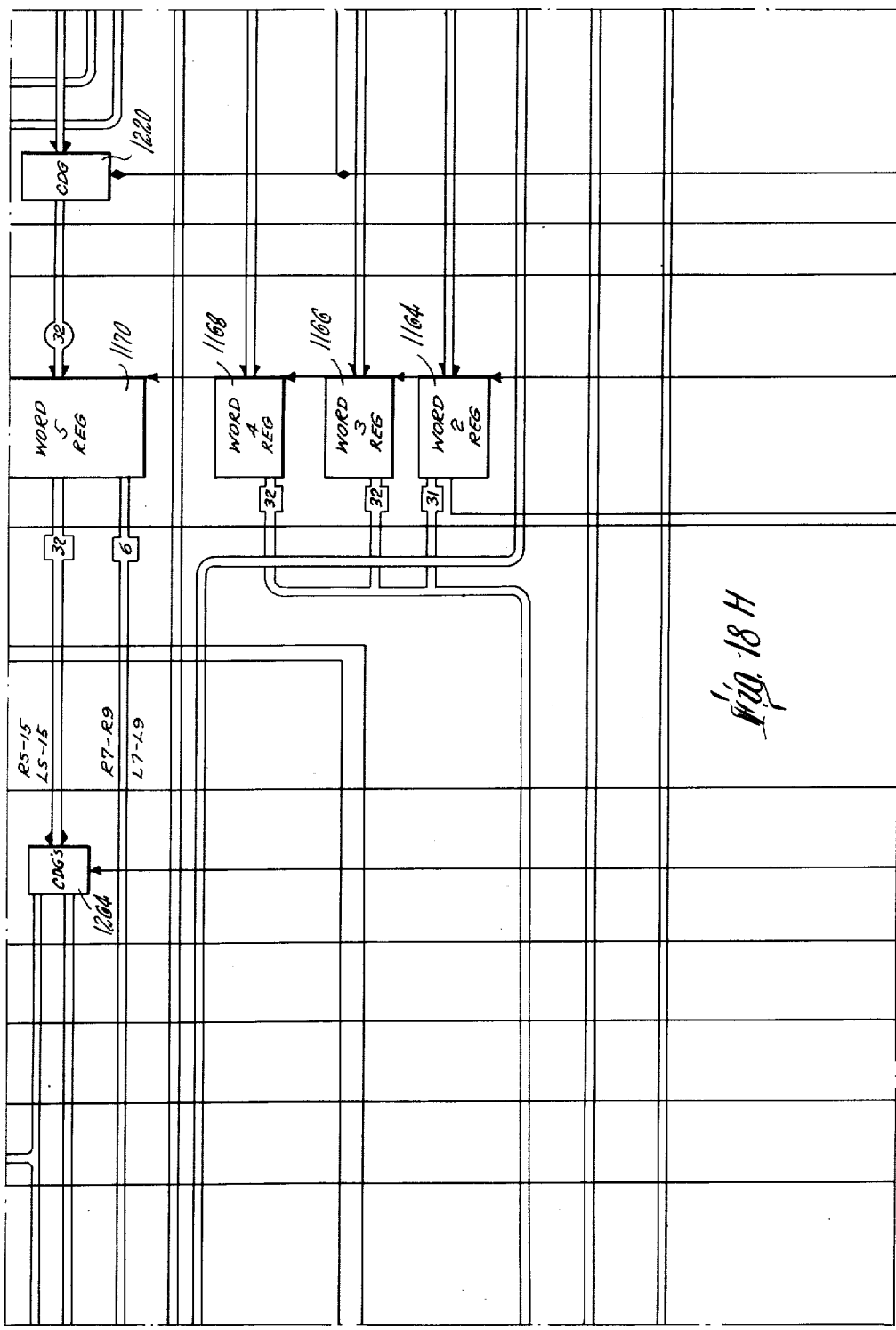

Fig. 181

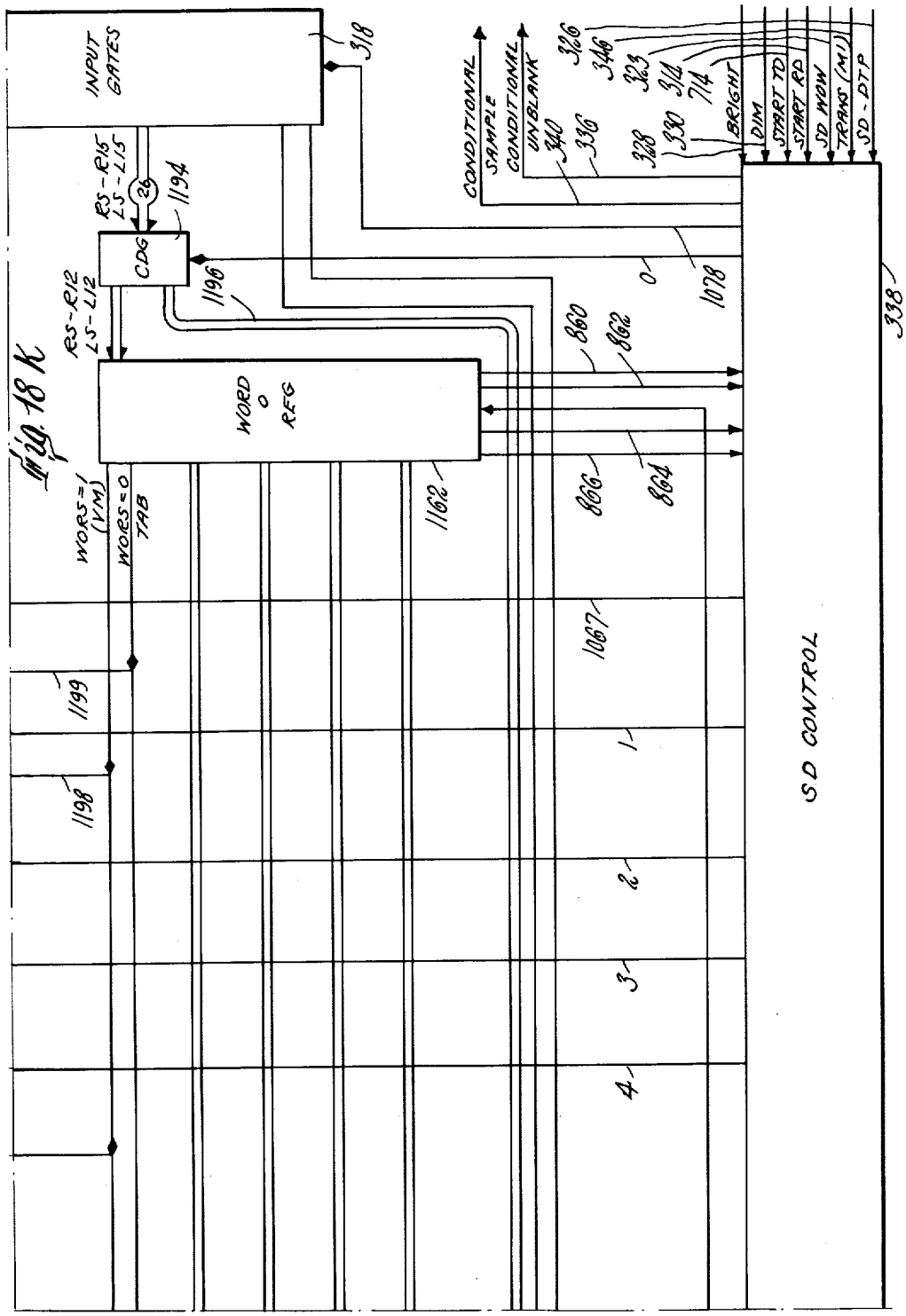

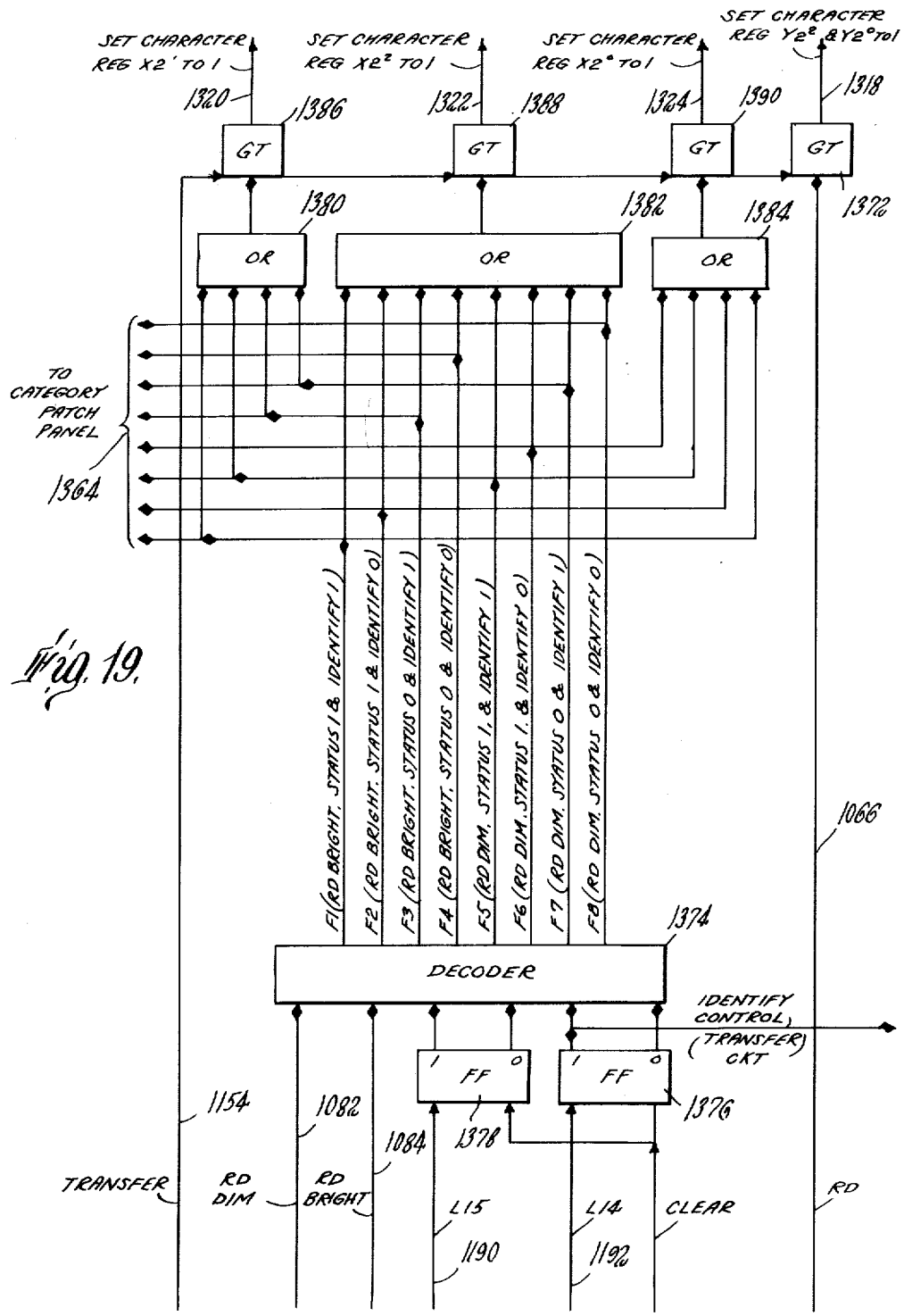

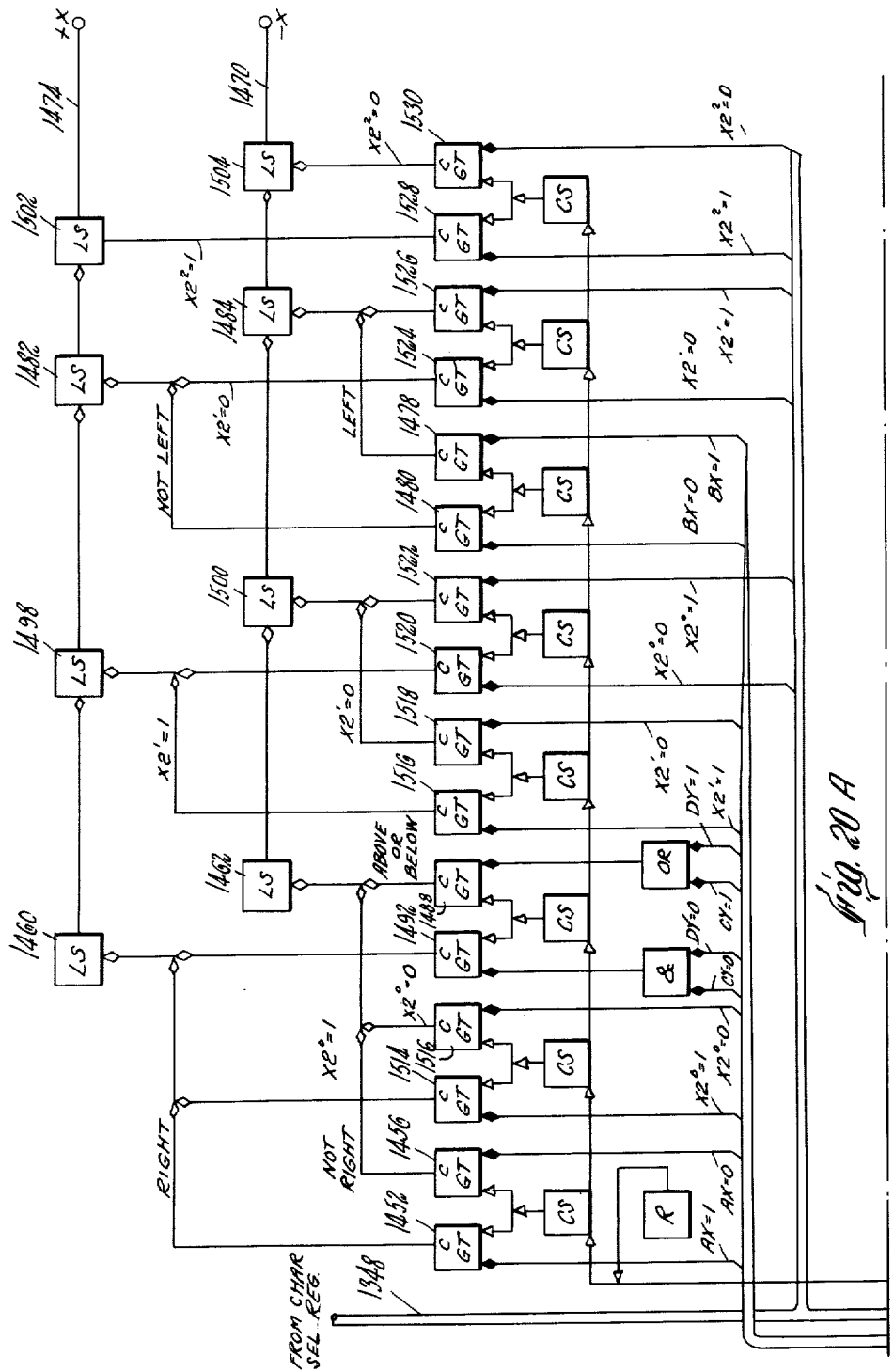

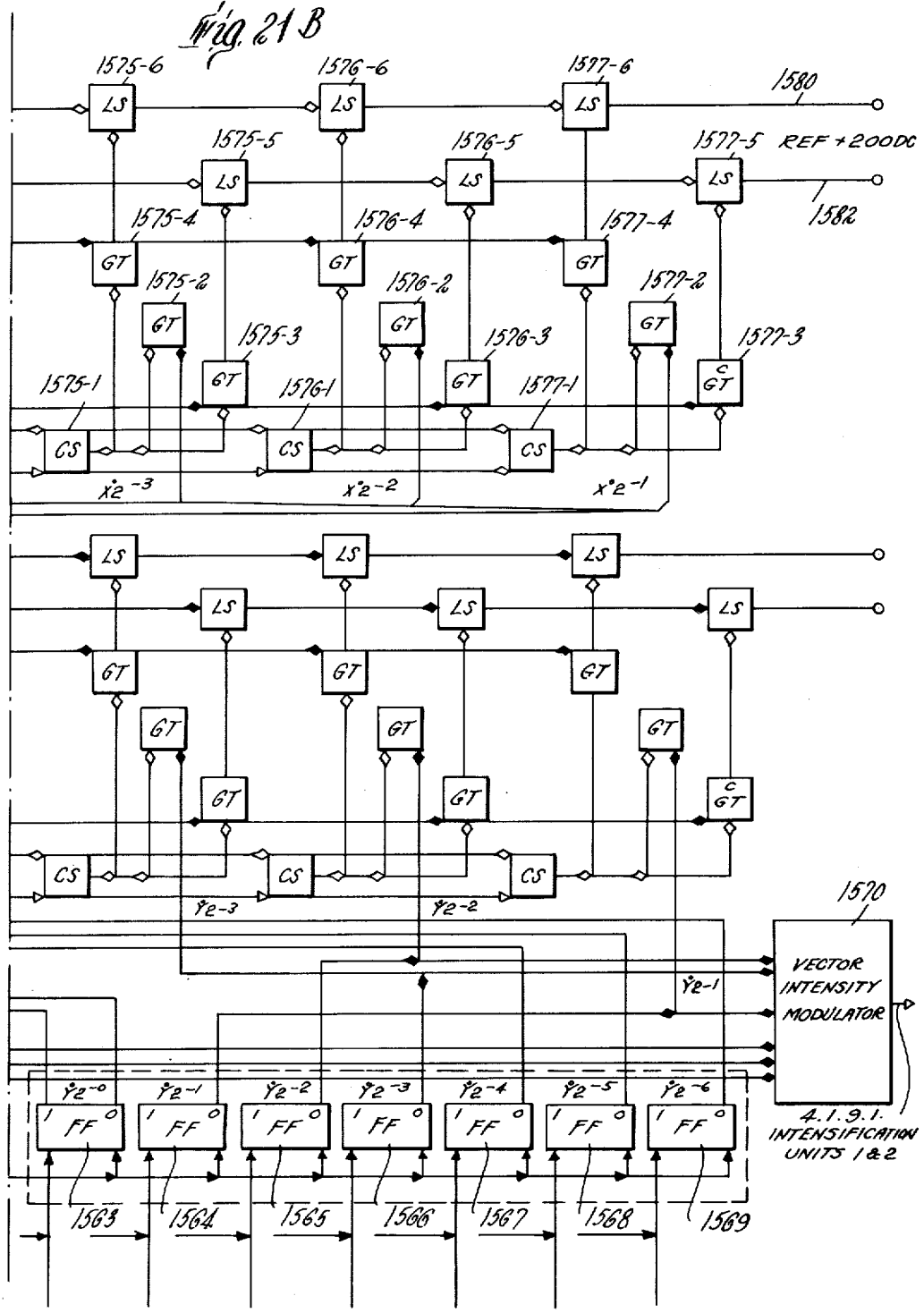

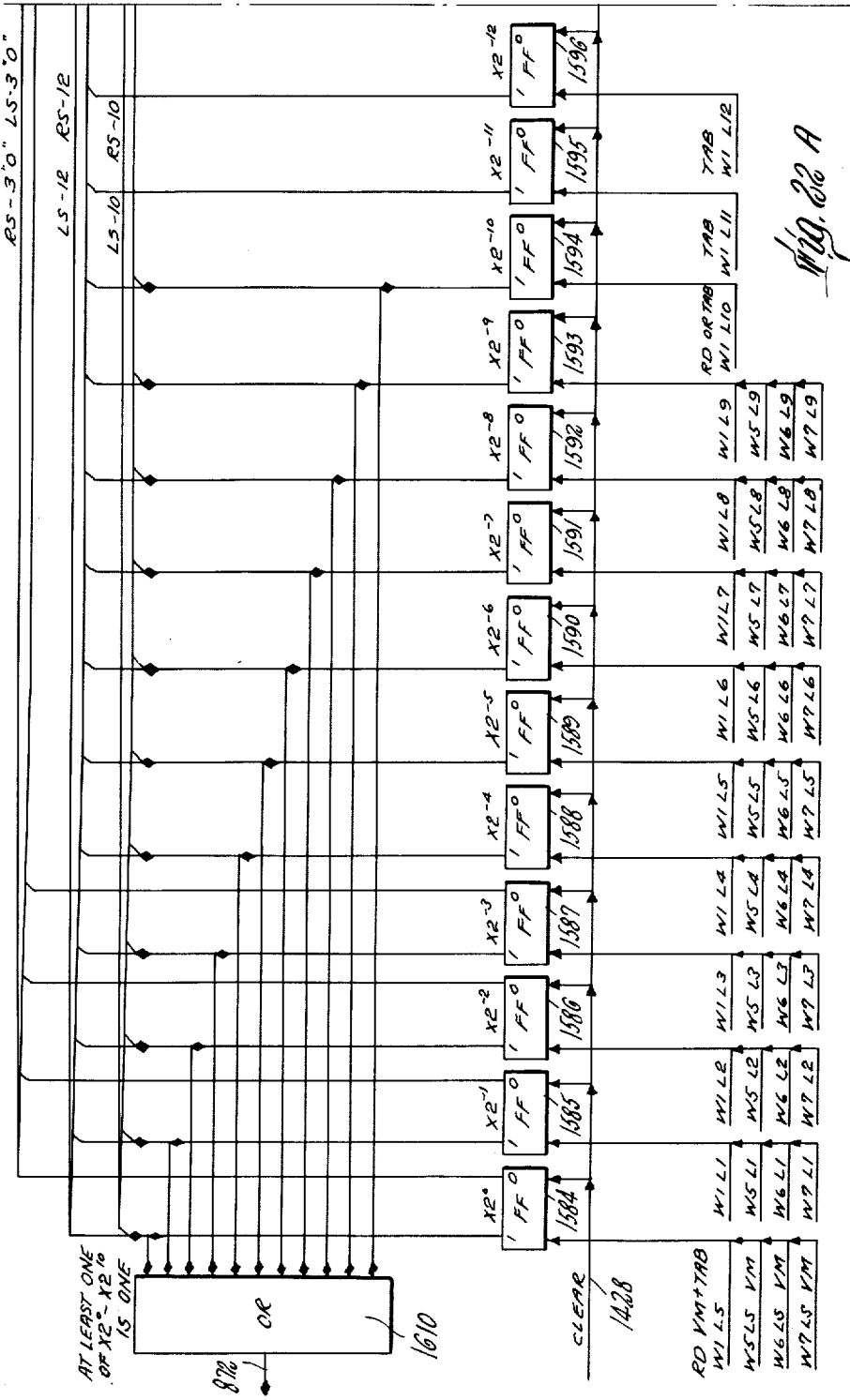

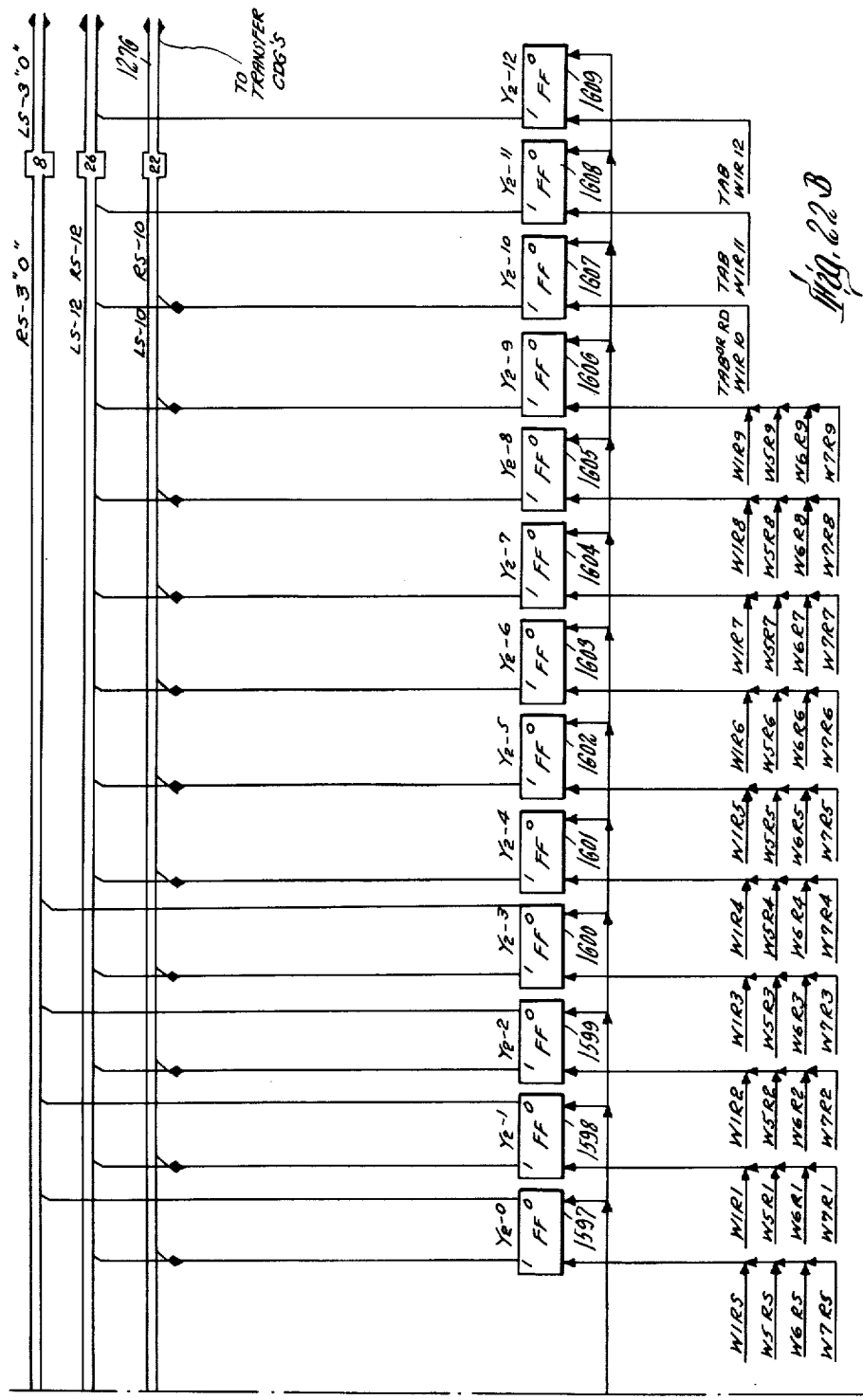

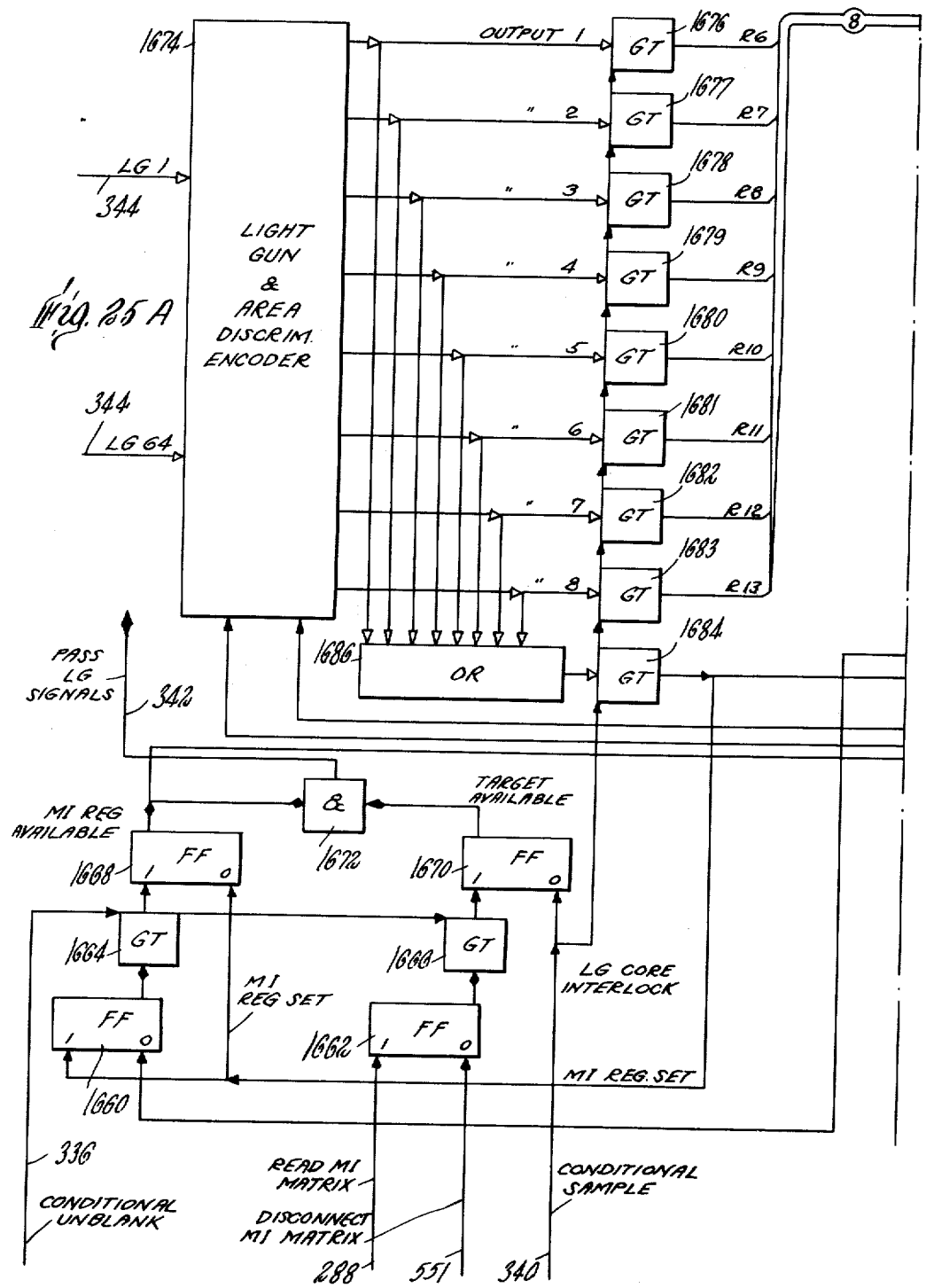

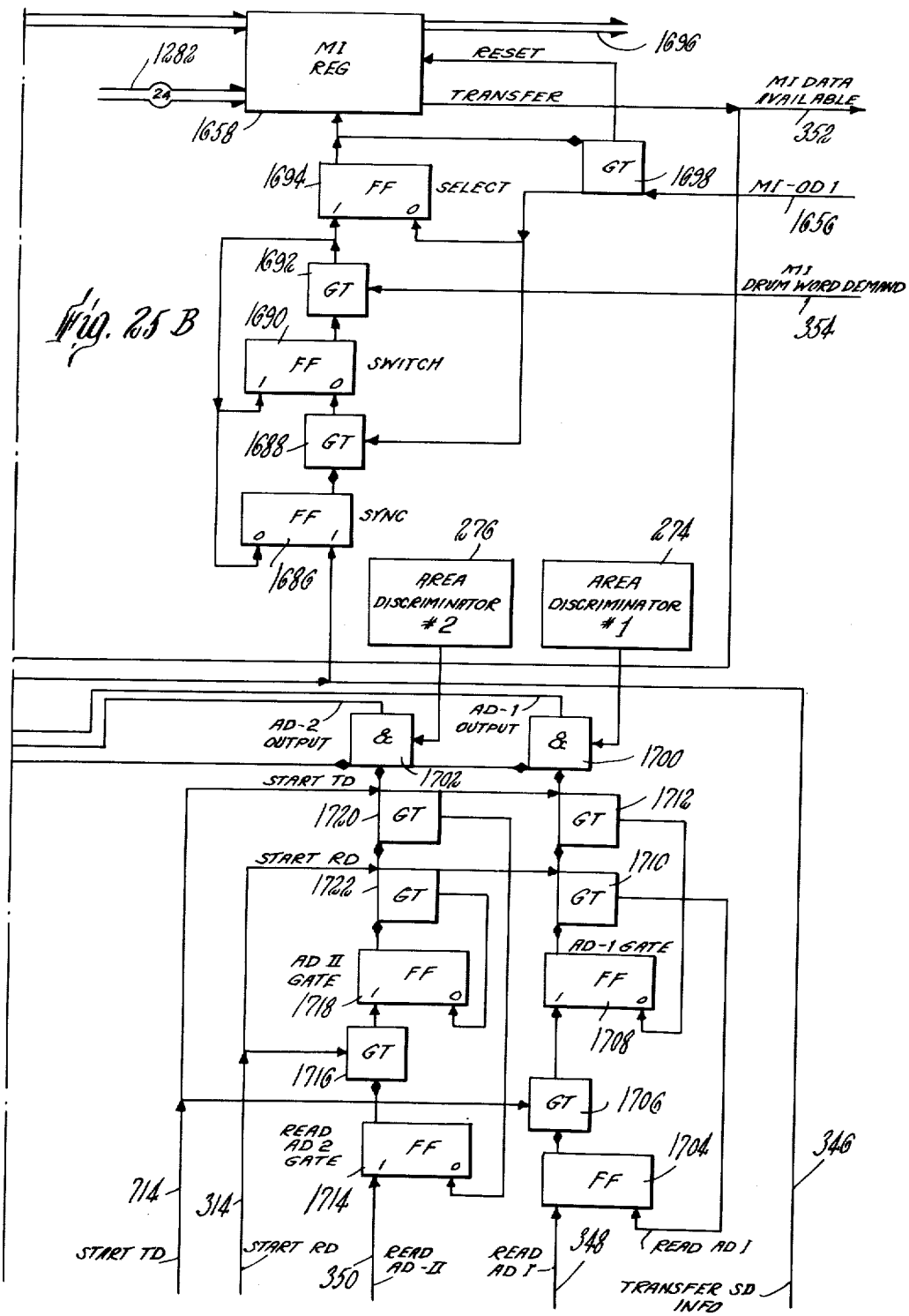

United States Patent Office 3,037,192
Patented May 29, 1962

3,037,192
DATA PROCESSING SYSTEM
Robert R. Everett, Reading, Mass., assignor to Research Corporation, New York, N.Y., a corporation of New York
Filed Dec. 27, 1957, Ser. No. 705,594
13 Claims. (Cl. 340—172.5)

This invention relates to the operation and control of high speed electronic digital computers. More particularly the invention concerns means for improving the operation and control of such computers through an increase in the facility, speed and flexibility with which their operations may be altered or enlarged, as a need appears from information which they have already processed.

The development of the speed and programming diversity of digital computers, particularly those of large scale, has outstripped the development of controls by which their immense capacity may be continually redirected into desired channels. In general, such redirection by available means has been a painfully slow process, incapable of meeting the demands of a rapidly changing situation which it is desired to control with the aid of computer-generated information. By the time a new request may be given and executed, a critical need for new information may have passed and gone unfilled. Further, such request has often required interruption of an existing program with consequent loss of other desired information while the new request is answered.

Accordingly, it is the object of this invention to provide novel control means for such computers by which program alterations are greatly speeded and facilitated, thereby increasing their capacity and utility.

In carrying out this objective, the invention utilizes a digital computer which normally operates cyclically, that is, it repeatedly performs certain operations on incoming data according to a given program written in its memory until otherwise directed. This program, however, includes at least one so-called sense instruction which the computer executes during each cycle and which may, depending upon the condition sensed, cause the computer to alter its program. Desired information resulting from the computer operation is visually displayed either directly as it is generated or preferably through an intermediate buffer storage system, but in any event promptly after it is generated. Preferably, this display is by cathode ray tube from buffer storage and includes provision for repeated display. This display of computer-generated information, along with an aimable sensing device, is used as a means of instructing the computer. The operator monitoring the display points the sensing device at an item of the display such as a dot or code symbol about which some action is to be taken. By sensing this item, the sensing means identifies it to the computer, such as by returning to the computer stored positional data by which the component was located in the display. At the same time, by means of manually selected switches, requests are sent to the computer for an action to be taken concerning the item which has been identified. The sense instruction causes the computer to examine the identification and follow the new request.

Accordingly it is possible to render the computer readily and almost instantly responsive to varying requirements as desired on the basis of what it is displaying, thus permitting the exercise of effective control of a complex and rapidly changing situation which is being displayed on the basis of the computer processed data. The invention may be effectively used wherever it is desirable to provide rapidly variable program alterations for a high speed digital computer on the basis of monitored computer output, such as air traffic data, which is the particular data to be used for illustration in the ensuing description of a preferred embodiment.

Other objects of the invention will be pointed out in the following description and claims and illustrated in the accompanying drawings, which disclose, by way of example, the principles of the invention and the best mode which has been contemplated of applying those principles.

In the drawings:

FIGURE 7 (A-B) is a schematic diagram in logical block form of the RD Read Control circuitry shown as block 266 in FIGURE 2;

FIGURE 8 is a schematic diagram in logical block form of the Timing Pulse Switch shown as block 268 in FIGURE 2;

FIGURE 9 is a diagram of the bit layout of the RD message;

FIGURE 10 illustrates the form of the RD message display as utilized in the preferred embodiment;

FIGURE 11 is a diagram of the bit layout of the TD tabular message;

FIGURE 12 illustrates the content of the tabular message character format and shows that format as it may appear relative to the single vector of that message;

FIGURE 13 illustrates possible locations of the character format of a tabular message with respect to the single vector;

FIGURE 14 is a diagram of the bit layout of a TD vector message;

FIGURE 15 illustrates the content of the vector message character format and shows that format as it may appear relative to the fourth vector of that message;

FIGURE 16 illustrates the locations of the vector message format with respect to the fourth vector of that message;

FIGURE 19 is a schematic diagram in logical block form of the RD Control circuitry shown as block 1188 in FIGURE 18;

FIGURE 22 (A-B) is a schematic diagram in logical block form of the Message Positioning Register shown as block 128 in FIGURE 18;

FIGURE 24 is a diagram of the bit layout of messages which are transferred from the Manual Input Element to the Manual Input Drum;

FIGURE 25 (A–B) is a schematic diagram in logical block form of the Manual Input Element shown as block 144 in FIGURE 2; and FIGURE 26 indicates the arrangement of the drawings for each figure where more than one sheet is utilized. For example, FIGURE 2 consists of four sheets of drawings A–D which are related to one another as indicated in this figure.

CONVENTIONS EMPLOYED

Figure 1:
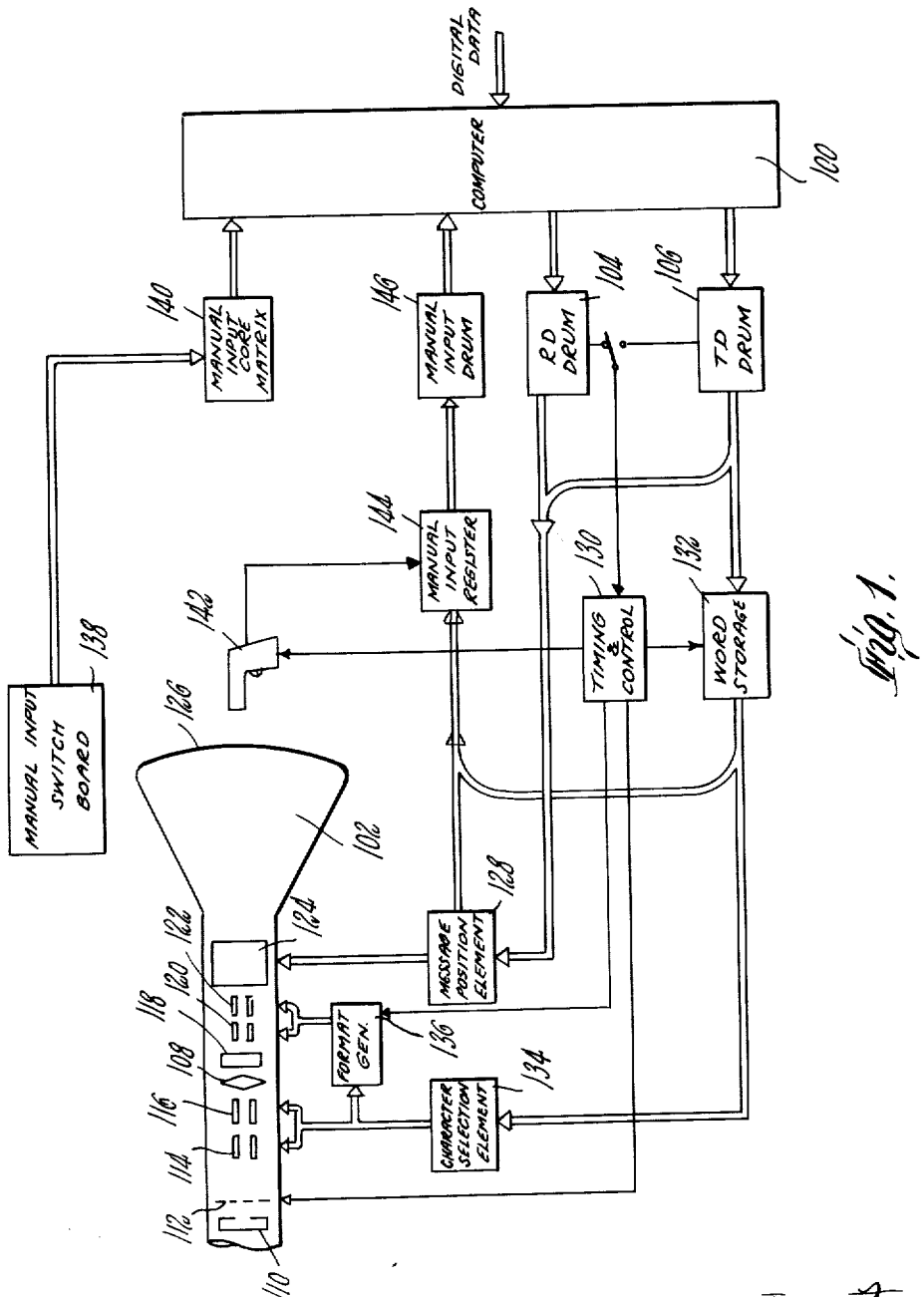
FIGURE 1 is a simplified block diagram of a data processing system incorporating certain principles of this invention.

Throughout the following description and in the accompanying drawings there are certain conventions employed. Information concerning these conventions is as follows:

In the block diagram figures of the drawing subsequent to FIG. 1, a conventional filled-in arrowhead is employed on lines throughout the drawing to indicate (1) a circuit connection, (2) energization with standard positive pulses and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a non-standard pulse generally having a duration considerably longer than the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the lines of that cable convey information at different times or (2) that those lines are D.C. level conductors. The numbers appearing within the circle or the rectangular box of a cable indicate the numbers of conductors within the cable. The D.C. levels are on the order of 10 volts when positive and 30 volts when negative, whereas pulses indicated by conventional filled-in arrowheads are positive-going 1/10 microsecond, half-sine 20 to 40 volts in amplitude. Pulses indicated by conventional un-filled-in arrowheads are not necessarily sinusoidal, but are usually pulses considerably longer than 1/10 microsecond in duration and are in general on the order of 1 to 10 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block, and the input conductor is electrically connected to the output conductor of the adjacent corner.

Bold face character symbols appearing within a block symbol identify the common name for the circuit represented, that is, FF identifies a flip-flop, GT a gate circuit OR a logical OR circuit, and so forth.

REFERENCES

Certain copending applications, some of which will be referred to in the following material, contain additional information about certain details of the described circuitries and associated equipments. It is believed that the following description fully and clearly describes the details of the preferred embodiment of the invention and the manner of making and using it in such forms as to enable one skilled in the art to make and use the same. In the interest of the conciseness and clarity of the instant description certain details, not believed necessary to a comprehensive understanding of the preferred embodiment, have been omitted. Information relative to these details may be obtained from the following copending applications which are hereby incorporated into the specification by reference:

Copending patent application "A," Serial No. 494,982, entitled Magnetic Data Storage, filed March 17, 1955, in the name of Hawley K. Rising et al., issued as Patent No. 2,988,735 on June 13, 1961.

Copending patent application "B," Serial No. 592,905, entitled Light Gun Assembly, filed June 21, 1956, in the name of Ralph G. Mork, issued as Patent No. 2,915,643 on December 1, 1959.

Copending patent application "C," Serial No. 595,993, entitled Digital to Analogue Decoder Circuits, filed July 5, 1956, in the name of Henry E. Zieman and Julius I. Woolf, issued as Patent No. 2,970,306 on January 31, 1961.

Copending patent application "D," Serial No. 603,035, entitled Digital Analogue Multiplier, filed August 9, 1956, in the name of Henry E. Zieman and Julius I. Woolf, issued as Patent No. 2,966,302 on December 27, 1960.

Copending patent application "E," Serial No. 612,269, entitled Signal Storage System, filed September 26, 1956, in the name of M. Astrahan et al.

Copending patent application "F," Serial No. 674,198, entitled Digital Expansion Circuit, filed July 25, 1957, in the name of Robert H. Gerhardt issued as Patent No. 3,011,164 on November 28, 1961.

In the description a simplified embodiment illustrating certain salient principles and features of the invention will intially be described. The general arrangement of the apparatus of a preferred embodiment of this invention will then be described with respect both to the manner in which the various circuit components and apparatus are interconnected and in respect to the general over-all operation which is performed by these components and apparatus. The description of the general arrangement will be followed by separate and detailed descriptions of the various components and apparatus, which so require it, and each section of the description will have a heading which indicates the apparatus about to be described. The following is an Index or Table of Contents of the description:

INDEX

| | Column |
|---|---|
| System Outline | 4 |
| Overall System Organization | 7 |
| Overall System Operation | 15 |
| System Subcircuitries | 21 |
|     Input-Output Control | 22 |
|         Computer Reading Operations | 23 |
|         Computer Writing Operations | 27 |
|         Miscellaneous | 30 |
|     TD and RD Drum Timing Circuits | 30 |
|     TD Read Control Circuitry | 31 |
|     RD Read Control Circuitry | 33 |
|     Timing Pulse Switch | 36 |
|     Layout and Display Form of Messages | 36 |
|     Situation Display Control | 37 |
|     Display Circuitry | 43 |
|         RD Control | 50 |
|         Format Generator | 51 |
|         Vector Generator | 54 |
|         Message Positioning Register | 56 |
|         Transfer Circuits | 56 |
|     Manual Input Element | 57 |

SYSTEM OUTLINE

There is shown in FIG. 1 a block diagram which out-lines the system, according to the invention, from a functional standpoint. With reference to FIG. 1, it will be observed that information in the form of digitally coded data is entered into a Computer 100, whose function it is to process the data and to translate it into a form suitable for display on a shaped beam cathode-ray tube 102. The flow of data to the Computer may be essentially continuous to reflect, for example, the air traffic situation in a given geographical area on the basis of radar returns and other data. The Computer itself is adapted to operate at a relatively high speed and has a stored program whereby various arithmetic operations are specified and cyclically performed on the data. Thus, the Computer may be programmed to correlate positional data on the basis of the radar returns and to re-reference the data geographically. Data having been processed in this way is transferred from the Computer to a drum 104 where it is stored temporarily before being displayed.

Other Computer operations involve the maintenance of tracks of certain objects and the derivation, in the course of the tracking process, of information with regard to their speed and heading. Computed data of this kind is transferred to a Track Data Drum 106 for ultimate display along with the data stored on the Radar Data Drum 104. Whereas the data stored on the latter drum, that is radar data, consists primarily of digitally coded XY coordinates to specify individual target locations in the field of the display, the track data consists also of decimal numbers, letters, and symbols, selected in accordance with a predetermined digital code.

Cathode ray tube 102 is adapted to reproduce characters visually, as well as spots and lines, by virtue of the provision therein of a character matrix 108 adapted to shape a beam of electrons into selected characters. The beam of electrons to be shaped is originated by an electron gun 110 and is controlled in intensity by a grid 112. Between the grid 112 and the character matrix 108 are a pair of vertical character selection plates 114 and a pair of horizontal character selection plates 116 whose function it is to deflect the beam electrostatically so that it will be intercepted by a particular character of the matrix according to the deflection voltages applied to the plates. Once the beam has passed through the character matrix a convergence coil 118 and a set of compensation plates 120, 122 serve to redirect its path along the axis of the tube, or very nearly so. To this end, the voltages applied to the compensation plates 120, 122 are made to depend on the deflection voltages applied to the character selection plates 114, 116 since the amount of re-direction which must be accomplished will be dependent upon the initial off-axis deflection required to "aim" the beam at a particular character on the matrix 108. The voltages applied to the compensation plates are also made to depend upon the operation of a Format Generator 136 to be described hereinafter. Finally, there is provided a main deflection yoke 124 whereby the position of a selected character may be established on the face 126 of the tube. As aforementioned, the display is in rectangular coordinates so that both X and Y voltages are applied to the deflection yoke 124 to produce the desired location of a character or spot, as the case may be.

The primary function of the drums 104, 106 is to perform a time buffering action between the individual processes of computation and display. The reason for their use is that the time required to display the computed data is substantially greater than that necessary to make the computations. In accordance with the present invention, therefore, the Computer is programmed to perform other kinds of operations besides those involved in the display, which is generated by the process of reading from the two drums alternately. Provided on the drums are timing channels to appropriately sequence the reading operation and at the same time to control various other units adapted to translate the digital data from the drums into signals appropriate to the control of the cathode ray tube 102. The drums are written-on by the Computer in the address mode (the data is written on pre-selected locations on the drums) to provide a basis for distinguishing the relative age of the data, and the drums are read in a fixed pre-selected pattern. By means of this pattern, the individual reading operations are caused to take place at intervals substantially greater than the time intervals that would be involved in a consecutive register-by-register reading process so as to compensate for the display generation speed which is slow even in comparison to the drum operations.

In the process of generating a radar display, various units indicated collectively as a Message Position Element 128 serve to store the XY coordinates of targets one at a time, and to convert the digital XY information into analogue voltages suitable for driving the deflection yoke 124. A Timing and Control Unit 130 responsive to the timing channels of the Radar Data Drum is utilized to control these various units, one specific function of the Timing and Control Unit 130 being to pulse on the intensity grid 112 at the appropriate point in time commensurate with the internal operations of the message position element. Another function of the Timing and Control Unit is to specify one of several spot-like symbols on the character matrix by appropriate control of the voltages to be applied to the character selection plates 114 and 116.

Generation of the display of track data is complicated by the fact that a fairly large number of characters are displayed as a group in order to provide information as to speed, heading and so forth of an object. For this reason, there is provided a Word Storage Register 132 to store temporarily the digital data transferred from the Track Data Drum as individual information units called words, and a Character Selection Element 134 to cause characters to be selected in accordance with the words. Each digital unit or word is adapted to specify a particular character of a message and the words to specify all such characters in a message are stored at one time in the Word Storage Element 132. It is the function of the Character Selection Element 134, on the other hand, to store one word at a time from word storage on signal from the Timing and Control Element 130, and to decode this word, that is convert it to analogue deflection voltages suitable for controlling the operation of the character selection plates 114 and 116. The position of each character is determined by two separate deflection systems, a first system being responsive to the Message Position Element 128 and the second being responsive to the Format Generator 136. In the first system, XY deflection voltages used to drive the yoke 124 remain the same throughout the display of all the characters or symbols in a message, the digital data to specify these XY voltages being transferred directly from the Track Data Drum 106 to the Message Position Element 128 in the manner of XY information associated with radar data. The other deflection of the beam is accomplished by means of the Format Generator 136 whose output voltages are applied to the compensation plates 120 and 122 as aforementioned. One of the main functions of the Format Generator 136 is to produce an incremental step voltage output whereby each character in a message is caused to be displaced horizontally a relatively small amount with respect to the preceding character so that the characters will be displayed in a row, and also upon completion of a row to produce a small vertical deflection voltage to condition the system for the display of a second row, and so forth. Since the characters of each message are displayed in a fixed format consisting of a fixed number of rows and columns, it follows that upon the entry into Word Storage 132 of a group of words representing a new message to be displayed, the Format Generator 136 need only be adapted to begin anew the generation of voltage increments or steps according to a fixed pattern, on signal from the Timing and Control 130. In other words, the deflection yoke 124 serves to position the entire message on the display field 126 whereas the Format Generator 136 serves to position the individual characters within the format of the message.

According to the invention, there is provided apparatus for manually intervening in the program of the Computer 100 while it is operating, on the basis of the results of the computations having been made by the Computer 100 and displayed by the tube 102. To aid in accomplishing this result, there is employed a Manual Input Switchboard 138 having a plurality of switches whose positions determine the states of a plurality of cores in a Manual Input Core Matrix 140. A request for a particular action to be taken by the Computer in connection with information it has generated as a symbol (or symbols) in the display can be made by specifying the request and specifying the displayed symbol. The switches on the Switchboard 138 are adapted to specify the request according to the manner in which they are set up. To designate a particular symbol of the display there is provided a light gun 142. In essence, the light gun 142 comprises an aimable photocell which is responsive to the light from such symbols or characters only for a brief interval when they are initially made luminous, at which time their light intensity is high and their color distinctive. In fact, light gun 142 is only enabled during this time by the Timing and Control Element 130.

The response of the light gun, assuming it is properly aimed at a particular symbol and the trigger is pulled, takes the form of a pulse which is adapted to cause the Manual Input Register 144 to copy the contents of the Message Position Element 128 or the Word Storage 132, depending on the type of message involved, and ultimately to transfer the contents to the Manual Input Drum 146. What will be held in the Manual Input Register 144 and read to the Drum, then, is the digital information which specifies the XY location, or some of the characters of the message, that the light gun sees. The same digital information is adapted to designate that particular spot or message to the Computer as the one to which the new request relates. That is to say, the Computer is programmed to read off the Manual Input Drum periodically and also to read the contents of the Manual Input Core Matrix 140. The latter may be regarded as a temporary storage medium for information in the nature of instructions to be executed with respect to the data on the Drum. Thus the Computer can very quickly be requested to take action on a specific item of data simply by setting up the Switchboard in appropriate fashion, pointing the light gun at the item, and pulling the trigger.

OVERALL SYSTEM ORGANIZATION

Figure 2B:
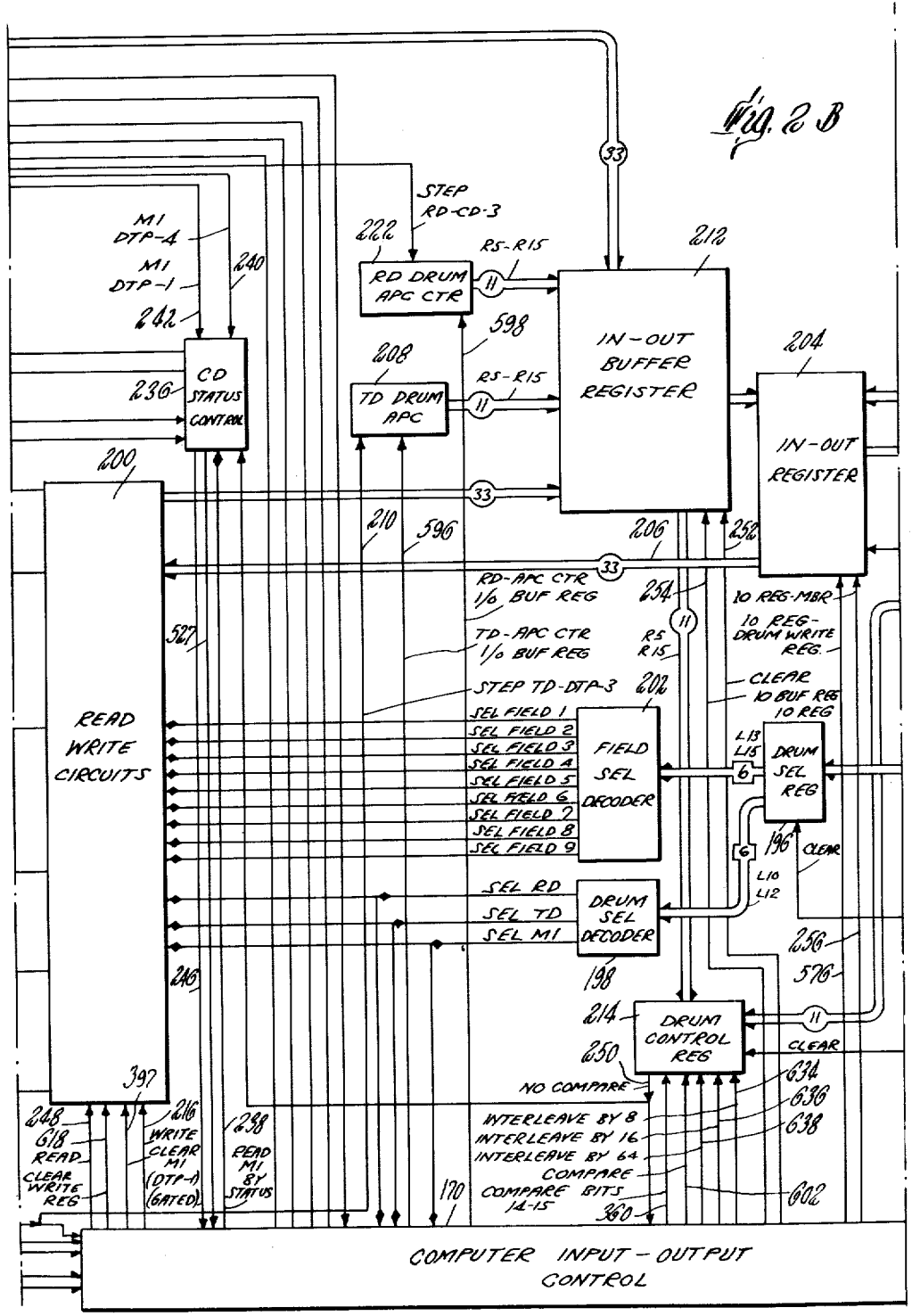
FIGURE 2 (A-D) is a schematic diagram in block form of the preferred embodiment of a data processing system illustrating certain of the principles of the invention.

A somewhat more comprehensive block diagram of the system according to the invention is illustrated in FIGS. 2A through 2D. With reference first to FIG. 2A which deals primarily with the Computer 100 employed in the system, it will be observed that the numeral 148 designates a High Speed Memory element. Memory element 148 is a digital information storage device whose function it is to store, at least temporarily, all incoming data to be processed by the Computer, together with a program of instructions to carry out the desired processing of the data. Each instruction consists of thirty-three binary bits known as a "word," including a checking or parity bit.

The first or left half of an instruction word is utilized to specify in coded fashion the operation to be performed in the computer, whereas the second or right half of the instruction word is usually used to indicate the location in Main Memory 148 of the operands on which the specified operation is to be performed. Individual operands consist of thirty-three bit words also. Each word is transferred as a unit to or from Memory element 148 over thirty-three parallel lines, the actual storage function being performed by a three-dimensional array of magnetic cores together with appropriate selection circuitry whereby a selected group of thirty-three cores comprising a word may be addressed.

Another important element of the computer as illustrated in FIG. 2A is the Program Address Counter 150. As is well known to those skilled in the art, this is a device to retrieve successive instructions from Memory 148 in the same order as they appear in the program, and to initiate execution of the individual instructions one after another. Basically, the Program Counter 150, as it is generally called, consists of a counting register which is advanced one step after the execution of each instruction is begun, and which is read out after the execution has been completed. As a result of this read-out process, the contents of the Counter 150 are transferred to the Main Memory element 148 for selection of the next succeeding instruction. Since successive instructions are stored in consecutively numbered addresses in Main Memory, beginning with zero ordinarily, it follows that the count in the Counter 150 will correctly reflect the progress of the program. When the last instruction has been executed, thereby completing the program, the Program Counter is cleared and the program repeated in a cyclic manner.

Closely associated with the Memory element 148 is a Memory Buffer Register 152 for temporary storage of all words to be read into or out of Memory. As is apparent from the mode of connection of Buffer Register 152, this element is adapted to exchange word information with a number of units in the Computer, as are selectively determined by the program of instructions. Buffer Register 152 is also utilized to re-enter word information in Memory element 148 following an information transfer therefrom. The reason is that oftentimes it is necessary to retain in Main Memory information such as program instructions which could not be done otherwise because the read-out process of the cores in Main Memory is destructive.

In addition to the Memory Buffer Register 152, the Computer embodies an Operation Register 154, an Address Register 156, and an Index Interval Register 158, which are designed to serve as simple storage registers and which are distinguishable primarily on the basis of the type of information contained therein. What these registers store is specific portions of an instruction word having been received from the Memory Buffer Register 152. Thus, the Operations Register 154 is used for the ten of sixteen bits in the operations portion of an instruction word. The Address Register 156 is for the sixteen bits in the address portion of an instruction word which specify the location in Main Memory of the operand to which the operation has reference. Finally, the Index Interval Register 158 is utilized for six bits in the operations portion of a word which by their arrangement may be adapted to designate a particular storage unit external to the Computer with which information is to be exchanged. For example, when it is desired to read out data having been processed by the Computer, the unit to which the data is to be transferred will be specified by the six bits held in the Index Interval Register, hereinafter referred to as index interval bits. Another function of the index interval bits is to specify one of three modes of interleaving when reading or writing on certain magnetic storage drums to be described hereinafter.

Coupled to the Operations Register 154 is an Instructional element 160; wherein various signaling pulses are produced as required to execute the operations specified by the operational code bits. To this end, there is included in the Instruction Control element 160 a decoder for the operational code, pulse generating circuitry to produce pulses at uniform intervals, and various logical switching circuits responsive to the decoder to apply the pulses to appropriate units of the Computer, and in appropriate sequence to cause the instruction to be executed. By way of example, one such pulse is applied over a line 162 labelled "Address Register to High Speed Memory."

Its function is to cause just such a transfer to the contents of the Address Register 156 whereupon the corresponding operand will be selected and transferred to the Memory Buffer Register 152. Another example of an output pulse from the Instruction Control element 160 is that which is adapted to transfer an operand from the Memory Buffer Register 152 to the Arithmetic element 164 of the Computer. Pulses of this nature are generally referred to as command pulses because of their function, and the lines over which they are supplied are generally referred to as command lines. Thus it will be observed that one of the lines 166 between the Instruction Control element 160 and the Memory Buffer Register 152 has been labelled "Memory Buffer Register to Arithmetic Element." Still another example of a command line is the line 168 labelled "Address Register to Program Counter" over which a command pulse is supplied from the Instruction Control element to the Program Counter. The reason for this latter pulse is that at certain points throughout the program it may be desired to alter the sequence of program instructions as by skipping a number of them. When an operation of this kind is to occur, generally the address portion of the instruction word is used to specify the address of the next instruction to be executed instead of its being specified by the next succeeding instructional address. This is known as branching and is accomplished by replacing the contents of the Program Counter 150 with the address portion of the branch instruction whereupon the succeeding instruction obtained from Main Memory will be as specified by the address code.

The control function of Input-Output Control 170 differs from that of the Instructional Control 160 primarily in that the former is concerned with the exchange of information between the Computer and external storage units, whereas the latter is concerned primarily with internal computer operations. In essence, Input-Output Control 170 consists of various logical circuits, certain of which, by way of example, are adapted to respond to the contents of the Index Interval Register 158 and its associated Decoder 172. It will be recalled that it is sometimes the purpose of these bits to specify a mode of interleaving on magnetic storage drums. One function of the Input-Output Control is to produce the specified mode of interleaving for reading or writing on a drum, thereby to effectuate this purpose of the index interval bits. The main function of the Input-Output Control, however, is to coordinate the internal operations of the Computer with an information exchange process. Because the Computer operates at a much faster rate than its associated external units with which information is exchanged, the arrangement is such that an exchange process and the computer program may be carried on simultaneously, except for the relatively brief interval of time that is actually required to insert or to extract a word from Main Memory 148. A feature of this type of exchange process is that the precise time for a transfer to or from Main Memory is determined when the appropriate external unit has been completely conditioned to provide the information or alternatively to receive the information. Thus the Computer need not wait for an external unit such as a drum even from one word to the next, but may go right along with its own program in the meanwhile. This is not to say, however, that the entire exchange process is initiated externally. Rather the commands necessary to initiate the exchange of a group of words original within the Computer is the result of an appropriate group of instructions in the program, and it is the transfer of the individual words within the group that is dependent on the readiness of an external unit. Its readiness is signaled by means of so-called break request pulses to which the Input-Output Control is responsive, all of which will be described more in detail hereinafter.

Completing the Computer, as it appears in FIG. 2A, is a block labelled "In-Out-Address Counter" 174 and a block labelled "In-Out Word Counter" 176. The function of the In-Out Address Counter is to provide main memory addresses for individual words to be transferred to or from Main Memory during the course of an information exchange process. To this end, the starting address, that is the address in Main Memory for the first word to be transferred, is placed in the In-Out Address Counter 174, the address having been obtained from the address portion of an instruction word which is employed to effectuate the exchange process. It then remains only to transfer the address to Main Memory where selection of the corresponding word takes place. An OR circuit 178 is illustrated in connection with this latter function, and the address itself is passed through another OR circuit 180. These OR circuits are merely illustrative of the fact that depending upon the type of computer operation involved, selection of a word for Main Memory may be based on an address found in the Address Register 156, the In-Out Address Counter 174 or the Program Counter 150.

The function of the IO Word Counter 176 is to count the number of words which are to be exchanged in an input-output process. Bits to specify the number of such words are obtained from the address portion of one of the instructions adapted to program this type of operation, and are entered in the 10 Word Counter by way of Address Register 156. After each word is transferred to or from the Main Memory element the count in the Word Counter is reduced by one on signal from the Input-Output Control. When the Counter reaches zero, the Input-Output Control is so notified, and as a result disables the circuitry which monitors requests for such word transfers.

Although there are many different types of storage units that are external to the Computer in the embodiment of the invention which has actually been reduced to practice, only the drum system, as illustrated in FIGS. 2B and 2C, will be discussed herein, since it will be appreciated as the discussion proceeds that more than this would be unnecessary to illustrate the principles of the invention. Accordingly, there is shown toward the right hand end of FIG. 2C three magnetic storage drums 104, 106 and 146, which are further designated by the letters MI for manual input, RD for radar display, and TD for track display, respectively. The designation TD has reference to one type of information that is derived in the Computer for display, and it is the function of the TD Drum 106 to act as a time buffer for this display information in the course of its transfer to the display system. To this end, there is provided on the Drum 106 an index track 188 which produces a pulse signal once for each revolution of the Drum to indicate that the starting drum address has arrived at a predetermined angular position. Adjacent the index track or channel 188 is a timing channel 190 adapted to produce a succession of timing pulses throughout each revolution of the Drum whereby the operations of various units both in the Computer and in the display system may be synchronized with the Drum. These timing signals also provide an indication of the progress that has been made in reading or writing on the drum in terms of an address by address count. Actually there are four distinct timing pulses that are produced from one drum register to the next as they pass a fixed point and these are called DTP1–4 corresponding to their order of occurrence as drum timing pulses.

The Drum 106 is arranged to store digital information in the form of individual words each consisting of thirty-three bits and accordingly there are provided on the Drum a relatively large number of uniformly angularly spaced registers each consisting of thirty-three spots arranged side by side. As is well known to those skilled in the art, a single circular array of such registers is generally termed a field and may be thought of as a related group of thirty-three adjacent information channels.

There are six such fields spaced lengthwise of the TD Drum as shown.

The TD Drum is selected to be written upon by one of the instructions in the group aforementioned having to do with the information exchange process, and in particular it is the index interval bits of this instruction which distinguish the TD Drum from the other drums in the system. Initially, these bits are held in the Index Interval Register but on signal from the Instruction Control Element they are transferred to a Drum Selection Register 196 and decoded by a drum selection decoder 198. The latter controls the operation of an element 200 labelled Read-Write Circuits such that the TD Drum is called into play. At the same time, certain of the index interval bits in this instruction serve to specify the field of the TD Drum 106 which is to be written upon. These bits are separately decoded by a Field Selection Decoder 202 which appropriately conditions the Read-Write Circuits 200 for writing upon the selected field. The words themselves are obtained from the Computer through an Input-Output Register 204 which is seen to be connected to the Read-Write Circuits element 206 by thirty-three parallel lines. These lines are adapted to transfer the individual bits of a word as a unit on signal from the Input-Output Control 170.

There is also provided, according to the invention, means to specify by address a particular register on the drum 106 into which the first word of a group involved in an exchange process is to be written. To accomplish this mode of reading or writing on the Drum, hereinafter referred to as the address mode, there is provided an Angular Position Counter 208 (APC) which is adapted to count successive registers on the Drum as they arrive at a predetermined angular position. Specifically, it is the number 3 drum timing pulse (DTP3) on line 210 that is employed to present the count of the drum addresses, and to step the Angular Position Counter in accordance therewith. The Angular Position Counter is reset once per revolution after all the addresses have been counted.

On signal from the Input-Output Control the contents of the Angular Position Counter are transferred to an In-Out Buffer Register 212 where they are held for comparison with the selected starting address on the Drum having been specified by the Computer. Actually, it is the address portion of an instruction word in the Computer which specifies the starting address, the same being transferred from the Address Register 156 to the Drum Control Register 214, where the comparison takes place. So long as this comparison fails, that is, each time the contents of the In-Out Buffer Registers are found to disagree with the contents of the drum control register, the fact of this disagreement is signalled to the In-Out Control which acts to suppress a write signal which would otherwise be applied to the Read-Write Circuit 200 on a line 216. When the proper comparison does occur, the failure of the Drum Control Register to indicate a disagreement will be taken by the Input-Output Control as an indication of the fact that a comparison has been made, whereupon a write pulse will be impressed upon the Read-Write Circuits by way of line 216. Thereafter, unless interleaving is specified, the remaining words will be written upon consecutively numbered addresses, the count of the words being kept by the In-Out Word Counter 176 as they are written. When the In-Out Word Counter reaches zero, indicating that the exchange has been completed, the input-output process is brought to an end by the Input-Output Control.

Another of the drums which is shown toward the right of FIG. 2C is the RD Drum 104. The RD Drum serves as a time buffer for radar display data just as the TD Drum does for the track display data. It has an index channel 218, a timing channel 220, and a number of data fields for the actual word information storage, there being nine separate fields in the case of the RD drum. The process of slecting the RD Drum from among the other drums and the process of writing thereon are carried out in the same general way as was described in connection with the TD Drum. The only unit which is peculiar to the RD Drum in FIG. 5B is a radar drum Angular Position Counter 222 to indicate its angular position register by register. The reason for having separate angular position counters for each drum in that the drums are not drive in synchronism.

The make-up of the Manual Input Drum 146 shown directly above the RD Drum is somewhat different from the RD or TD drums on account of the unique function which it performs, namely, to transfer to the Computer manually initiated requests for addition information. Besides an index channel 224 and a timing channel 226, the Manual Input Drum has so-called OD and CD status channels 228 and 230, respectively. Each of these status channels is similar to one of the bit channels in a data field in that a corresponding number and arrangement of spots are provided thereon. A word appearing in one of the registers of the data field is caused to be read out from the Drum only if the corresponding spot in the CD status channel contains a "one" as sensed by a read head 232. A "one" is written in the corresponding spot of the CD status channel as each new word is deposited on the Drum. It follows therefore that in this mode of reading, which is called the status mode, only newly written information is read out. The starting address for reading is random in nature and there is no special sequence in which the registers are read. When a particular register is read and the word contents thereof are accepted by the Computer, a "zero" is written in the corresponding spot in the OD status channel by a write head 234, which serves to indicate to the write circuit that new information may now be written over the old.

To accomplish this so-called status mode of control, there is provided a CD Status Control Element 236 which is initially enabled by a signal from the Input-Output Control on a line 238, and which is operatively timed by means of drum timing signals from the timing channel 226 applied over lines 240 and 242 by way of an MI Timing Circuit 244. When the proper status appears, as represented by a "one" in the CD status channel, the CD status Control so notifies the Input-Output Control (by a signal on a line 246) which in turn directs the Read-Write Circuits to read the contents of the corresponding drum register into the IO Buffer Register 212. Before the word is transferred to the computer Main Memory, however, a further condition is generally required to be met, namely, that certain so-called identity bits in the address portion of the word are in agreement with corresponding bits contained in one of the instructions associated with the initiation of the read-out process. These later bits are transferred from the Computer Address Register to the Drum Control Register where the comparison is made in much the same manner as was discussed in connection with comparisons of addresses in the address mode of drum operation. Thus, if the identity bits in the IO Buffer Register do not agree with those held by the Drum Control Register, the fact of this disagreement will be signalled to the Input-Output Control by a no-compare pulse. As a result, the word will be discarded by clearing the IO Buffer Register and at the same time writing a one in the OD status channel 228 to indicate that the word should not be written over since the Computer may want to accept it at some later time. On the other hand, if it is found that the identity bits agree, the Input-Output Control will effect a transfer of the word to Main Memory by way of Input-Output Register 204 and Buffer Register 152.

With reference now to FIG. 2C alone, the process of reading from the TD Drum 106 and RD Drum 104 will now be described. Thus, the bits of a word having been written on a drum are read-out as a unit and this read-out process is accomplished by means of an element 258 labeled OD Read Circuits. In the process of reading from the TD Drum this element is under the control of a TD Read Control element 260 which automatically sequences the reading of the fields and also the individual registers within a field according to a pre-established pattern. Specifically, the fields are read in order, one entire field after another, and the individual registers are read in a precessed pattern. In any particular field, reading begins with a first group of consecutive registers after which several such consecutive groups are skipped before the reading of a group again proceeds. This process continues until slightly less than a full revolution of the Drum has occurred at which time the read process is begun with an earlier group of registers, that is, with the group next preceding the group which was read at the beginning of the initial reading cycle. Accordingly, a plurality of drum revolutions will be required to complete the reading of an entire field which in effect slows down the information transfer process from the Drum to the display system. It follows that the Read Control 260 must be synchronized with the angular movement of the Drum so that throughout the precessed pattern of reading, the Read Circuits will be enabled at the precise instant that the next succeeding register specified by the pattern passes beneath the Read Head 192. As shown, synchronization is obtained by means of the drum timing pulses which are obtained from a TD Drum Timing Circuit element 262 where they are developed in response to the timing channel of the drum.

The RD Drum 104 has a similar timing circuit 264 and also a Read Control 266 which is adapted to produce a slightly different pattern of reading than in the case of the TD Drum. Briefly, fewer registers are skipped between reading operations since the type of information stored on the RD Drum requires less time to display. Also, only eight of the nine fields on the RD Drum are read during any one cycle, so that the remaining field may be written upon while the reading process proceeds. To permit the display of the oldest RD information first, and the latest last, the number of the field selected to be read first in any one cycle is caused to change periodically on command from the Computer depending upon the field last written upon by the Computer. In other words the fields of the RD Drum are ordinarily read in a regular precessed pattern similar to that of the individual registers except that precession proceeds on a field by field basis rather than by groups of fields.

The RD and TD Drums are read alternately, the one on signal from the other, when its current reading cycle has been completed. At this time a Timing Pulse Switch 268 is actuated to channel to the display system the drum timing pulses associated with the drum then to be read. The drum timing pulses are used in the display system to co-ordinate various internal operations therein with the operation of the drum, as is required by the fact that the drums themselves operate asynchronously.

In FIG. 2D are shown the basic components of the display system itself. Thus, information in the form of digital words being transferred from the TD or RD Drums is gated into a unit 270 which is labeled Temporary Storage and Distribution of Information to CRT displays. From there the information is distributed among the Display Consoles 272, two of which have been illustrated by way of example. Each display console 272 is provided with a shaped Beam Cathode Ray Tube (CRT) to visually present the information, as was discussed heretofore in connection with FIG. 1. Translation of digital words into signals appropriate for generating a representative display in the CRT 102 takes place in part in the Display Consoles 272 and in part in Block 270.

Associated with the Consoles 272 are the Light Guns 142 whose function it is to identify a particular item having been displayed, according to its position in the display field 126 so that the Computer may know precisely what a manually initiated request has reference to. It will be recalled that such a request may take the form of an order for supplementary information, the order being "spelled out" by a console operator according to the manner in which he has set up a number of switches on his switchboard. In addition to the light guns 142, other photoelectric devices are provided to selectively act on the displayed items. These are called Area Discriminators and bear the numeral designations 274 and 276 in FIG. 5D. The Area Discriminators 274, 276 are similar to the consoles 272 but have associated therewith instead of Light Guns 142, apparatus in the nature of continuously enabled light guns which are focused on fairly large portions of the display field 126. Area Discriminator 274 is adapted to monitor one portion of the display field, and Area Discriminator 276, another. In this way, certain computer operations which would not take place otherwise may be initiated automatically depending upon the character of the display and the portions thereof which have been selected for monitoring by the area discriminators.

With reference now to FIGS. 2C and 2D together, it will be observed that signals from the photoelectric devices indicating the presence of display items on the basis of their luminescence, and digital signals from block 270 from which the display item was derived, are passed to a Manual Input element 278. The signals from the individual photoelectric devices, and in particular the Light Guns 142, provide a means whereby the consoles 272 may be identified so that requested information can be routed back to the console where the request originated. The latter signals, that is those from the element 270 serve to identify the item itself. The function of the Manual Input element in turn is to control the transfer to the Manual Input Drum 146 of a code representing the identity of each light gun 142 when it is actuated, together with the identifying digital information from element 270 for items having been selected by means of the light guns 142. The transfer of this type of information to the MI Drum is adapted to take place immediately in the status mode as soon as the information is received. Accordingly, each time a zero appears in the OD status channel 228, as sensed by a read head 280, a Write Status Control 282 will signal the Write Circuits to cause the information to be written on the Drum 146. In this regard, it will be recalled that a zero is written in the OD status channel by the CD Status Control 236, whenever the corresponding word has been accepted by the Computer. Hence, new information from the Manual Input element will be written over the old, and at the same time a one will be written in the corresponding CD status channel spot by a write head 284. In this way the Computer is alerted to the fact that the information is new and should be read off the Drum in the course of the next information exchange process. In accordance with the invention, such exchanges with the MI Drum are adapted to take place periodically, provided of course that information is available. Thereafter, the Computer is also programmed to read the Manual Input core Matrix 140 which stores individual requests from the console operators. The Manual Input Matrix consists of 128 rows of magnetic cores, there being thirty-two cores in each row. Each console switchboard is adapted to control the states of a pre-assigned group of cores in the Matrix. Whenever the Computer is in condition to accept requests, ordinarily the entire contents of the Matrix is pulsed out a row at a time by means of a Manual Input Matrix Control element 286. As in the case of the Read-Write circuits for the drums, the Manual Input Matrix Control is made active on signal from the Input-Output Control 170 which, it will be recalled, is primarily responsible for the development of signals to coordinate in-out processes with the internal operations of the Computer. In the Computer, only the groups of bits from the Matrix which actually represent requests are acted upon. These are signified by the senses of certain bits in each group which may be regarded in the nature of status bits. Some of these bits, or more particularly the states of the cores in the Matrix from which they are derived, are controlled by individual switches on the console switchbards and certain others are controlled by the light gun trigger switches.

OVERALL SYSTEM OPERATION

The over-all operation of the system, or at least an exemplary mode thereof, will now be described in connection with FIGS. 2A through 2D. Typically, the Computer will be processing data according to its stored program, and the Main Memory element will be filling up with the data so processed. The data may take the form of digital words representing selected symbols to be displayed, together with their rectangular co-ordinates in the display field, for example. If now it is desired to transfer this data to an appropriate one of the drums for ultimate display, there will have been inserted in the program a group of instructions which are especially adapted to bring about the transfer of the data from Main Memory to the selected drum. This is known as a so-called break-out process. The first one of the group of instructions especially adapted to initiate a break-out process is the load IO address counter instruction whereby a starting address is specified for the first word to be transferred from Main Memory. As is conventional, the operations portion of this instruction is entered in the Operations Register 154, and the address portion of the instruction which specified the starting address in Main Memory is entered in the Address Register 156. The operations portion is then decoded in the Instruction Control element 160, whereupon appropriate commands are generated to execute the instruction. One of these commands or pulses is adapted to sense a unit known as the IO Interlock Flip-flop located in the Input-Output control 170 (line 290). It is the function of this Flip-flop to indicate whether an input-output process is currently in progress, and if it is, to prevent an attempt on the part of the Computer to carry out two input-output processes simultaneously. In this regard it will be recalled that any one input-output process may be spread out over a number of program instructions owing to the manner in which the process is carried out. Assuming that the IO interlock is off, then a flip-flop in the Instruction Control 160 called the branch flip-flop is not set, and the Computer proceeds with the instruction. It is the function of the branch flip-flop under certain conditions to branch the program to a new instruction upon finding that the IO interlock is on, thereby to avoid the possibility of the computer having to wait while the IO process currently in progress is completed. This must be done before the load IO address counter instruction is given, however. As a further result of the load IO address counter instruction, the contents of the Address Register 156 will be transferred to the In-Out Address Counter 174 by a command on line 292.

The next instruction employed to initiate a breakout process is the select drums instruction. The index interval bits in the operations portion of this instruction are employed to specify the particular drum and drum field to which the information is to be transferred, while the address portion of the instruction is used to specify the starting drum address whereat the first word is to be placed. As a result of this instruction, one of the first things that happens is the generation in the Instruction Control element of a so-called de-select pulse on a line 294, which is applied to the appropriate circuitry of the Input-Output Control for the purpose of clearing the Write Circuits associated with the drum. Also there is produced a select drum pulse on a line 296 which is adapted to cause the transfer of the index interval bits from the Index Interval Register 158 to the Drum Selection Register 196. These bits are then decoded by the Drum Selection Decoder 198 and the Field Selection Decoder 202 which in turn conditions the appropriate Write Circuits 200 for writing on the selected drum and the selected drum field. Assuming that the aforementioned type of symbol and symbol location information is involved in the transfer, the index interval bits of the select drum instruction might be chosen to represent the Radar Display Drum 104. Finally, it will be observed that the select drum pulse is simultaneously applied to the IO Control element 170. This is to condition the latter for the address mode of writing as specified by the index interval bits, certain of which are decoded and likewise passed to the IO Control.

The last of the group of instructions which are adapted to initiate the break-out process is the write instruction. In addition to the operations code specified by its operations portion, this instruction is also adapted to specify by means of its address portion the number of words to be transferred, together with the mode of interleaving, if any, to be employed in the writing process. The latter is determined by the index interval bits. One of the commands produced in response to the operations portion of the instruction is a command on a line 298 to turn on the IO interlock, so that a write instruction associated with an IO process which may occur further on in the program, before the current break-out process has been completed, will be inhibited. After the IO interlock has been turned on, a pulse is then produced on a line 300 whereby a transfer of the contents of the Address Register to the IO Word Counter is effected. Roughly at the same time, there are developed in the Input-Output Control the necessary circuit conditions to produce the selected mode of interleaving on the basis of the index interval bits having been transferred to the Input-Output control. From the Instruction Control there is produced a pulse on a line 302 labeled "PT6 of write" which enables a break request flip-flop in the Input-Output Control, whose function it is to provide an indication of the readiness of the RD Drum 104 to receive the first word involved in the prospective transfer. The break request flip-flop is sensed periodically by a pulse on a line 304 from the Instruction Control element 160. When the break request flip-flop is sensed and found to be on, this fact will be noted by the Instruction Control element 160 and as a result, a break cycle will be initiated by the latter.

One of the first things that occurs upon initiation of a break cycle is the setting of a break flip-flop in the Instruction Control element whose function is to halt momentarily the internal operations of the Computer. This is accomplished by suppressing certain recurrent pulses that are generated in the Instruction Control element and from which the necessary command pulses to execute the program are derived. Immediately thereafter, the contents of the IO Address Counter 174 are entered in Main Memory, as a result of a pulse on a line 306, and the contents of the Main Memory register so addressed, are read out through the Memory Buffer Register 152, the IO Register 204 to the Write Circuits 200. Actually, the Write Circuits are also provided with a register to store the word temporarily, although for the sake of clarity, this register and its associated circuitry has been omitted.

Before the word is written on the RD Drum a second break request flip-flop in the IO Control is set and examined by the Instruction Control Element by a pulse on line 304, whereupon a second break cycle is initiated. This second break request flip-flop is set automatically without regard to the readiness of the RD drum 104 to accept the word which was likewise true of the first break request. This mode of operation is required to properly initiate a break-out process, but as will appear, further break requests will be signalled in accordance with the condition of the Drum 104 and its associated circuitry. Another way of looking at it is that initially the Drum will be ready to accept a word without regard to whether a previous word address has been found on the drum and the word written, since there is no previous word.

As a result of the initiation of this second break cycle, the contents of the IO Address Counter, which will have been stepped one count by a pulse on a line 308, will specify the next word in Main Memory to be transferred to the Drum. On signal from the Instruction Control element the word will be entered in the Memory Buffer Register and on signal from the Input-Output Control, it will then be entered in the Input-Output Register. The latter will not cause the word to be transferred further, that is to the Write Circuits, because of the fact that the first word is still being retained by the Write Circuits, which fact is reflected in the condition of certain flip-flops in the Input-Output Control.

At this point the process of address comparison, which was discussed heretofore, is ready to begin. Thus, the contents of the Angular Position Counter 222 are passed to the IO Buffer Register so that its contents will likewise represent the address on the selected drum field then beneath the Write Heads. Each such address is compared in the Drum Control Register with the address desired, and if there is a disagreement, a no-compare pulse is generated and sent to the IO Control element. As a result, the propagation of a write signal to the Write Circuits is inhibited. In the same way, each successive drum address supplied by the Angular Position Counter is compared with the desired address in the Drum Control Register until a comparison is made. At this time a no-compare pulse will not be generated, and the word in the Write Circuits will be written in response to the write signal, which under these circumstances is uninhibited. As soon as the word has been written, the first break request flip-flop is again set, indicating that the Drum is in readiness to accept the next word of the group to be transferred. This assumes that no interleaving has been specified and all words subsequent to the first word written on the Drum are to be placed in consecutively numbered addresses immediately following the address of the first word.

If it be assumed for example that interleaving by sixteen had been specified, that is, a skip of sixteen drum addresses from one word to the next, then a pulse indicative of the fact, developed in the IO Control, would have been applied to the Drum Control Register over the line 312. As a consequence, the Drum Control Register would produce false no-compare pulses until sixteen drum addresses had passed. Thereafter, in the absence of a no-compare pulse, the write pulse would be effective to cause the word to be written in the proper drum register.

The progress of the process of writing a word and immediately thereafter initiating the transfer to the write circuits of the next succeeding word is effectively accounted for by the IO Word Counter, which it will be recalled, is counted down by one after each word transfer. When the counter reaches zero, an end carry pulse is produced on a line 490, which is effective to terminate the break-out process.

If the IO interlock had been On when the input-output process was attempted, the timing pulses to operate the IO Control as a result of a new instruction would have been inhibited as well as the pulses utilized to carry on the internal operations of the computer. Under these conditions the Computer is said to be in an input-output pause which is necessitated by the fact that another input-output process is still in progress. Accordingly, the Computer must wait to execute the instruction having reference to the new input-output process until the one currently in progress is finished, which is accomplished as aforementioned by temporarily halting the program. During the halt or pause, the Instruction Control element senses the break request flip-flop at a more rapid rate with two megacycle pulses instead of with the timing pulses which are effectively turned Off. In this way, the request for a break may be acted upon more quickly as is most desirable, since during the pause, the Computer is idle. Parenthetically, there may also be employed a sense type instruction whose function it is to simply sense the status of the IO interlock and to branch the program to a new set of instructions if the interlock is On so that additional work can be carried out while waiting for the IO process to be completed. This instruction makes use of the branch flip-flop mentioned earlier.

Digital words having been written on the RD Drum by means of the process described in the foregoing are read from this drum in a predetermined manner independent of the computer program. As soon as reading of the TD Drum has been completed, there is provided to the RD Control 266 a start RD signal from the TD Read Control 260. The RD Control in turn is adapted to produce read sample pulses on line 316 in accordance with the predetermined fixed pattern of reading the words. As is apparent, this operation must be synchronized with the rotation of the drum and this is accomplished with the drum timing pulses from the RD Drum Timing Circuit 264.

Specifically, the pattern of reading from the RD drum is as follows: First one register is read and five are skipped, and this sequence is repeated for three revolutions of the drum. The registers are arranged on the drum so that at this point precession is required to prevent the same registers from being read a second time in a redundant manner. Thus, a skip of four registers is effected towards the end of the third drum revolution to cause the remaining half of the field to be read. This is accomplished in the same read-one-skip-five fashion as was used for the first half until such time as three more revolutions have occurred, thereby completing the reading process. The RD Read Control is also adapted to respond to certain instructions concerning the drum writing operations to the extent that it may know whenever a new field has been selected to be written upon with new radar display information. Having been apprised of this fact, it causes a subsequent RD Drum reading cycle to begin with the next higher number field than it began with in the previous reading cycle. Accordingly, there will always be available for the Write Circuits a field wherein new information may be deposited during the read operation. Also, the field containing the oldest information in point of time will be read first and the next seven fields will be read in like manner, that is in the order in which they were written upon. This permits a moving object, for example, to be displayed in successive positions which correctly represent the direction in which it is moving.

As each word is read from the RD Drum, it is passed to the block 270 labeled Temporary Storage and Distribution of Information to CRT Displays by way of the Input Gates 318. Both of these units are a part of the display system where display signals are derived from the digital words. The display system is conditioned to receive radar display information by the same start RD signal as aforementioned, and it is further conditioned to receive the individual words of the RD display information by pulses on line 322 labeled WOW for word-on-way. These word-on-way pulses are derived from the drum timing pulses in the RD Read Control and occur slightly in advance of the actual reading of the individual words. The drum timing pulses themselves are also sent to the display system to synchronize its overall internal operations with the drum reading process. Finally, it will be observed that the display system and in particular the Display Control is supplied with so-called RD bright and dim signals from the drum system on lines 328 and 330, respectively. These pulses are developed in the RD Read Control in an alternative fashion according to which of the fields have been selected for reading. Thus, a so-called dim signal accompanies each word in the first seven fields of any one reading cycle, and a bright signal accompanies each word in the eighth or last field of the cycle. As a result of these signals, the latest item of a group of eight is displayed more brightly than the others so that, for example, the sense of the direction of movement of a target may be observed more clearly.

The reading operation involving the TD Drum is very much like that for the RD Drum. The only real difference lies in the reading pattern and in the fact that no bright and dim signals are used. As is apparent, when the transition is to be made in the reading process from the RD to the TD Drum the Timing Switch 268 simply switches over to the TD drum timing pulses and word-on-way signals on signal from the RD Read Control.

The display information which the digital words represent is visually presented in the display system by means of the display consoles 272. Not all of the console operators see the same thing, however, because of the incorporation in the digital words of, for example, so-called display assignment bits (DAB) whereby information is selectively routed to the individual Consoles 272. This will be discussed more fully hereinafter in connection with the detailed explanation of the display system. The salient thing to bear in mind for the purpose of this discussion is that the CRT's 102 can only visually produce display information on a symbol-by-symbol basis. Consequently, each symbol or item is presented at a time distinct from all the other items even though the appearance of a complete field of items exists due to the persistence of the phosphor employed in the CRT's. It is this difference in time between the initial intensifications of the items or symbols which permits a particular item to be identified so that requests may be made with respect thereto.

To accomplish this latter result, the operator desiring to make such requests first sets up his Switchboard 138 in a manner to indicate the type of request desired. He then aims his Light Gun 142 at the particular item of concern and pulls and holds the trigger. Ordinarily, there will be no output signal from the Light Gun immediately because the intensity of the item will be insufficient (and the color inappropriate) to activate the photoelectric cell embodied in the Light Gun except when the glow from the item first appears. In other words, the Light Gun is not responsive to the afterglow from the item, even though it is clearly visible for quite some time. Therefore, unless by accident the trigger of the Light Gun is pulled at precisely the same instant as the item is initially intensified, the output signal from the Light Gun will come shortly after the trigger has been pulled, namely at the time that the item is next re-intensified. This is not to say that the item stands still necessarily, but only that it does not move so fast as to be wholly out of focus from one display to the next re-display.

Other signals which bear on the operation of the Light Gun are the conditional unblank signal on line 336 and also the conditional sample signal on line 340. These signals delineate the interval of time during which the Light Gun is enabled, as manifested by the presence of a pass light gun signal on line 342. Actually, the pass light gun signal is On only for a short interval following the initial itensification of an item.

If a light gun signal does occur during the time that the Light Gun is enabled, its effect is to cause to be produced in the Manual Input Element a signal adapted to transfer to that element, information identifying the item. This signal is carried on a line 346 labeled transfer display information which leads to the Display Control 338. The Display Control in turn causes the appropriate identifying information to be read out of the unit 270, this identifying information being a part of the same information that went into the generation of the display of the item. That is to say, for RD items, for example, not the whole digital word associated with the item identified by the Light Gun is transferred from the unit 270 to the Manual Input element, but only 24 bits thereof which is sufficient to identify the item to the Computer.

The operation of the area discriminators 274 and 276 is roughly the same as that of the Light Guns except for the fact that no trigger switch is involved. Also, the presence of read area discriminator 1 or 2 signals on lines 348 or 350 is required at the Manual Input element in order to cause the system to respond to the area discriminator signals.

Whenever digital information is transferred to the Manual Input element from the unit 270, there is developed a data available pulse which is sent along to the Write Status Control 282 on line 352. This control is adapted to call for the information immediately upon finding a drum register which is available. In particular, the information is called for by means of a word demand pulse on line 354 which is initiated by the Write Status Control 282 as soon as a zero comes up in the OD Channel. It will be recalled that the presence of a zero in this channel indicates that the word of the corresponding register has been read, and therefore the register is available.

Ordinarily the Computer will be programed to read the Manual Input Drum periodically which is accomplished by providing in the program an appropriate group of instructions. These instructions are similar to the ones described in connection with the writing process on the RD and TD Drums. The first of these instructions is load IO address counter whereby the address of the register in the computer Main Memory into which the first word is to be entered is specified. The next instruction is the select drum instruction whose index interval bits are adapted to specify the Manual Input Drum but whose address bits are meaningless, ordinarily, because the Manual Input Drum is not read in the address mode. Finallly, by means of a read instruction, information as to the number of words to be transferred is loaded into the IO Word Counter, the same being specified by the address portion of the instruction. In this case the index interval bits are meaningless because of the fact that interleaving is completely foreign to the status mode of reading from the drum.

As a result of the read instruction, the IO interlock is turned On and there is produced a read MI by status pulse which is applied to the CD Status Control 236. This latter pulse is developed in the Input-Output Control as a consequence of the occurrence of the PT6 on read pulse. Upon receipt of the read MI by status pulse, the CD Status Control looks for new words, that is words not having been read previously, in accordance with whether a 1 or a 0 is present in the CD status channel. If a 1 is present then it is known that the corresponding register should be read. Actually, the Drum is arranged so that notice of a 1 comes to the CD Status Control in advance of the time that the corresponding word register appears beneath the read heads 358 in order to give the circuits time to prepare for the reading operation. This is simply a matter of appropriately positioning the various read heads 358, as will be apparent to those skilled in the art. Assuming that a 1 is present, then a manual input timing pulse No. 1 is gated through the CD Status Control 236 to the Input-Output Control 170 to indicate the fact. In response thereto, the latter generates a read signal which is adapted to cause the reading of the word, the same being automatically entered in the IO Buffer Register 212.

Before the word is accepted by the Computer, a condition is often established to the effect that a certain pair of bits of the word must be identical with a corresponding pair of bits assigned by the Computer. This is accomplished by means of the select drum instruction whose address portion provides the appropriate identity bits and whose index interval portion is coded to indicate the fact that this additional so-called identification mode of reading from the Drum is to be employed. As in the case of the address mode, the comparison between what is desired and what is present takes place in the Drum Control Register 214. That is to say, the Input-Output Control acts on the index interval bits which indicate that the identification mode of reading is in order and in response thereto sends an appropriate compare pulse (compare bits 14, 15) on line 360 to the Drum Control Register. If the selected bits in the In-Out Buffer register 212 do not agree with those specified by the contents of the Drum Control Register then a no-compare pulse is produced, and in response thereto, the IO Buffer Register is cleared for receipt of the next succeeding word. When a comparison is effected, a break-request is produced by the setting of the break-request flip-flop, the request being honored by the computer at TP11 which is the appropriate point of time in the cycle of the internal computer operations for the actual transfer of the word to the Computer to take place. More specifically, when the break-request flip-flop is found to be set by the pulse on line 290 from the Instruction Control element, the break flip-flop will be set and the internal operations of the Computer will be halted for the time required to transfer the word into Main Memory. The path of this transfer is through the IO Register 204 and the Memory Buffer Register 152, the IO Register acting as a buffer in those few cases where Main Memory is not ready until shortly after a drum word is available. In like manner, succeeding words will be transferred from the Drum 146 to the Computer until the drum has completed one full revolution or until the Word Counter equals 0. The transfer or break-in process is then terminated by the IO control.

Upon completion of the reading of the MI Drum 146, the computer program will ordinarily indicate that the Manual Input Matrix 140 is to be read so that the Computer may know what request has been made with respect to the item which has been specified by a light gun action, for example. It will be recalled that the states of the cores in the Manual Input Matrix is controlled by the console switch boards 138, each of which may be set up to indicate a particular request before the Light Gun is "fired." It remains, therefore, to read the request from the Manual Input Matrix into the Computer and this process is accomplished generally as follows:

Upon the occurrence in the program of an appropriate select instruction, which is very much the same as a select drum instruction, and then a read instruction, there is produced by the IO Control 170 a read MI matrix pulse on line 288, whereby individual words are pulsed out of the MI matrix 140 and into the IO Buffer Register 212. The mode of transfer of succeeding words is much the same as has been discussed in connection with various other input-output processes. Thus, after any one particular word has been entered into the IO Buffer Register 212 the MI Matrix Control 286 initiates a break request by sending to the IO Control a break-request pulse which sets the break-request flip-flop to an On state. When the Instructional Control element finds that the break-request flip-flop is On, it initiates the usual break cycle whereby the word is transferred from the IO Buffer Register to Main Memory. Thereafter, the process is continued on a word-by-word basis until the count in the IO Word Counter goes to zero. Ordinarily, this will not take place until all 128 rows of the MI Matrix have been read into the Computer. When the Computer is to process the information, it locates a particular request concerning a display item on the basis of the console identity code which accompanies the identifying information for the particular display item and which will have been entered into Main Memory previously from the MI drum. Only certain of the rows of cores in the Manual Input Matrix, and so also only corresponding addresses in Main Memory, can be affected by any one particular console. Hence, an ordinary table lookup procedure may be employed in the Computer with the console identity code as the key to the particular word request sought.

SYSTEM SUBCIRCUITRIES

Certain of the circuitries incorporated in a preferred embodiment and indicated generally as blocks in FIG. 2 will now be described in greater detail. In this manner a more comprehensive understanding of certain principles of the invention and of the preferred embodiment may be obtained.

Input-Output Control

The Input-Output Control 170, as its name implies, has as its primary function the control of the transfer of information between the Main Memory 148 of the Computer 100 and elements outside the Computer. In the described embodiment these elements are the Manual Input (MI) Drum 146 and the Manual Input (MI) Core Matrix 140 from which information is read, and the Display (TD and RD) Drums 104, 106 on which information is written. The transfer operations are executed in response to programed instructions from the Computer and one or more words may be transferred during such operations. The Input-Output Control 170 operates in a manner to minimize the time the Memory Buffer Register 152 is involved in a transfer operation with the storage elements such that the computer time devoted to other logical and arithmetic operations is maximized.

A transfer operation requires three instructions: Load IO Address Counter instruction, a Select instruction and a Read or Write instruction. The Input-Output Control 170 receives no commands as a result of the Load IO Address instruction. During the Select instruction, the Input-Output Control 170 receives a Deselect pulse on line 294 which readies certain circuits thereof for an information transfer operation, and it also receives storage element identification information on lines 362 from the Index Interval Register 158 such that the identity of the storage element with which the transfer is to be effected and the mode of transfer is established.

During the Read instruction the IO Interlock (a flip flop) is turned on to prevent the initiation of another data transfer operation until the present one is completed. The subsequent Start Read command effects a 120 microsecond delay in the operation of the Read-Write Circuits 200 and then begins the data transfer to the Computer 100 by transferal of a word into the IO Buffer Register 212. When the selected storage element is the MI Drum 146, an identity comparison is made, if requested. (No comparison operation is involved in data transfers from the MI Matrix 140.) The accepted word is transferred into the IO Register 204, a Break Request is initiated, the Computer operations are temporarily halted, and the word is transferred into the Memory Buffer Register 152. This word transfer operation is successively repeated until the Word Counter 176 goes to zero, generating an End Carry pulse; or for one revolution of the MI Drum 182, whichever occurs first. At that time, a pulse is generated which clears the IO Interlock and ends the transfer operation. In the MI Matrix reading operation the IO Word Counter End Carry pulse indicates the completion of the data transfer and clears the IO Interlock, thus ending the transfer operation.

In a writing operation the computer Input-Output Control 170 is similarly conditioned by a Deselect pulse, and the selected storage element and mode of transfer to that element is identified during the Select Drum instruction. The IO Interlock is turned on and a Start Write pulse is developed by the Write instruction. The Start Write pulse generates a Break Request whereby a first word is transferred from the Memory Buffer Register 152 through the IO Register 204 to the Drum Write register 200 and a second Break Request is automatically initiated to transfer a second word into the IO Register 204. The drum writing operation commences 120 microseconds after the Write heads have been switched and when a successful address comparison has been achieved. As each word is written on the drum, a Word Demand pulse is generated which initiates another Break Request and another word is transferred to the Memory Buffer Register 152. If an interleaving operation is specified, false No Compare pulses are generated by the Drum Control Register 214 to inhibit writing on those drum registers which are to be skipped. The transfer process continues until the programed number of words have been transferred as indicated by an End Carry pulse from the IO Word Counter 176 which clears the IO Interlock and ends the transfer operation.

Figure 3C:
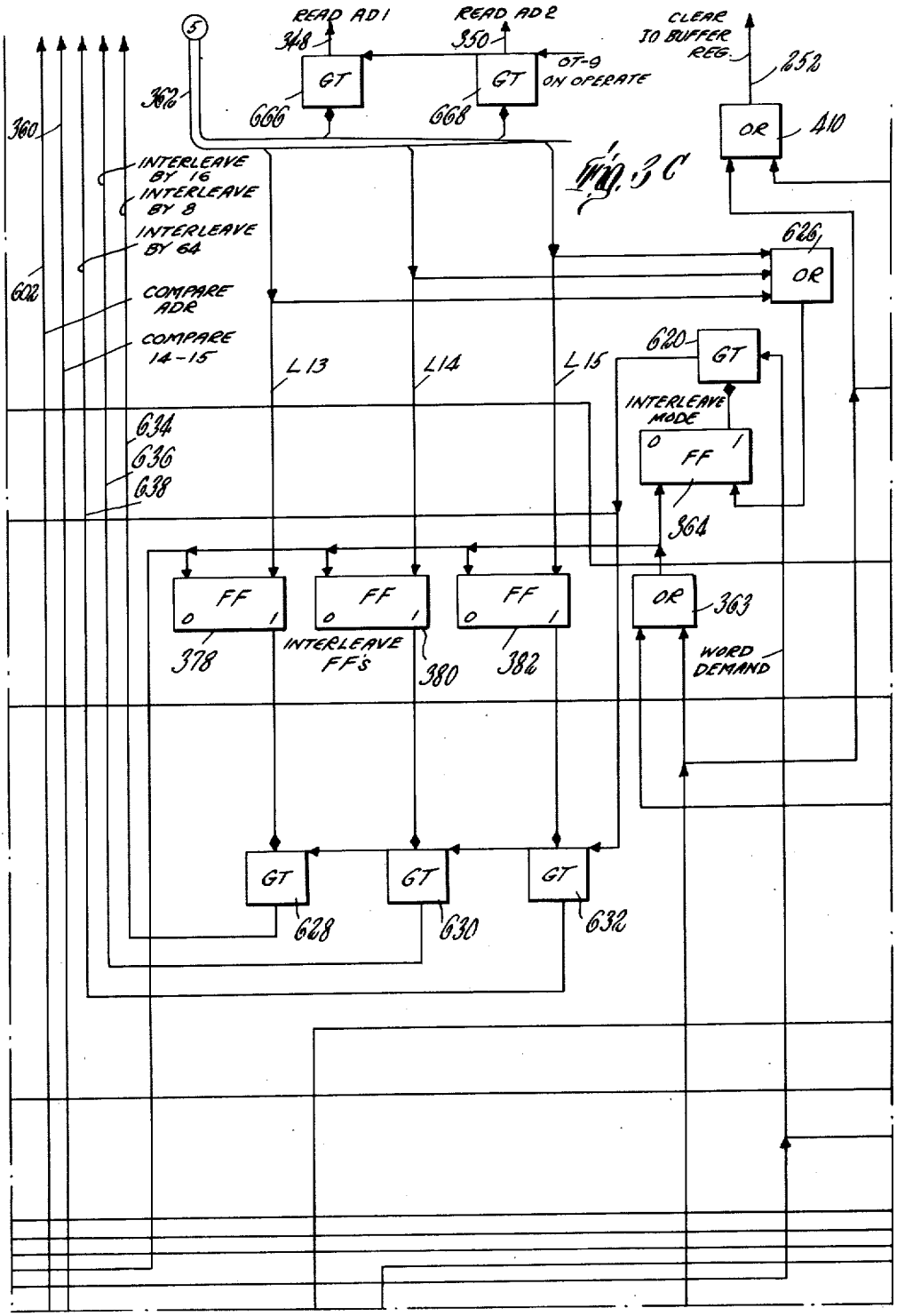
FIGURE 3 (A-H) is a schematic diagram in logical block form, of the Computer Input-Output Control shown as block 170 in FIGURE 2.
Figure 3H:
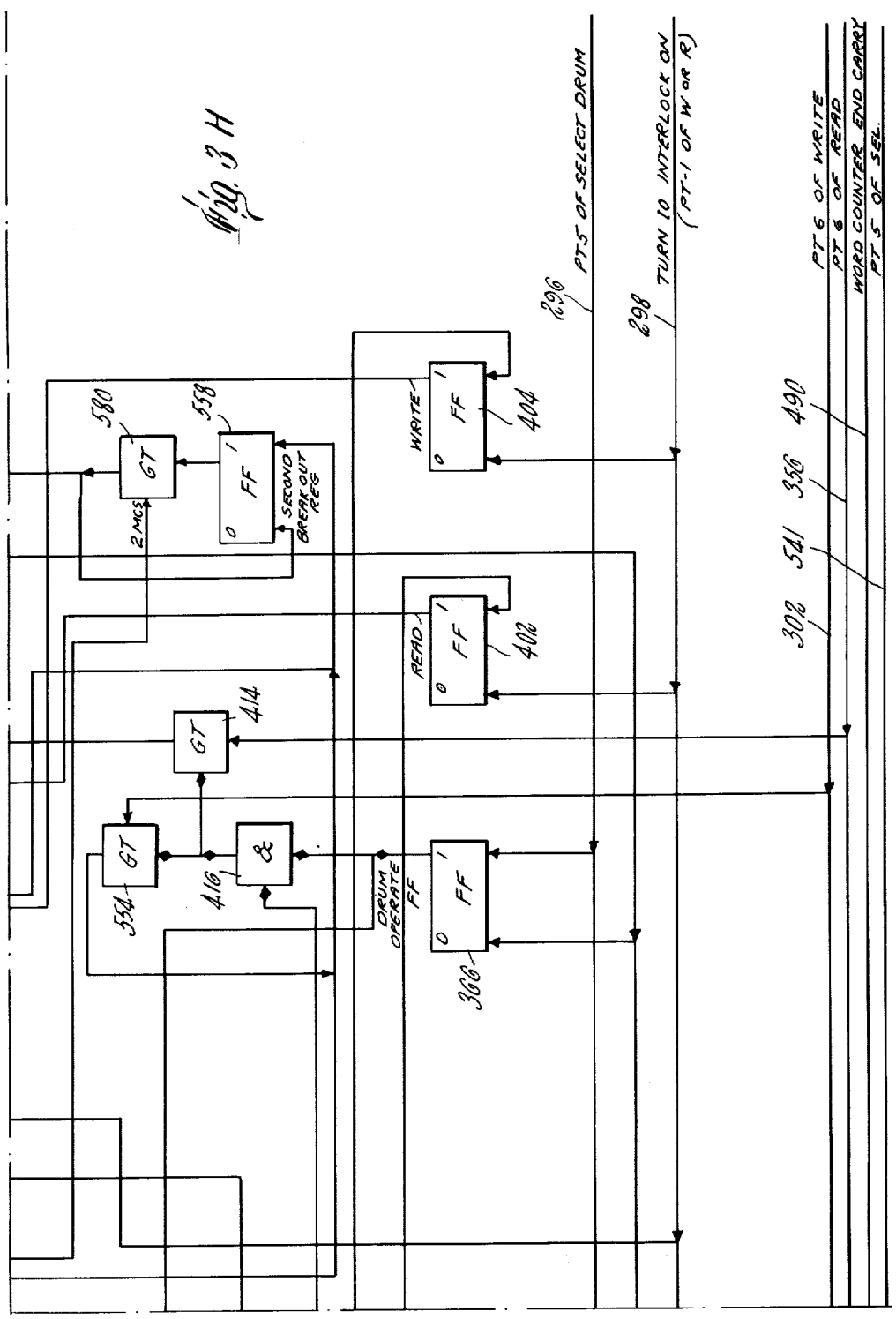

The operation of the logical circuitry of the Input-Output control 170 during the transfer operations may be understood with reference to FIGURE 3. The reading transfer operations from the MI Drum 146 and from the MI Core Matrix 140 will be described first and the drum writing operation will be described subsequently as substantial portions of the logical circuitry involved in these transfers are independent of one another in operation.

*Computer reading operations.*—In an MI Drum reading operation, the Input-Output Control 170 first receives the command Deselect from the Instruction Control 160 on line 294 if the IO Interlock allows the instruction to proceed. The Deselect pulse clears the IO Register Status flip-flop 358 through OR circuit 359, the Accept flip-flop 360, IO Buffer Status flip-flop 362, the Interleave Mode flip-flop 364, the Drum Operate flip-flop 366, the Write Drum flip-flop 368, the MI Matrix Selected flip-flop 370, the Not Read Drum flip-flop 372, the IO Buffer Load Status flip-flop 374, the Identity Mode flip-flop 376, the three Interleave flip-flops 378, 380, 382, the Drum Status flip-flop 384, the Write Register Status flip-flop 386, the Read-Write Control Switch flip-flop 392; sets the Address Mode flip-flop 394; through OR circuit 395 applies a voltage level to single shot multivibrator 396 to inhibit reading or writing operations for 120 microseconds during such switching; and clears the Read-Write Circuits 200 on line 397.

The command PT-5 of the Select Drums instruction on line 296 which follows the Deselect pulse, sets the Drum Operate flip-flop 366 and pulses gate tubes 398 and 400 in the Drum Mode section, described further hereinafter. When the Drum Operate flip-flop 366 is set, the Input-Output Control 170 is operating in the Drum Operate Mode. (The other mode of operation in this embodiment is the MI matrix mode, and will be described hereinafter.)

During the Read instruction following the Select Drum instruction, the Input-Output Control 170 receives the following commands: Turn IO Interlock On (PT1 of Read) on line 298, and PT6 of Read on line 356.

The command Turn IO Interlock On causes:

(1) The Read and Write flip-flops 402, 404 to be cleared,
(2) The IO Register Status flip-flop 358 to be cleared,
(3) The IO Interlock flip-flop 406 to be set,
(4) The Word Counter Status flip-flop 408 to be set,
(5) The Interleave Mode flip-flop 364 to be cleared,
(6) The Interleave (8, 16, or 64) flip-flops 378, 380, 382 to be cleared,
(7) The IO Buffer Status flip-flop 362 to be cleared through OR circuit 363, and
(8) A pulse to be delivered through OR circuit 410 to the conductor 252 labeled Clear the IO Buffer Register.

The level "IO Interlock Is On" is applied to the Instruction Control 160 on line 411 when flip-flop 406 is set. The command "PT6 Of Read" on line 356 samples gate 412 which is conditioned by the "one" output of the Word Counter Status flip-flop 408. The pulse passed by this gate causes the Read flip-flop 402 to be set. The command "PT6 Of Read" also samples gate 414 which is conditioned by the output of AND circuit 416, the inputs to which are from the set Word Counter Status flip-flop 408 and the set Drum Operate flip-flop 366. Accordingly, this gate will be conditioned if the IO Word Counter 176 is not zero and the Computer 100 is operating in the Drum Operate Mode. The pulse output of gate tube 414 causes the Address Compare flip-flop 418 to be cleared through OR circuit 419, the Read-Write Control Switch flip-flop 388 to be cleared through OR circuit 389, the Drum Write flip-flop 390 to be cleared and the Drum Read flip-flop 392 to be set. This pulse will hereinafter be termed the "Start Read" pulse. (The "Start Read" pulse also samples gate 420 which is conditioned by the "one" output of the Read Write Control Switch flip-flop 388. Since this flip-flop 388 is only set in its "one" state during a Drum Writing Operation, the "Start Read" pulse will be passed by the gate 420 only in the event that the previous writing operation has been completed and the present Read instruction was not preceded by a Select instruction. Such a condition might occur when a given field on a drum was previously selected for a writing operation which had been completed, and a reading operation on that same field is desired. Before such a reading operation could take place, it is necessary to allow enough time for the read-write diode switching operation to be completed before the actual reading from the drum begins.) A pulse passed by the gate 420 is delivered through OR circuit 422 to the input of a single shot multivibrator 424. The multivibrator 424 delivers a positive D.C. level to its output conductor except for a brief interval of time following the receipt of a positive pulse at its input. This brief interval of time is made sufficient to permit the diode switching operation to be completed and in the preferred embodiment the length of this negative D.C. level is approximately 120 microseconds. The output of this multivibrator 424 and the multivibrator 396 when pulsed by the Deselect pulse are delivered through an AND circuit 426 to condition inputs of two other AND circuits 428, 430. The second inputs to these latter two AND circuits 428, 430 are respectively from the "one" outputs of the Drum Write and Drum Read flip-flops 390, 392. The AND circuit 430 connected to the Drum Read flip-flop 392 which was set by the Start Read pulse thus has an output which conditions the gate tube 432 through OR circuit 434. Gate 432 is sampled by CD4 timing pulses from the selected drum, which in this reading operation, is the MI Drum 182. A pulse from this latter gate sets the Drum Status flip-flop 384. The "one" output of flip-flop 384 conditions one input of each of two AND circuits 436, 438. The AND circuit 436, of interest during the reading operation, receives its other input from the "one" output of the Drum Read flip-flop 392.

The output of AND circuit 436 conditions one input to AND circuit 440, the other input being conditioned by the Select MI Status level from the Index Interval Register 158 on lines 362. The resultant output of AND circuit 440 is sent to the CD Status Control circuit 236 as a Read MI Status level on line 238 and also conditions gate tube 442. Gate tube 442 is sampled by MI CD1 pulses from the CD Status Control circuit (line 246) and the pulses that are passed function as IO Buffer Loading pulses, Compare pulses and Read Sample pulses, simultaneously. A CD1 pulse is generated as each drum register passes under the Read Heads 358.

The Read Sample pulse, on line 248, energizes the read heads 358 in the Read Write Circuits 200 such that the word in the drum register then under the Read Heads is read into the IO Buffer Register 212.

The IO Buffer Loading pulse passes through a one-microsecond delay unit 444, OR circuit 446, and causes the IO Buffer Loading Sync flip-flop 448 to be set. The resultant output level conditions gate tube 450 which is sampled by two megacycle pulses generated in the Instruction Control 160 and transmitted on line 452. The next pulse is passed to set the IO Buffer Load Status flip-flop 374. Its resultant output conditions gate tube 454 which is also sampled by two megacycle pulses and the next pulse is passed as an IO Buffer Loading pulse. This pulse clears the Synchronizing flip-flop 448 and the Status flip-flop 374, and is passed by the gate tube 456, which is conditioned by the output level of the set Drum Operate flip-flop 366. The pulse then samples the Accept flip-flop 360 at gates 458 and 460. By means of the IO Buffer Load Sync flip-flop 448 and the IO Buffer Load Status flip-flop 374, the transfer of the word read from the drum is now synchronized with the internal operations of the Computer System.

The MI Drum 146 is often read by status identity, i.e. two bits (L14 and L15) of the word read from the MI Drum are examined and the word is either accepted or rejected on the basis of this examination. A Select MI Identity level on lines 362 from the Index Interval Register 158 has conditioned gate tube 398 which was pulsed by the command "PT5 of Select Drum" (line 296) and the resultant output pulse has set the Identity Mode flip-flop 376 and cleared the Address Mode flip-flop 394. Under these conditions, the CD Compare pulse sets the Accept flip-flop 360, and is passed through OR Circuit 462 and the one microsecond delay unit 464 after which it examines the Mode flip-flops 376 and 394 at gates 466 and 468. As the Identity Mode flip-flop 376 is set, a command "Compare Bits L14, L15" is passed to the Drum Control Register 214 on line 360.

In the Drum Control Register 214 the identity bits of the word read from the MI Drum 146 and presently stored in the In-Out Buffer Register 212 are compared to determine the identity of that word. If the word does not compare a No Compare pulse is transmitted to the Input-Output control 170 on line 250 and passes through OR circuits 470 and 361 to clear the Accept flip-flop 360. The IO Buffer Loading pulse from gate 456 which samples the Accept flip-flop 360 finds gate tube 460 conditioned and is passed as a Clear IO Buffer Register pulse through OR circuit 410 on line 252. The word read from the MI Drum 146 is erased from the IO Buffer Register 212 without being transferred to the In-Out Register 204, and a "one" is written into the MI OD Status Channel 228 as a result of the No Compare pulse. (Incidentally, the Address Compare flip-flop 418, not used in the embodiment in reading operations, is also cleared by the No Compare pulse.)

If the word does compare by identity successfully, a No Compare pulse is not generated by the Drum Control Register 214, the Accept flip-flop 360 remains set and a zero is written in the OD Status Channel 228 by CD Status Control 236. The next IO Buffer Loading pulse then samples gate tube 458 which is conditioned and the output pulse therefrom is passed through OR circuit 474 to set the IO Buffer Status flip-flop 362, and is passed through OR circuit 476 as a Step IO Word Counter pulse on line 478.

The resultant output conditions one input of AND gate 480, the other input of which is from the "zero" output of the IO Register Status flip-flop 358 (indicating the availability of the IO Register). This latter flip-flop was cleared by the command "Turn IO Interlock On" and thus AND circuit 480 will have an output when a successful comparison is made. The output of AND circuit 480 conditions gate 482 to pass the next two megacycle sampling pulse as a transfer pulse, IO Buffer Register To IO Register AND Clear IO Buffer Register pulse, on line 254.

The two megacycle pulse passed by gate 482 also sets the IO Register Status flip-flop 358 through OR circuit 484 (indicating that the IO register 204 contains a word), clears the IO Buffer Status flip-flop 362 (indicating that the IO Buffer Register 212 is empty), and delivers a pulse through OR circuit 486 to gate tube 488 which is conditioned by the output of the Word Counter Status flip-flop 408 indicating that the Word Counter is not zero. Even though the Step IO Word Counter pulse has been applied to the IO Word Counter 176, an End Carry pulse on line 490 from the Counter 176, which clears the Word Counter Status flip-flop 408, will not be received before the Break Request initiating pulse is passed by the gate 488. The pulse passed by gate 488 sets the Break Request Sync flip-flop 492 and its output conditions gate 494 to pass the next two megacycle pulse delayed 0.175 microsecond by delay unit 496. The output of gate tube 494 sets the Break Request flip-flop 498 and conditions gate tube 500 to pass the next Sense Break Request flip-flop command on line 304 (TP-11, or the next two-megacycle pulse when the computer is in an arithmetic pause). The output of gate 500 generates the command Set TPD Break flip-flop (line 502), clears the Break Request flip-flop 492 and sets the Break flip-flop 504. The output of flip-flop 504 conditions one input of a two input AND circuit 506, the second input of which is conditioned by the one level of the Read flip-flop 402.

The output of AND circuit 506 is delivered to the Break-in Distributor 512, which, in response to this positive D.C. level and to timing pulses (TP) on lines 514, generates Break-In pulses (BI). At BI-1 time the command IO Address Counter to Memory Address Register is generated and passed through OR circuit 516 on line 518 and the Break Request flip-flop 498 is cleared. The next Sense Break Request flip-flop command is passed by gate 508, clears the Break flip-flop 504, and generates the command Clear Break flip-flop (line 510). At BI-2 time the commands Step the IO Address Counter (line 308) and IO Register to Memory Buffer Register (line 256) are generated, the former passing through OR circuit 520; and the IO Register Status flip-flop 358 is cleared through OR circuit 359. At BI-11 time a pulse samples the gates 522 and 524.

This process of reading words from the MI Drum 146, accepting them or rejecting them, and transferring the accepted ones into Main Memory 148 is repeated until a Word Counter End Carry pulse is generated or for one revolution of the MI Drum.

An End Carry pulse on line 490 clears the Word Counter Status flip-flop 408. The resultant output level conditions one input of three input AND circuit 523. A second input is conditioned by the output level of the cleared IO Register Status flip-flop 358 (indicating no word is stored in the IO Register 204). The third input is conditioned by the output level from the cleared IO Buffer Status flip-flop 362 (indicating no word is stored in the IO Buffer Register 212). The resulting output level from AND circuit 523 is passed through OR circuit 525 and conditions gate tube 652. The BI-11 pulse, through OR circuit 527, samples this gate and is passed as a sampling pulse to gate 654. Gate 654 is conditioned by the output of the set Drum Operate flip-flop 366 and thus the pulse is passed therethrough and through OR circuit 534 to clear IO Interlock flip-flop 406 and as a Clear IO Interlock pulse to the Instruction Control 160 on line 538.

The registers of the MI Drum 146 are counted as they pass under the Read Heads 358 by an eleven stage Drum Register Counter 526 which is stepped by CD4 pulses (MI) passed from the CD status control 236 on line 527 through gate 528. Gate 528 is conditioned by the output of AND circuit 530 which in turn is conditioned by the output of the AND circuit 436 and by the Select MI Status level. Thus, the Counter indicates the process of an MI Drum IO transfer cycle. When one revolution of the Drum has been completed, the Counter 526 produces a Drum Disconnect signal which sets the IO Interlock Sync flip-flop 532. The output of flip-flop 532 conditions gate tube 524 which is sampled by the 2 megacycle pulse and its output is passed to produce conduction in OR circuits 534 and 536. Conduction in OR circuit 534 generates the command Clear The IO Interlock and clears flip-flop 406. Conduction in OR circuit 536 produces an output which clears the IO Interlock Sync flip-flop 532 and the Not Read Drum flip-flop 372 through OR circuit 373. The MI Drum reading cycle is thus terminated in one of these two manners.

Three instructions, Load Address Counter, Select MI Matrix and Read are required to effect the reading operations of the MI Matrix 140. The conditioning and operation of the IO Control 170 is similar to that described above with the following exceptions.

The Select MI Matrix level from the Index Interval Register 158 conditions gate tube 540 and the pulse PT5 of the Select instruction (line 541) is passed through the gate tube to set the MI Matrix Select flip-flop 370. The output of flip-flop 370 conditions gate tubes 542, 544 and 546 and one input of AND circuit 548. The Start Read pulse (PT6 of the read instruction—line 356) is passed by the conditioned gate tube 542 to the MI Core Matrix Control 286 as a Read MI Matrix pulse on line 288. The MI Matrix Control circuitry 286 returns an MI Break Request pulse on line 550 which is passed by the conditioned gate tube 544 as an IO Buffer Loading pulse through OR circuit 446 to set the IO Buffer Load Sync flip-flop 448. By means of flip-flops 448 and 374, functioning in a manner similar to that described above, the Manual Input Break is synchronized with the computer system operations. In particular, the Break Request signal from the Matrix Control is passed through gate tube 546 and OR circuit 474 to set the IO Buffer Status flip-flop 362, thereby transferring the word from the IO Buffer Register 212 to the IO Register 204 and initiating a Break in the same manner as was described in connection with the MI Drum reading operation. No comparison is required as all words in the Matrix 140 are transferred, and therefore the Accept flip-flop 360 is not examined. Since the reading speed of the MI Core Matrix 140 is comparable to that of the drum system, the same Break Request circuits are used in the same manner as described above for the MI Drum reading operation.

The IO Word Counter 176 indicates the status of the Matrix reading operation. The complement of the number of words to be transferred from the Matrix 140 is initially stored therein. Reading of the Matrix always begins with the first Matrix register and any number of registers to be read (up to the total of one hundred twenty-eight) may be specified. When the Word Counter 176 goes to zero an End Carry pulse is generated and transferred to the IO Control 170 on line 490. The End Carry pulse clears the Word Counter Status flip-flop 408 and the resultant output conditions the second input of AND circuit 548. The output level produced thereby conditions gate tube 522 which is sampled by BI-11 pulses and the passed pulse clears the IO Interlock flip-flop 406 through OR circuit 534. It also is passed as a Clear IO Interlock command to the Instruction Control 160 on line 538 and as a Disconnect MI Matrix pulse on line 551, thus ending the IO reading cycle of the MI Matrix 140.

*Computer Writing Operations.*—The Computer 100 writes on the TD and RD drums 104 and 106. The operations involved in writing which are different from those involved in reading will be described in detail. Three instructions Load Address Counter, Select Drums, and Write are required to effect drum writing operations.

The Select Drum instruction produces a Select TD or Select RD level in the Index Interval Register 158 which is transmitted to the IO Control 178. With the exception of this difference the operation of the IO Control during the first two instructions has been previously described and therefore the operation of the IO Control will be limited to those operations occurring during and following the Write instruction.

The command "Turn The IO Interlock On" (PT-1 of Write) on line 298 functions in the same manner as in the Read operation. The command PT-6 of Write on line 302 samples gate 554 which is conditioned by an AND circuit 416 whose inputs are energized by set Drum Operate flip-flop 366 and the set Word Counter Status flip-flop 408. This command also samples gate 556 which is conditioned by the set Word Counter Status flip-flop 408. The output of the gate tube 554 sets the Second Break Request flip-flop 558, sets the Write Drum flip-flop 368 and the Not Read Drum flip-flop 372, clears the Address Compare flip-flop 418, sets the Read-Write Control Switch flip-flop 388 and the Drum Write flip-flop 390, samples the gate 560 which is conditioned by the cleared Read-Write Control Switch flip-flop 388, initiates a Break Request by sampling gate 488 which is conditioned by the set Word Counter Status flip-flop 408, and clears the Drum Write Register Status flip-flop 562 through OR circuit 564. The output of gate 556 sets the Write flip-flop 404.

The operation of the Break Request circuitry is the same as previously described.

When the Break flip-flop 504 is set, it conditions one input of an AND circuit 566, the other input of which is conditioned by the set Write flip-flop 404, and a signal is delivered to the Break-out Distributor 568. The Breakout Distributor, in response to this positive D.C. level and in response to TP pulses (line 514) initiates a breakout cycle. At BO-1 time, the command IO Address Counter to Memory Address Register is generated (line 518) and the Break Request flip-flop 498 is cleared. The output of the cleared Break Request flip-flop conditions gate tube 508 which is sampled at TP-11 time and passes a pulse which generates the command "Clear TPD Break Flip-flop" (line 510), and also clears the Break flip-flop 504. At BO-7 time the command Memory Buffer Register to IO Register is generated (line 570) and the IO Register Status flip-flop 358 is set. The output level of this flip-flop conditions one input of a three input AND circuit 572, a second input of which is conditioned by the cleared Drum Write Register Status flip-flop 562 and the third input of which is conditioned by the set Write Drum flip-flop 368. The output of this three input AND circuit conditions gate tube 574 which is sampled by two megacycle pulses. The passed pulse produces the command "IO Register to Drum Write Register" on line 576; sets the Drum Write Register Status flip-flop 562 and the Write Register Status flip-flop 386; clears IO Register Status flip-flop 358, the Drum Write Register Status Sync flip-flop 578; and gates the output of the set Second Break Request flip-flop 558 through gate 580 to initiate the Second Break Request. The output of gate 580 clears the Second Break Request flip-flop 558.

The second break out cycle is required as a Word Demand pulse is not generated until a word is written on the drums. At the end of the second break out cycle, when the second word is stored in the IO Register 204, the first word may or may not be still stored in the Write Register 200.

Words are transferred from the Write Drum register 290 to the drum in the following manner. In the event the Read Write Control Switch flip-flop 388 was cleared prior to the PT-6 of Write pulse, the gate 560 would pass the PT-6 of Write pulse through the OR circuit 422 to the single shot multivibrator 424 to decondition the previously mentioned control circuits for a period of approximately 120 microseconds. In the event, however, that the Read Write Control Switch flip-flop 388 had been in its one state when the PT-6 of Write pulse was received, this delay would not be generated as gate 560 would not be conditioned. When the Drum Write flip-flop 390 is set, its output conditions one input of AND circuit 428, whose other input is conditioned by the AND outputs of the multivibrators 396 and 424 to produce a signal which is passed through OR circuit 434 to gate tube 432. Gate 432 is sampled by CD-4 pulses from the selected drum (either TD or RD). The passed pulse sets the Drum Status flip-flop 384 which conditions one input of AND circuit 438. A second input is conditioned by the output of the set Drum Write flip-flop 390 and a third input is conditioned by the output of the set Write Register Status flip-flop 386. The output of AND circuit 438 conditions an input of two input AND circuit 582, the other input being conditioned by the output of the cleared Address Compare flip-flop 418. The output of AND circuit 582 conditions gates 584 and 586 to pass CD-1 pulses from the selected drum. If the TD Drum 106 is selected, gate 588 is conditioned, and if RD Drum 104 is selected, gate 590 is conditioned. The pulses are passed from Drum Timing Circuit 262 or 264 on lines 592 or 594, respectively. The CD–1 pulse passed by the gates generates the command TD APC to IO Buffer Register (line 596) or RD APC to IO Buffer Register (line 598) to cause a transfer of the associated APC counter contents so that a comparison operation may take place in the Drum Control Register 214. The pulse is also passed through OR circuit 600 to set the Address Compare flip-flop 418. Since the TD Drum 106 or RD Drum 104 will have been selected, writing is in the Address Mode. The output of the Address Mode flip-flop 394, set by the Deselect pulse, conditions gate tube 466 which is sampled by the Compare pulse (delayed one microsecond by unit 464), and a Compare Address pulse is passed to the Drum Control Register 214 on line 602. If the comparison is unsuccessful, a No-Compare pulse is generated which clears the Accept flip-flop 360 as well as the Address Compare flip-flop 418 with the result that the operation is repeated until the comparison is effected. When the comparison is successful, the Address Compare flip-flop 418 remains set and conditions an input of AND circuit 604, the other input being conditioned by the output of AND circuit 438. The output of AND circuit 604 conditions gate 606 which is sampled by CD–3 pulses (from gate 608 or 610 through OR circuit 612) to produce a Write command which sets a Write flip-flop 614 (cleared 1.8 microseconds later by the same pulse passed through a delay unit 616). The output of set flip-flop 614 raises the Write level in the Write circuits 200 on line 216. 2.5 microseconds later a Clear Drum Write Register command is generated (line 618) and a Word Demand pulse is generated.

The Word Demand pulse clears the Write Register Status flip-flop 386 through OR circuit 387, samples the output of the Interleave Mode flip-flop 364 at gate 620, sets the Word Demand Sync flip-flop 622, sets the Drum Writer Register Status Sync flip-flop 578 after an appropriate delay (unit 624), and initiates a Break Request through OR circuit 486.

The Word Demand pulse which samples the Interleave Mode flip-flop 364 effects an interleaving operation in the following manner.

The Interleave Mode flip-flop 364 has been set by an Interleave pulse of the Write instruction. The pulse is generated in the Index Interval Register 158 if the index interval part of the Write instruction includes a code indicating Interleave by 8, 16, or 64. When such a code indication is present in the Write instruction, the Interleave Mode flip-flop 364 is set through OR circuit 626 and one of the Interleave Control flip-flops 378, 380, or 382 will be also set. The Word Demand pulse passed by the gate 620 samples gates 628, 630 and 632, one of which is conditioned by an Interleave Control flip-flop 378, 380 or 382. The appropriate command, dependent upon which Interleave Control flip-flop has been set, thus is generated and sent to the Drum Control Register 214 over line 634, 636 or 638 to add 8, 16 or 64 to the signal stored in that register. A false No-Compare signal is passed through OR circuit 470 to inhibit the writing of the new word presently in the Write register 200. Subsequent control of the writing operation by means of address comparison is retained by the Drum Control Register 214.

The output of the set Word Demand Sync flip-flop 622 conditions gate 640 which is sampled by two megacycle computer synchronizing pulses. The gated pulse sets Word Demand flip-flop 642 and its output conditions gate 644 which is also sampled by the synchronizing pulses. The passed pulse clears flip-flops 622 and 642 and is passed through OR circuit 476 as a Step IO Word Counter pulse on line 478.

The Drum Write Register Status Sync flip-flop 578 is set by the Word Demand pulse after a suitable delay to insure that the Drum Write Register 200 is in fact cleared. When the Drum Write Register Status Sync flip-flop 578 is set, it conditions a gate 646 to pass the next two megacycle pulse which produces conduction in OR circuit 564 and clears the Drum Write Register Status flip-flop 562. The resultant output level conditions an input of AND circuit 572 and one input of AND circuit 648. Then if the IO Register 204 is full (as indicated by a set IO Register Status flip-flop 358), and the Write Drum flip-flop 368 is set (indicating that a writing operation is still in process), AND circuit 572 will condition gate 574 to pass the next two megacycle pulse to produce the transfer command IO Register to Drum Write Register, and will set the Drum Write Register Status flip-flop 562, clear the IO Register Status flip-flop 358, clear the Drum Write Register Status Sync flip-flop 578 and set the Write Register Status flip-flop 386, in a manner similar to that previously described.

The above described operations are repeated as a result of further Break Requests, and breakout operations occur until the IO Word Counter 176 is stepped to zero. This will be indicated by the IO Word Counter Status flip-flop 408 which is cleared by a Word Counter End Carry pulse (line 490). AND circuit 648 will therefore be fully conditioned (the Not Read Drum flip-flop 372 is set and the Drum Write Register Status flip-flop 562 is cleared) when the required number of words, as specified by the Write instruction, have actually been written on the drum. When the last word is written on the drum, the drum Word Demand pulse causes the IO Word Counter Status flip-flop 408 and the Write Drum flip-flop 368 (through OR circuit 650) to be cleared by means of the End Carry pulse. The Write Drum flip-flop 368 is cleared after the last words have actually been written on the drum and AND circuit 572 cannot subsequently be energized to set the Drum Write Register Status flip-flop 562. Another breakout cycle is initiated, however, as soon as the Word Demand pulse passes gate 488 which is conditioned by the IO Word Counter Status flip-flop 408 before that flip-flop is set to zero by the End Carry pulse. The BO–11 pulse of that cycle will be passed by gate 652, which is conditioned by AND circuit 648, and by gate 654, which is conditioned by the Drum Operate flip-flop 366. In this way, the Clear IO Interlock command (line 538) is produced and the IO Interlock flip-flop 406 is cleared. The Not Read Drum flip-flop 372 is cleared by the next two megacycle pulse gated by gate 656. Thus the drum writing operation ends.

*Miscellaneous.*—During a Sense instruction, the status of the IO Interlock flip-flop 406 is sensed to determine whether an information transfer between the Computer and an external unit is in progress. A Select IO Interlock level from the Index Interval Register 158 is applied to AND circuit 658, the other input of which is conditioned by the set flip-flop 406, indicating an IO operation is in progress. The output of AND circuit 658 conditions gate 660 and the OT–9 pulse, produced during the Sense instruction on line 662, samples gate 660. If this pulse is passed the command Set Branch Flip-flop is generated on line 664.

Area Discriminator control commands are also routed through the IO Control 170. An appropriate level from the Index Interval Register 158 is applied to gate 666 or 668, depending on whether Area Discriminator 274 or 276 is to be read. When one of the gates is appropriately conditioned, the pulse OT–9 during the Operate instruction is passed by the conditioned gate on line 348 or line 350 such that the Manual Input Element renders the selected Area Discriminator operative.

*TD and RD Drum Timing Circuits*

The Drum Timing Circuits 262 and 264 operate in response to signals from the timing tracks 190 and 220, respectively, and from the index tracks 180 and 218, respectively, on their associated drums. The circuits function to provide a delay which suspends the start of a reading operation for a period of approximately 120 microseconds. The reason is that the read amplifiers of the selected field are subjected to a blocking voltage that cuts off those amplifiers for from 80 to 120 microseconds due to a surge of current through the read amplifier input transformers when the read amplifiers are switched into operation. On the computer (CD) side of the drum system requisite delay is introduced by the deselect pulse which operates a single shot multivibrator.

On the output (OD) side, RD and TD drum field selection is automatic and no deselect pulse is available to provide the necessary delay. To compensate for this, the TD and RD Drums 106, 104 are provided with twelve more registers and accompanying timing cycles than found on the other drum in the described embodiment. Counters in the timing circuits 262, 264 inhibit the transmission of the first twelve timing cycles in each drum revolution to the Computer Input-Output Control and to the Read Control Circuits 260 and 266, thereby delaying the reading and writing operations for 12 cycles at the beginning of each drum revolution. Thus, drum timing pulses (DTP) are generated from all the cycles of each drum revolution whereas OD (and CD) pulses are generated only from those cycles that are present after twelve cycles are skipped at the beginning of each drum revolution.

Figure 5:
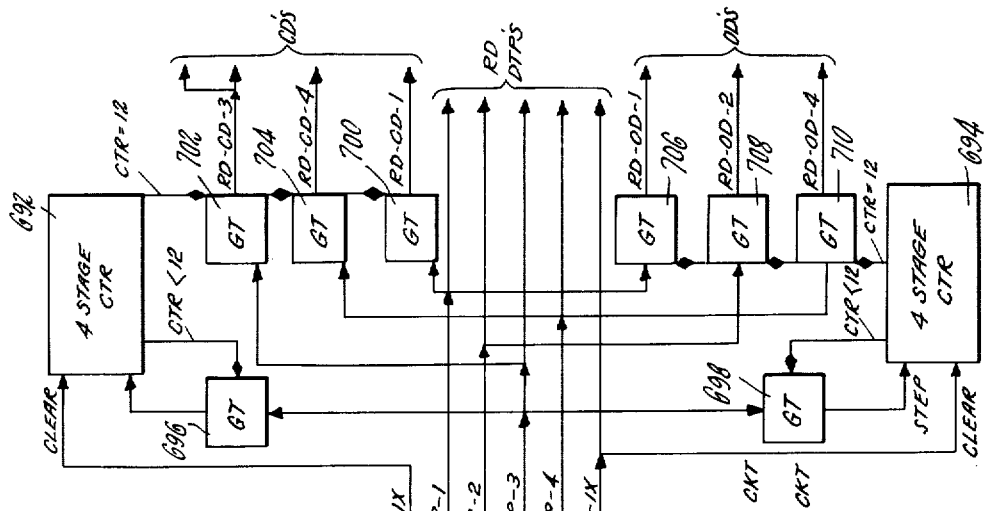
FIGURE 5 is a schematic diagram in logical block form of the RD Drum Timing circuitry shown as block 264 in FIGURE 2.
Figure 4:
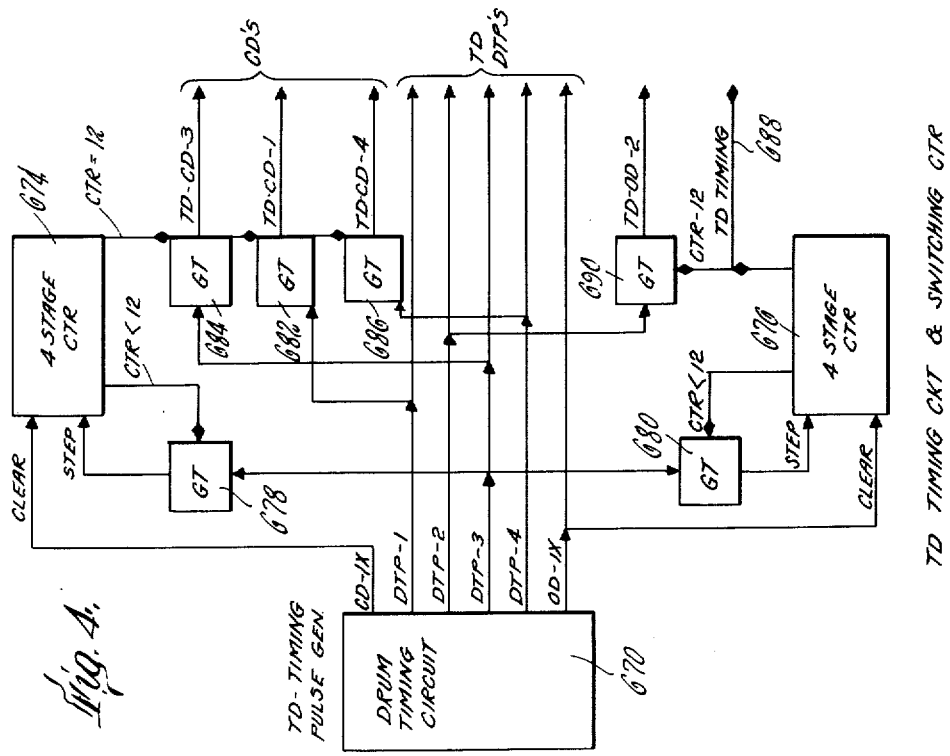
FIGURE 4 is a schematic diagram in logical block form of the TD Drum Timing circuitry shown as block 262 in FIGURE 2.

With reference to FIGURES 4 and 5, the Drum Timing Circuits 670, 672 are similar to those disclosed in the patent application Serial Number 494,982 entitled Magnetic Data Storage, filed March 17, 1955, by Hawley K. Rising et al. There is a CD read head and an OD read head associated with the index channel on each drum, and these read heads are the source of the CD index and the OD index pulses. The Drum timing pulses (DTP's) are received from the reading heads on the timing channels 190, 220.

Associated with the TD Timing Circuit (FIG. 4) are two identical four stage counters 674 and 676. The CD counter 674 is cleared by the CD index pulse, and the OD counter 676 is cleared by the OD index pulse. Each counter is stepped by a gated DTP3 pulse which is transmitted when the counter output level indicates a count of less than twelve (either the third stage or the fourth stage in the counter is not set). Gate tube 678 is associated with the CD counter 674 and gate tube 680 is associated with the OD counter 676. When both stages in the CD counter 674 are set (at a count of twelve), the gate tube 678 is deconditioned and gate tubes 682, 684, and 686 are conditioned to pass drum timing pulses (DTP-1, 3, and 4) as CD1, CD3 and CD4 pulses, respectively. The count of twelve output from the OD counter 676 produces a TD timing level on line 688 and conditions gate tube 690 to pass Drum Timing pulses (DTP-2) as OD2 pulses.

In the RD Timing Circuit 264 (FIG. 5) similar counters 692 and 694 and associated gates 696, 698 are utilized. The output level of the CD counter 694 at the count of twelve conditions gates 700, 702 and 704 to pass Drum Timing pulses (DTP-1, 3 and 4) as CD1, CD3 and CD4 pulses, respectively. The OD counter 694, at count of twelve, conditions gates 706, 708, and 710 to pass Drum Timing pulses (DTP1, 2 and 4) as OD1, OD2, and OD4 pulses, respectively.

Each counter is cleared by a pulse from its associated index read head, removing the count of twleve level, and thus interrupting the production of CD and OD pulses for a period of approximately 120 microseconds during each drum revolution.

TD Read Control Circuitry

The transmission of data from the RD Drum 106 to the display element is performed under the supervision of the TD Read Control circuit 260. Although words may be transmitted from the TD Drum to the Display Circuitry at a date limited only by the Drum's capability, the display of a TD message, which consists of eight words, takes considerably longer than the period required for the transfer of the words alone. The TD Read Control circuit 260 develops the necessary time delays between successive transfers of messages by employing a precessed reading pattern. Each of the six fields on the Drum 106 is read in the following manner: twelve slots (slot—group of eight registers) are skipped, and one slot is read. After each revolution of the drum the reading pattern is set ahead (precessed) one slot so that the next set of slots will be read. This pattern is repeated until the entire field has been read, which necessitates thirteen revolutions of the drum for the complete reading of a field. The six fields of the TD Drum 106 are read sequentially, commencing with field one. At the completion of the reading of the TD Drum, a signal is developed in the TD Read Control circuit 260 to initiate the reading of the RD Drum 104. At the completion of the reading of the RD Drum 104, its Read Control circuit 266 develops a signal to commence the TD Drum reading again, and so forth.

Control signals utilized in the RD Read Control circuitry 260 include Drum Timing pulses (DTP), OD pulses, a TD timing level from the TD Drum Timing Circuit on lines 712, and a Start TD pulse on line 714 from the RD Read Control circuitry 266. The TD Read Control circuitry 260 develops: Word-On-Way pulses (at DTP4) (line 334), Read Sample pulses (at DTP1), (line 716), a Start RD pulse (line 314) at the end of the TD Drum reading cycle, a TD Select level (line 718), and field select levels for the selection of the TD field to be read (lines 720).

Figure 6:
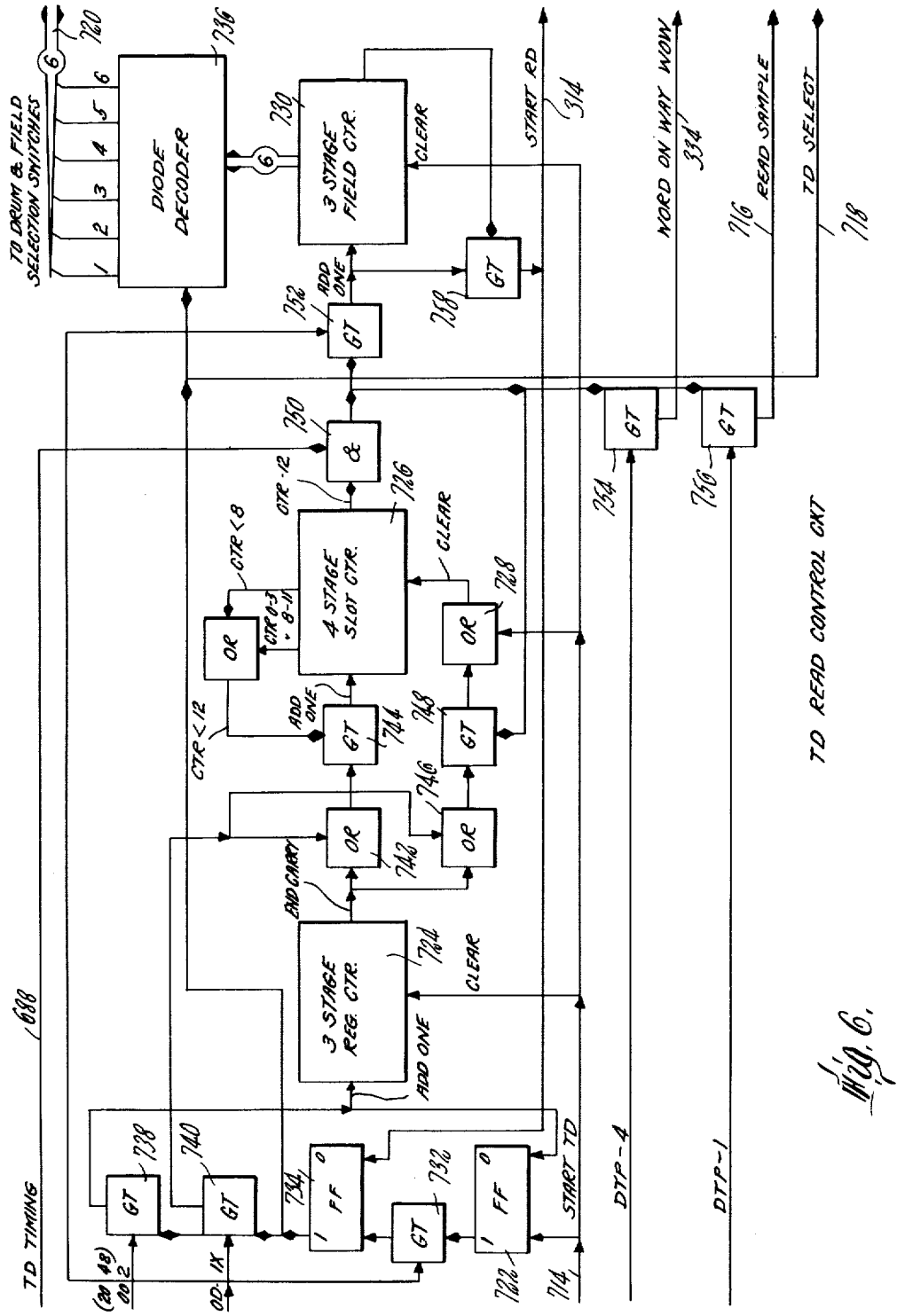
FIGURE 6 is a schematic diagram in logical block form of the TD Read Control circuitry shown as block 260 in FIGURE 2.

The operation of the circuitry may be understood with reference to FIGURE 6. The Start TD pulse (line 714) from the RD Read Control circuitry 266 sets flip-flop 722 and clears the Register Counter 724, the Slot Counter 726 through OR circuit 728, and the Field Counter 730. The output level of flip-flop 722 conditions the gate tube 732 which is sampled by the TD drum index pulse to set flip-flop 734. The output of flip-flop 734 conditions the diode decoder 736, produces a TD Select level (line 718), and also conditions gate tube 738 to pass OD2 pulses. Gate tube 740 is also conditioned by the same D.C. level but not in time to gate the index pulse that sets the flip-flop 734.

The output pulses from the gate tube 738 form Register Counter step pulses which step the three stage, scale of eight Register counter 724, and in addition clear the flip-flop 722. An output pulse from the Register Counter 724 is produced after eight gated OD2 pulses. This output pulse is transmitted as a Slot Counter stepping pulse through OR circuit 742 and gate tube 744 which is conditioned when the slot counter output is not twelve; or it is transmitted as a slot counter clearing pulse through OR circuit 746 and gate 748 which is conditioned when the slot counter output is twelve, and OR circuit 728.

The Slot Counter 726 is a 4 stage, scale of 13 counter which is stepped each time a slot of eight registers have passed under the drum read heads as indicated by an end carry impulse from the Register Counter 724. The Slot Counter 726 is of a type well known in the art, comprising four flip-flop circuits, each having a complementing input. Until the count of twelve, the third and/or the fourth stages of the counter are in the zero (cleared) condition. At the count of twelve, both the third and fourth stages are in the one (set) condition and an output is produced. This output conditions one input of AND circuit 750, and with the TD timing level (line 688) the AND circuit produces an output which conditions gate 748 to pass the next Register Counter pulse, (count of eight of the Register Counter) to clear the Slot Counter 726. The Slot Counter output level also conditions gate tubes 752, 754 and 756. Drum Timing pulses (DTP-4) sample gate 754 to produce a Word On Way pulse (line 334) which is sent to SD Control 338 through the Timing Pulse Switch 268. Drum Timing pulses (DTP-1) sample gate 756 to produce a Read Sample pulse which energizes the read heads 192 in the OD Read Circuits 258 such that the word in the register then under the heads is transferred. Eight words are read from the drum and then the Slot Counter 726 is cleared by the Register Counter output pulse. Gates 752, 754 and 756 are deconditioned when eight words have been transferred, and the reading pattern is repeated for one revolution of the drum, i.e. twelve slots are skipped and one slot is read, etc.

The index pulse at the beginning of the next drum revolution is passed through gate 740, as conditioned by the set flip-flop 734, to produce a Slot Counter stepping pulse through OR circuit 742 and gate 744. As a result, the Slot Counter 726 is stepped ahead in its count. Each group of eight Read Sample pulses is produced one slot earlier during the second revolution than it otherwise would have been.

At the end of thirteen revolutions, all the registers on the selected TD field have been read. The Slot Counter output level then coincides with the index pulse in gate tube 752, and the passed pulse produces a Step Field level to step the Field Counter 730. The output of the Field Counter 730 selects the next field to be read by establishing a combination of D.C. levels at the input to the diode decoder 736. When the Field Counter 730 was cleared, the combination of the zero outputs from its three stages and the TD Select level provides the necessary conditions for the selection of field one in the diode decoder 736. The Select Field level is applied to the center taps on the thirty-three reading heads of the first track display field and enables them to conduct. When the Field Counter 730 is stepped, its output changes, causing the next consecutively higher field select level to be produced. Each field is read by the precessed reading operation under supervision of the TD Read Control circuit 260. The count of six level of the Field Counter 730 conditions gate tube 758 to pass the next Step Field pulse to form a Start RD pulse which is sent to the RD Read Control circuit 266 on line 314. In addition the output of gate 758 clears flip-flop 734, thus terminating the TD Drum reading cycle.

In summary, the six fields of the TD Drum are read consecutively, in a precessed reading pattern of skip twelve slots, read one slot, etc. The eight registers of a slot are counted by Register Counter 724, the slots by Slot Counter 726 and the fields by Field Counter 730.

RD Read Control Circuitry

The transmission of data from the RD Drum 104 to the display element is performed under the supervision of the RD Read Control circuit 266. The display time required for each RD message is considerably longer than the time required for the transferal of the single word of the RD message from the RD Drum. The RD Read Control circuit develops the necessary time delays between successive transfers of RD messages by employing a "precessed" reading pattern. Each field of the RD Drum is read in the following manner: one register is read, five registers are skipped, one register is read, etc.; after three revolutions of the drum the reading pattern is set ahead (precessed) one register. The reading pattern is repeated for three more drum revolutions to complete the reading of the entire field. The read heads 192 are then switched to the next successive field. Eight of the nine fields of the RD Drum are read during the RD display cycle, beginning with the field containing the oldest information written thereon by the computer 100 and ending with the latest field on which the computer had completed writing at the start of the RD cycle. The ninth field, to which the computer was in the process of transferring data at the start of the RD drum reading operation, is not read in order to avoid possible confusion or erroneous indications of data contained thereon in the message display. At the completion of the reading cycle, a signal is developed in the Read Control circuit 266 to initiate the reading cycle of the TD Drum.

Control signals utilized in the RD Read Control circuitry include Drum Timing pulses (DTP-1, 4) and OD pulses (OD-1, 2, 4, and Index) from the RD Drum Timing circuit 264, (lines 318) and a Start RD pulse from the TD Read Control circuitry (line 314). The RD Read Control circuit 266 develops Word On Way pulses (at OD4 time on line 322), Read Sample pulses (at OD1 time on line 326), Display Bright pulses (associated with data read from the most recent field written on by the Computer and occurring at OD1 time on line 328), Display Dim pulses (occurring, in conjunction with the display of data from the seven older fields that are read, at OD1 time on line 330), a Start TD pulse at the end of the RD drum reading cycle (line 714), and RD and field select levels for the selection of the RD fields next to be read (line 760).

The operation of the circuitry 266 may be understood with reference to FIGURES 7A and 7B. The selection of the fields to be read by the RD Read Control circuitry 266 is accomplished in coordination with computer signals through the Step Scan Synchronizer circuit (shown in FIG. 7B). When situation display reading is first initiated, a Reset pulse (line 762) is passed through OR circuits 764, 765, 766, and 768 to clear flip-flops 770, 771, 772, and 774, respectively. Subsequently the Computer indicates that it intends to write on a new field on the RD Drum 104 by a command on line 776 which sets flip-flop 772. The one output of flip-flop 772 conditions gate 778 to pass a DTP1 pulse, which sets flip-flop 774, producing a Step Scan Counter level. (This level also goes to AND circuit 780, to insure that no data is displayed during the reading of this selected RD field, as described hereinafter). The Step Scan Counter level conditions gate tube 782, to pass an OD2 pulse as a synchronized Step Scan Counter pulse. This pulse resets flip-flops 772 and 774 through OR gates 766 and 768, respectively, and steps the Scan Counter 784 through gate 786. The Scan Counter 784 is a four stage, scale of nine counter which is cleared by the count of nine or by a Reset Scan Counter pulse from the Computer on line 788 through OR circuit 790. The latter pulse is generated when the Computer makes its first selection of an RD field. Selection of RD Drum field No. 1 by the Computer for writing operations is indicated by the Scan Counter being placed in cleared condition. Similarly, the selection of field No. 2 is indicated by a count of one in the Scan Counter, etc. The D.C. levels developed as outputs of the flip-flops in the counter are sent to the transfer gates 792. Thus a constant indication of the field which the Computer has selected for writing is present in the RD Read Control.

An OD index pulse is passed by gate 792 when it is conditioned by the cleared main RD Control flip-flop 771 to set flip-flop 794 and to clear the field switching counter 796 through OR circuit 798. The next DTP4 pulse is passed by gate 800, conditioned by the one output of flip-flop 794, as a Transfer Scan Counter pulse. This pulse effects the transfer of the count in the Scan Counter 784 from the Transfer gates 792 into the Field Switching Counter 796. The next DTP1 pulse (occurring 2.5 microseconds later) is passed by gate 802, which is conditioned by the one level of flip-flop 794, OR circuit 804, and gate 800. It is applied to Counter 796 as a Step Field Switching Counter pulse which adds one to the new setting of the Field Switching Counter 796. This pulse also clears flip-flop 794. The setting of the Field Switching Counter, when decoded by the appropriately conditioned Field Selection unit 808, thus provides an output to the Field Switching unit 810 which energizes those read heads associated with the field containing the oldest data written on the RD Drum by the Computer.

The RD Drum reading cycle is initiated by the Start RD pulse from the TD Read Control circuit (line 314). This pulse sets the control flip-flop 770 and clears the Register Counter 812 and the Field Read Counter 814. The set level of the flip-flop 770 conditions gate 816 to pass the next OD-index pulse to set the main Read Control flip-flop 771. The output level of set flip-flop 771 is the Select RD level (line 760) and this level also conditions the Field Selection Matrix 808, energizing the read heads for the field indicated by the count in the Field Switching Counter 796. In addition, the output level of flip-flop 771 conditions gate 818 to pass OD2 pulses from OR circuit 870 as Step Register Counter pulses, which step the Register Counter 812 through gate 822, or clear the Counter through gate 824 and OR circuit 876. Gate 822 is conditioned by an output signal from the Counter 812 when the count contained therein is not five, and gate 824 is conditioned by a count of five Counter output. The gated OD2 pulse clears flip-flop 770 through OR circuit 764.

A D.C. level, produced when the Register Counter count is 1, conditions gate tubes 828, 830 and 832. The OD4 pulse, which samples gate tube 832, is passed as a Word On Way signal on line 322; and the OD1 pulse (occurring 2.5 microseconds later), which samples gate tube 830, is passed as an RD Read Sample pulse on line 314 such that one word is read from the RD Drum 104. Thus, a Read Sample pulse is produced every six registers, at Register Counter count 1, and the five drum registers in between are not read. During the second revolution of the drum the "read one register and skip five registers" pattern begins at the fifth drum register, and during the third revolution the pattern begins at the third drum register. At the end of three drum revolutions, all the odd numbered registers on the field will have been read. The OD index pulse then coincides with the register count of zero level which conditions gate tube 834 and is passed through that gate, OR circuit 820, and gate tube 818 as a Step Register Counter pulse. In this manner the Register Counter 812 is precessed (set ahead one register) and during the next three revolutions of the drum all the even numbered registers are read in the same reading pattern as was the case for the odd numbered registers. At the end of six revolutions, the Register Counter count of one level conditions gate tube 828 at the time that it is sampled by the OD index pulse. The index pulse is passed to step the Field Read Counter 814, to clear the Register Counter 812 through OR circuit 826 to set the "Dim" flip-flop 836 through the OR circuit 804 and to step the Field Switching Counter 796 through gate 806 or gate 837, depending upon which is conditioned by the Counter 796.

The Field Read Counter 814 is a three stage, scale of eight circuit which controls the generation of the Display Bright pulses. Display Dim pulses accompany all RD messages which are to be displayed except those from the last RD field which is read during an RD message display cycle. Gate 838, conditioned by the one output of the flip-flop 836, having been set by the Step Field Counter pulse, passes the Read Sample pulse as a Display Dim pulse (on line 330). At the seventh step field read counter pulse, reading of the eighth and last field begins. The Field Read Counter 814 count of seven level conditions gate tubes 840 and 842. The next OD2 pulse is passed through gate 840 and OR circuit 844 to clear flip-flop 836, deconditioning gate tube 838. The conditioned gate tube 842 passes the Read Sample pulse as a Display Bright pulse on line 330.

If selection of an RD field by the Computer should occur during the reading of the first RD field, Computer write field switching occurs in the midst of the reading operation. In order to prevent confusion at the Display Consoles, the display of this field is suppressed in the following manner. The Step Scan Counter level from flip-flop 774 conditions one input to AND circuit 780. As the Field Read Counter count is zero at this time, AND circuit 780 is conditioned and its output conditions gate tube 846 to pass an OD2 pulse through OR circuit 844, clearing the Dim flip-flop 836 so that gate 838 is deconditioned and no Display Dim pulse is developed. Since the count of Field Read Counter 814 is not seven, gate 842 is not conditioned and no Display Bright pulse is developed. As neither the Display Dim nor Display Bright level is present, the display element does not raise an intensification level and no messages are displayed during the reading of this field.

The eighth Step Field Counter pulse develops an End Carry pulse from Counter 814 which is sent to the TD Read Control circuit as a Start TD pulse on line 714 to initiate reading of the TD Drum. In addition the End Carry pulse clears the main RD Control flip-flop 771 through OR circuit 765, ending this reading cycle of the RD Drum.

Thus the RD Read Control 266 generates a precessed reading pattern for the transferral of single word messages from the RD Drum at periodic intervals. A Word-On-Way (WOW) signal is generated which precedes the message transfer by 2.5 microseconds and a Display Dim or Display Bright signal is generated and accompanies each message which is to be displayed. The RD Read Control, in addition, is coordinated with RD field selection by the Computer so that the fields are read in chronological sequence according to the age of the data stored therein.

*Timing Pulse Switch*

The Timing Pulse Switch 268 controls the distribution of RD and TD timing and Word-On-Way pulses to the Situation Display Control 338. With reference to FIGURE 8, drum timing pulses (DTP) from the RD Drum Timing circuit 264 are transmitted on lines 324 through OR circuit 848. The pulse outputs of OR circuit 848 sample gate tube 850 which is conditioned by the RD select level (line 760) generated in the RD read control circuit. When this level is present, the RD drum timing pulses are passed through gate 850 and OR circuit 852 to the Situation Display Control on line 326 as situation display timing pulses. The TD drum timing pulses (DTP), transferred from the TD Drum Timing circuit 262 on line 332, are processed in a similar manner, the same being passed through OR circuit 854 to produce an output which samples gate 856. The latter gate is conditioned by a TD select level (line 718). When that level is present, TD timing pulses are passed through gate tube 856 and OR circuit 852 to line 326 as situation display drum timing pulses.

There is also an OR circuit 858 in the Timing Pulse Switch which conducts whenever a TD Word-On-Way pulse (line 334) or an RD Word-On-Way pulse (line 322) conditions it, thereby producing situation display Word-On-Way pulses which are transmitted to the Situation Display Control on line 323.

*Layout and Display Form of Messages*

Figures 9, 11, 14, 24:
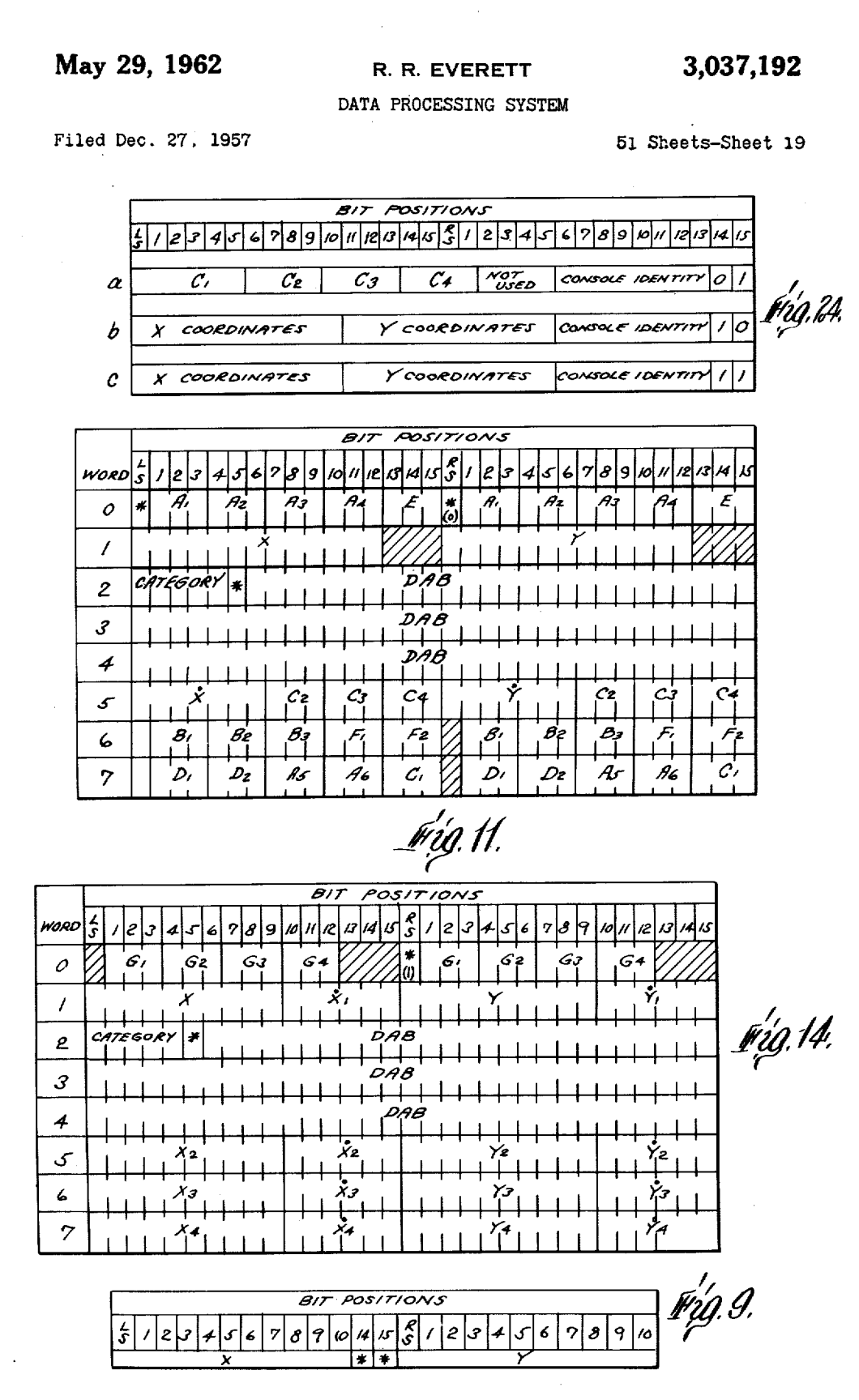

The simple positional information (RD) message consists of one word of 24 bits and is read from the RD Drum 104 in the form indicated on FIG. 9. Bits LS–L10 define the X coordinate of the message in the display location, bits RS–R10 the Y coordinate location, bit L14 identifies the source of the information and bit L15 indicates whether this information has been correlated with other similar information by the computer. (The information indicated by bits L14, 15 is determined by the programming of the computer and other information may be contained therein if desired.)

The form of RD display is indicated in FIG. 10, each word generating one symbol in the series display. As is illustrated, the successive positions of a single object are shown with the most recent position being displayed at a higher intensification level (shown as a larger symbol).

This different intensification level is utilized to distinguish this position and to provide an indication of the direction of movement of the object.

Additional information relative to selected objects may be displayed by means of tabular or vector messages which are read from the TD Drum 106. Each message consists of eight 32 bit words (0–7) which are read from consecutive registers on the TD Drum. The layout of the tabular message is indicated in FIG. 11, and the layout of the vector message in FIG. 14. Each type of message includes ninety display assignment bits (DAB) (in words 2, 3, and 4), which are utilized to route messages to display consoles according to the assignments indicated by the values of the DABS's, and five category bits (word 2, bits LS–4) which are utilized, in conjunction with category switches, to provide optional means whereby the display console operator may select messages of the desired categories (there being 31 TD categories and 8 RD categories).

In addition, certain other bits in the TD messages are used for control purposes. These bits are indicated by stars on FIGS. 11 and 14. Bit LS of word zero establishes the type of tabular message. If this bit is one the message is of the track type (it has a vector associated with it) and if it is zero the message is of the information type (no vector displayed). Bit RS of word zero indicates whether the message is tabular or vector, zero for the former (FIG. 11) and one for the latter (FIG. 14). Bit L5 of word two is the display bit, a one being required in this position to display the message. Bit LS of word six (tabular messages only) controls the use of the manual intervention means, the presence of a zero permitting the use of the light gun. Bit LS of word seven (tabular messages only) is a position bit which controls the position of the character format (FIG. 13) with respect to the single vector displayed with that message, as shown in FIG. 13.

The bit positions indicated by shading are unused in the message. The remaining bit positions are used for vector and character generation to develop the vectors and features associated with each message.

A tabular track message display consists of a single vector and a character format consisting of one or more of the features in the locations indicated in FIG. 12, and this format may be positioned with respect to the vector in one of four places as indicated in FIG. 13. There are a maximum of twelve characters in the format which may include the A feature or the B and F features (which share some of the same format positions), and the C, D and E features as selected by the console operator. The point of origin of the single vector which may be displayed with this message is brightly intensified for manual intervention purposes and the format is positioned with respect of the origin of vector according to the vector direction and the value of the position bit, as described hereinafter in greater detail. The bits which define the point of origin of the single vector (X, Y) and its sense and magnitude ($\dot{X}$, $\dot{Y}$) are contained in words two and five respectively as indicated in FIG. 11. The bits which define the various features are similarly identified by letter in FIG. 11.

A vector message display consists of four vectors and a format of four characters ($G_1$–$G_4$) as shown in FIG. 15. (The vectors may appear at random or be displayed substantially end to end.) The format is located adjacent the origin of the fourth vector in one of the positions indicated in FIG. 16, the selected position being dependent on the direction of the fourth vector. The bits defining the G feature are contained in word zero, the position, sense and magnitude of the first vector is defined in word one, of the second vector in word five, of the third vector in word six and of the fourth vector in word seven, as indicated in FIG. 14.

*Situation Display Control*

The Situation Display Control 338 regulates the operation of the display elements in producing situation displays on the cathode ray tubes 102 of the display Consoles 272. The SD Control 338 contains counting and switching means that use drum control pulses and message control bit information to supervise and control: (a) The transfer of words into the display element from the drums 104 and 106, (b) the storage and distribution of portions of the words in proper sequence to develop and position the characters and vectors in the desired message format as shown in FIGS. 10, 12 and 15, and (c) the display of the messages.

Six types of drum control pulses synchronize the operation of the SD Control with the reading operation in the drum system. The signals are:

(1) OD timing pulses (OD 1, 2, 3, and 4 pulses transmitted over line 326 at 2.5 microsecond intervals),
(2) Word On Way pulses (transmitted on line 323 at OD 4 time, prior to the reading of a word from the drum at OD 1 time),
(3) Start TD pulses (transmitted at the start of a TD reading cycle on line 714),
(4) Start RD pulses (transmitted at the start of an RD reading cycle on line 314),
(5) RD Bright pulses (transmitted on line 328 at the same time as a word is read from the RD drum field most recently written on by the computer),
(6) RD Dim pulses (transmitted on line 330 at the same time as a word is read from the seven other RD drum fields during an RD cycle).

Additional control pulses for the generation of situation displays are derived from bits contained in the messages themselves. The following information bits are used:

(1) Vector message bit (bit RS of word zero is one) (line 860),
(2) Tabular message bit (bit RS of word zero is zero) (line 862),
(3) Tabular Track message bit (bit LS of word zero is zero) (line 864),
(4) Tabular Information message bit (bit LS of word zero is one) (line 866),
(5) Display signal bit (bit L5 of word two is one) (line 868),
(6) Use Light Gun signal bit (bit LS of word six is zero) (line 870).

In addition, in the case of RD messages, the presence of any positional information (ones) in the Message Positioning Register (FIG. 22) is utilized to generate a display signal in the SD Control over line 872. Transfer information signals received from the Manual Input Element on line 346, request the transfer of positional information relating to an RD message or the track number of a TD message.

Figure 17D:
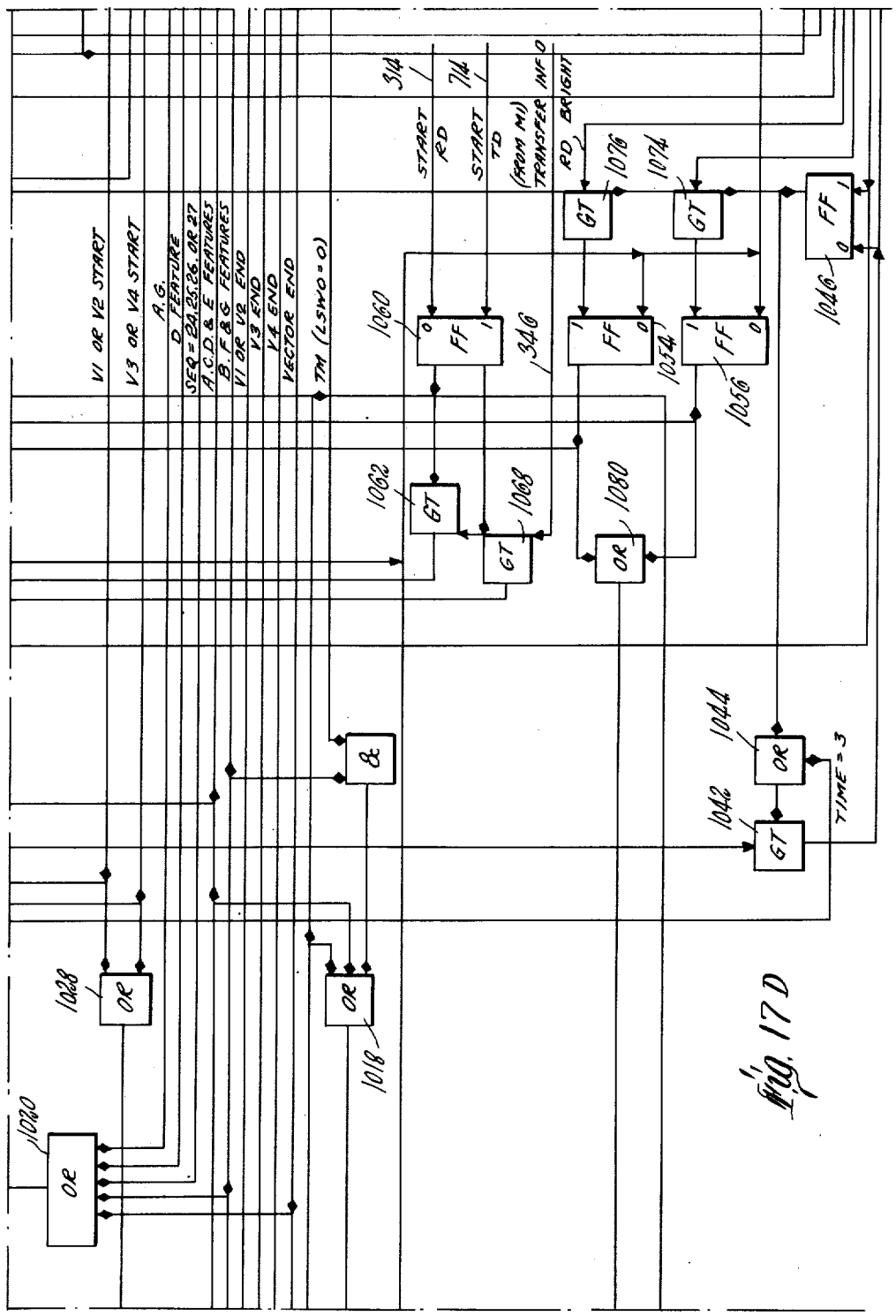
FIGURE 17 (A-H) is a schematic diagram in logical block form of the Situation Display Control shown as block 338 in FIGURE 2.
Figure 17E:
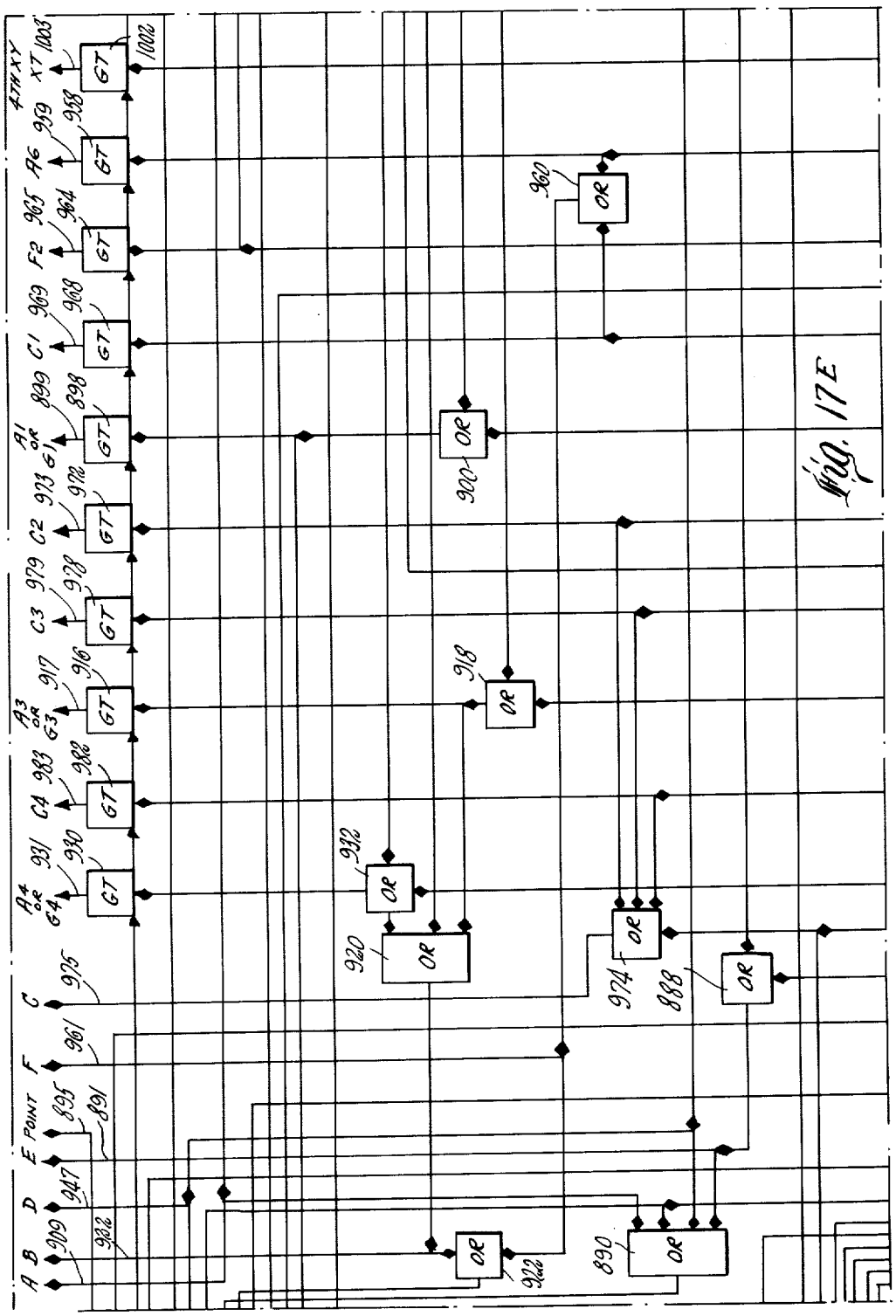

The operation of the Situation Display Control 338 may be understood with reference to FIG. 17. Three counting circuits, the Distributor 874, the Timer 876 and the Symbol Sequencer 878, provide internal regulation of the transfer and display of information in the display circuitry by generating coordinated pulses and D.C. levels for use in that circuitry.

At the beginning of a message display cycle the first Word-On-Way pulse, on line 323, samples gate 1032 which is conditioned by the output from the cleared flip-flop 1034. This gated Word-On-Way pulse clears the Distributor 874 and sets flip-flop 1034. The resultant output level from flip-flop 1034 conditions gate 1036 to pass drum timing pulses, which enter the SD Control on line 326 from the Timing Pulse Switch 268, to the Distributor 874 as stepping pulses. These pulses occur at 2.5 microsecond intervals.

The Distributor 874 is a two-stage counter which effectively separates and channels these drum timing pulses on to four separate lines 881, 882, 883 and 884 as OD1, OD2, OD3 and OD4 pulses, respectively. Pulses OD1, OD3, and OD4 are used in conjunction with Timer and Symbol Sequencer output levels to generate display control signals. OD2 pulses, although available are not used in the SD Control. The Distributor thus is stepped by pulses which occur at 2.5 microsecond intervals and provides the most precise degree of timing control within the SD Control.

The Timer 876 (FIG. 17A) is a three-stage counter which is stepped by OD3 pulses from the Distributor on line 883. These pulses occur at 10 microsecond intervals. The Timer is initially cleared and during a TD message display cycle it is stepped from zero to seven by OD3 pulses passed through gate tube 1032. At the timer count of seven gate tube 1034 is conditioned, and gate tube 1032 is deconditioned such that the pulse is passed through the former gate tube and resets the timer to a count of three. Gate tube 1032 is then reconditioned and stepping pulses again advance the Timer count to seven. It is then again reset to three. The cycle is repeated until the end of the display cycle at which time the Timer is cleared.

In RD message displays, the Timer is initially set to the count of two by the Start RD pulse on line 314. It is stepped from the count of two to a count of seven by pulses passed through gate tube 1032 and reset to a count of three by a pulse passed through gate tube 1034, at which time the RD message display cycle ends.

The Symbol Sequencer is a five stage counter and is stepped by OD1 pulses on line 881 which are passed through gate 1042. Gate 1042 is conditioned by the output of OR circuit 1044. This OR circuit is conditioned by the output of flip-flop 1046 which is set by Word-On-Way pulses on line 323 or by a Timer count of three level. The first Word-On-Way pulse, which samples gate 1032 and sets flip-flop 1034, also sets flip-flop 1046. The resultant output level conditions gate tube 1042 through OR circuit 1044 to pass the OD1 pulse which occurs 2.5 microseconds later, and which steps the Symbol Sequencer. This stepping pulse also clears flip-flop 1046, thereby deconditioning gate 1042. Each subsequent Word-On-Way pulse, which precedes each of the eight words read from the TD drum at OD4 time, thus conditions gate tube 1042 to pass the OD1 pulse as a Symbol Sequencer stepping pulse. Thus, the Symbol Sequencer is stepped from count of zero to count of seven by pulses spaced at 10 microsecond intervals. After the end of the TD drum reading operation no more Word-On-Way pulses are generated and subsequently OR circuit 1044 is conditioned by a Timer count of three level (which is 10 microseconds in duration and occurs at 50 microsecond intervals). The Symbol Sequencer is stepped from count of eight to count of twenty-seven at 50 microsecond intervals. The Symbol Sequencer count of twenty-seven conditions OR circuit 1048 which in turn conditions gate tube 1050. Gate tube 1050 is sampled by the OD1 pulse which is passed by a gate tube 1040 at Timer count of seven and when gate tube 1050 is conditioned, the pulse is passed to clear flip-flop 1034. The resultant output level conditions gate tube 1052 and gate tube 1032. Drum timing pulses on line 326 sample gate tube 1052 and are passed to the display circuitry, as End of Cycle Clear pulses, to the Timer as a clearing pulse to the Symbol Sequencer as a clearing pulse, and to clear flip-flops 1054, 1056 and 1058.

During an RD message display cycle, wherein each message consists of one word, the Word-On-Way pulse samples gate 1032 and is passed as a Distributor clearing pulse and a setting pulse to flip-flop 1034 and flip-flop 1046. The output of the latter conditions gate tube 1042 through OR circuit 1044 such that an OD1 pulse is passed to step the Symbol Sequencer. The Start RD pulse on line 314, as above described, cleared flip-flop 1060. The resultant output level conditions gate tube 1050 through OR circuit 1048 and conditions a gate in the Timer which passes an EOC Clear pulse to set the timer to a count of two. The Symbol Sequencer 878 is stepped by an OD1 pulse when flip-flop 1046 is set by the single Word-On-Way pulse and when the Timer has an output level at the count of three. The Timer 876 is stepped from count of two to a count of seven, and then reset to a count of three by a pulse which is passed through a gate 1040. This gated pulse also samples gate 1050 which is conditioned by the output level of flip-flop 1060 and the pulse is passed to clear flip-flop 1034 and end the display cycle.

Additionally, the output of the cleared flip-flop 1060 (cleared by the Start RD pulse on line 314 which occurs at the beginning pulse at RD display cycle) also conditions gate tube 1062, OR circuit 1018, one input of AND circuit 1064 and is sent to the display circuitry as an RD level on line 1066. Flip-flop 1060 is set by Start TD level which occurs at the beginning of the TD display cycle on line 714, and the resultant output level of flip-flop 1060 conditions gate tube 1068. Gate tubes 1062 and 1068 are sampled by a Transfer Information pulse from the MI Element 278 on line 346, and, depending upon which gate is conditioned, a Transfer command is sent to the Transfer gates in the display circuitry. If gate 1062 is conditioned, a Transfer XY Coordinates pulse is sent on line 1070, and if gate 1068 is conditioned, a Transfer Track Number pulse is sent on line 1072. The output of flip-flop 1046, set by the Word-On-Way pulses, in addition to conditioning OR circuit 1044, also conditions gates 1074 and 1076 and is sent to the input gates section as a conditioning potential on line 1078. The RD Dim pulse on line 330 samples gate 1074 and is passed to set flip-flop 1056. The resultant output level conditions OR circuit 1080 and is transmitted to the display circuitry as an RD Dim level on line 1082. The RD Bright pulse on line 328 samples gate 1076 and is passed to set flip-flop 1054. The resultant output level conditions OR circuit 1080, and it is also sent to the display circuitry as an RD Bright level on line 1084.

Figure 17H:
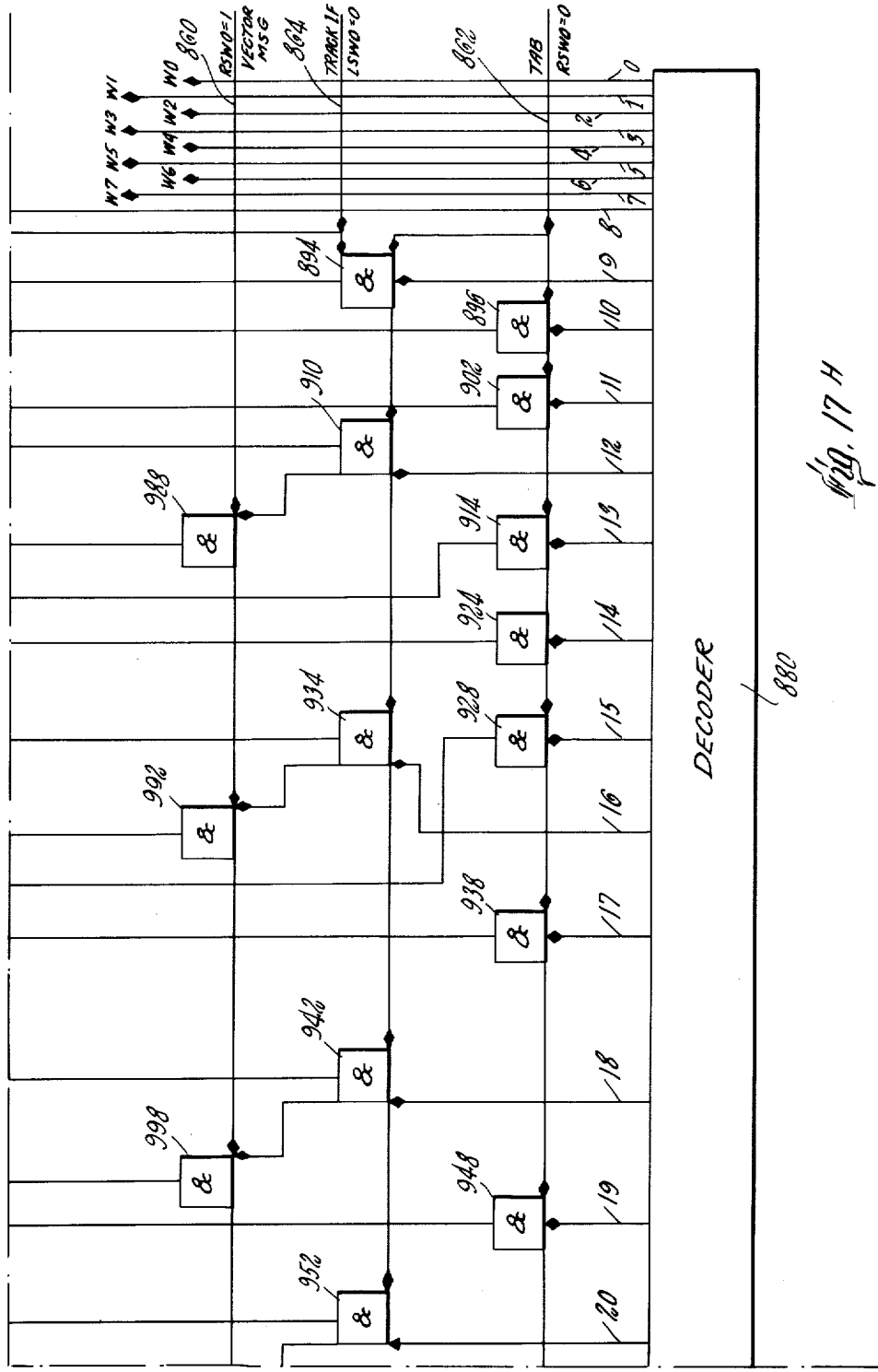

The three counting circuits control the generation of commands which are applied to the display circuitry, the Distributor producing pulses at 2.5 microsecond intervals, the Timer producing levels 10 microseconds in duration, and the Symbol Sequencer producing levels initially 10 microseconds in duration (from counts zero to seven) and subsequently 50 microseconds in duration to a count of twenty-seven during a TD message display. The output levels of the Symbol Sequencer 878 are utilized by the decoder 880 to produce output levels as indicated in FIGS. 17G and 17H. The numbers on the lines leading from the decoder 880 correspond to the Symbol Sequencer count which raises that level. Thus Symbol Sequencer counts of zero through seven raise decoder output levels which are sent to the display element to condition admittance gates therein for the transfer of the words from the input gates into the display circuitry. Symbol Sequencer count of eight raises a level which conditions transfer gate 886 and OR circuits 888 and 890, and raises an E feature selection level at the display consoles (line 891).

The AND circuits, transfer gates and feature selection lines (shown in FIGS. 17E, F, G, and H) which are conditioned during each Symbol Sequencer count are listed in Tables 1 and 2. Table 1 lists the circuits which are rendered operative during a tabular message display and Table 2 lists the circuits which are rendered operative during a vector message display.

Those OR circuits in FIGS. 17B, C and D which are conditioned during each Symbol Sequencer count during a tabular message display cycle are indicated in Table 3 and those OR circuits which are conditioned during a vector message display cycle are indicated in Table 4.

Signal levels which are developed as a result of the output levels from the three counting circuits are indicated in Table 5. A conditioning potential from a source (Column 1) is applied to one input of a logical AND circuit (Column 2). A second conditioning level to that AND circuit is a Timer level (Column 3). The output of the AND circuit (Column 2) conditions a gate (Column 4) which is sampled by a pulse from the Distributor (Column 5), which pulse is passed to produce the signal on an output line (Column 7), either directly or by operating a flip-flop as indicated (Column 6).

Thus, during a vector message display, for example, OR circuit 1014 is conditioned at Symbol Sequencer count of 9 (Table 4). Its output conditions one input of AND circuit 1086 (Table 5, Column 2). The other input of AND circuit 1086 is conditioned by a Timer count of 7 level (Table 5, Column 3), and the resultant output level conditions gate tube 1112 (Column 4). Gate tube 1112 is sampled by an OD3 pulse (Column 5) from the distributor and that pulse is passed to set the flip-flop 1138 (Column 6), removing the vector off level from line 1150 (Column 7). Similarly, as another example, OR circuit 1016 is conditioned at Symbol Sequencer count of 10 and in turn conditions one input of AND circuit 1088. The other input of AND circuit 1088 is conditioned by Timer level of 7 and the resultant output conditions gate 1114. An OD3 pulse from the distributor samples the gate 1114 and is passed to clear flip-flop 1116, removing the Intensity gate level from line 1148, clearing flip-flop 1138 and applying the vector off level to line 1150.

The levels which are generated during an RD display cycle are indicated in Table 6. This cycle, which is 60 microseconds in duration, generates a display of one symbol whose position in that display is representative of an object positioned in a geographical area. At the beginning of the RD drum reading cycle, a Start signal on line 314 clears the flip-flop 1060 and the resultant output level is applied to a gate tube in the Timer 876 which is sampled by clear pulses passed through gate 1052, such that the Timer is set to an initial count of 2. An RD message display cycle begins with a Word On Way pulse at OD4 time. The first output level which is raised by the SD Control during an RD message cycle is the Clear Character Selection Register level pulse on line 1146 at a Timer count of 3, OD4 time. 2.5 microseconds later, at Timer count of 3, OD1, a pulse on line 1154 is generated, and is applied to gates in the RD Control to provide the proper beam positioning potentials for the Character Selection Matrix. At Timer count of 4, OD1, the Beam Defocus level is raised on line 1142, and at Timer count of 5, OD1, the Beam Intensification level is raised on line 1148. If an RD Bright pulse (line 328) accompanies this message, a Conditional Unblank pulse is raised on line 336 at Timer count of 6, OD1, and a Conditional Sample pulse is raised on line 340 at Timer count of 7, OD4. The message display cycle ends at the next OD3 pulse and End Of Cycle clear pulses are sent on line 1053 to reset the Timer to a count of 2, and to clear flip-flop 1058 through OR circuit 1057, raising the Focus level on line 1144.

The TD message display cycle is 1040 microseconds in duration during which additional levels utilized in the generation of a vector or vectors message format are raised. In addition, the transfer gates shown at the top of FIGURES 17E and F are repetitively conditioned during the TD cycle by a pulse passed through gate tube 1134 at Timer equals 3, OD1. The transfer gate, conditioned at the Symbol Sequencer count as indicated in Tables 1 and 2, passes a pulse which conditions a gate in the display circuitry (FIGURE 18).

TABLE 1.—TABULAR MESSAGE

| Symbol Sequencer | Transfer word | Feature display | AND circuit conditioned | Transfer gate conditioned | OR circuits conditioned | Feature selection line |
|---|---|---|---|---|---|---|
| 0 | 0 | | | | | |
| 1 | 1 | | | | | |
| 2 | 2 | | | | | |
| 3 | 3 | | | | | |
| 4 | 4 | E | 892 | | 888, 890 | 891 |
| 5 | 5 | E | 892 | | 888, 890 | 891 |
| 6 | 6 | E | 892 | | 888, 890 | 891 |
| 7 | 7 | E | 892 | | 888, 890 | 891 |
| 8 | | E | | 886 | 888, 890 | 891 |
| 9 | | Point | 894 | | | |
| 10 | | | 896 | 898 | 900 | |
| 11 | | $A_1$ | 902 | 904 | 906, 908, 890 | 909 |
| 12 | | $A_2$ | 910 | 912 | 908, 890 | 909 |
| 13 | | $B_1$ | 914 | 916 | 918, 920, 922 | 922 |
| 14 | | $A_3$ | 924 | 926 | 908, 890 | 909 |
| 15 | | $B_2$ | 928 | 930 | 932, 920, 922 | 922 |
| 16 | | $A_4$ | 934 | 936 | 908, 890 | 909 |
| 17 | | $B_3$ | 938 | 940 | 920, 922 | 922 |
| 18 | | $D_1$ | 942 | 944 | 946, 890 | 947 |
| 19 | | $D_2$ | 948 | 950 | 946, 890 | 947 |
| 20 | | $A_5$ | 952 | 954 | 908, 890 | 909 |
| 21 | | $F_1$ | 956 | 958 | 960, 922 | 961 |
| 22 | | $A_6$ | 962 | 964 | 908, 890 | 909 |
| 23 | | $F_2$ | 966 | 968 | 960, 922 | 961 |
| 24 | | $C_1$ | 970 | 972 | 974, 890 | 975 |
| 25 | | $C_2$ | 976 | 978 | 974, 890 | 975 |
| 26 | | $C_3$ | 980 | 982 | 974, 890 | 975 |
| 27 | | $C_4$ | | | 974, 890 | 975 |

TABLE 2.—VECTOR MESSAGE

| Symbol Sequencer | Transfer word | Vector or feature displayed | AND circuit conditioned | Transfer gate conditioned | OR circuits conditioned |
|---|---|---|---|---|---|
| 0 | 0 | | | | |
| 1 | 1 | | | | |
| 2 | 2 | | | | |
| 3 | 3 | | | | |
| 4 | 4 | | | | |
| 5 | 5 | | | | |
| 6 | 6 | | | | |
| 7 | 7 | | | | |
| 8 | | | 886 | | 888, 890 |
| 9 | | $V_1$ {Start | 984 | | |
| 10 | | {End | 986 | | |
| 11 | | | | | |
| 12 | | | 988 | | 990 |
| 13 | | $V_2$ {Start | | | 984 |
| 14 | | {End | | | 986 |
| 15 | | | | | |
| 16 | | | 992 | | 994 |
| 17 | | $V_3$ {Start | 996 | | |
| 18 | | {End | 998 | | |
| 19 | | | | | |
| 20 | | | 1000 | | 1002 |
| 21 | | $V_4$ {Start | 996 | | |
| 22 | | {End | 1004 | | |
| 23 | | | 1006 | 898 | 900 |
| 24 | | $G_1$ | 1008 | 904 | 906, 908, 890 |
| 25 | | $G_2$ | 1010 | 916 | 918, 920, 922 |
| 26 | | $G_3$ | 1012 | 930 | 932, 920, 922 |
| 27 | | $G_4$ | | | 974, 890 |

TABLE 3.—TABULAR MESSAGE

| SS | 1014 | 1016 | 1018 | 1020 | 1022 | 1024 | 1026 | Feature Displayed |
|---|---|---|---|---|---|---|---|---|
| 0 | | | | | | | | |
| 1 | | | | | | | | |
| 2 | | | | | | | | |
| 3 | | | | | | | | |
| 4 | | X | X | | X | Info | | E. |
| 5 | | X | X | | X | Info | | E. |
| 6 | | X | X | | X | Info | | E. |
| 7 | | X | X | | X | Info | | E. |
| 8 | | X | X | | X | Info | | E. |
| 9 | Track | | | | | Track | Track LG. | Point. |
| 10 | | X | | X | X | | | $A_1$. |
| 11 | | X | X | | X | Info | | $A_2$. |
| 12 | | X | X | | X | Info | | $B_1$. |
| 13 | | X | Track | X | X | | | $A_3$. |
| 14 | | X | X | | X | Info | | $B_2$. |
| 15 | | X | X | | X | | | $A_4$. |
| 16 | | X | Track | X | X | Info | | $B_3$. |
| 17 | | X | X | | X | | | $A_5$. |
| 18 | | X | X | | X | Info | | $D_1$. |
| 19 | | X | X | | X | Info | | $D_2$. |
| 20 | | X | X | | X | Info | | $A_5$. |
| 21 | | X | Track | X | X | | | $F_1$. |
| 22 | | X | X | | X | Info | | $A_6$. |
| 23 | | X | Track | X | X | | | $F_2$. |
| 24 | | X | X | | X | | | $C_1$. |
| 25 | | X | X | | X | Info | | $C_2$. |
| 26 | | X | X | | X | Info | | $C_3$. |
| 27 | | X | X | | X | Info | | $C_4$. |

TABLE 4.—VECTOR MESSAGE

| SS | 1014 | 1016 | 1018 | 1028 | 1030 | 1020 | 1022 | 1024 | Vector or feature display |
|---|---|---|---|---|---|---|---|---|---|
| 0 | | | | | | | | X | |
| 1 | | | | | | | | X | |
| 2 | | | | | | | | X | |
| 3 | | | | | | | | X | |
| 4 | | | | | | | | X | |
| 5 | | | | | | | | X | |
| 6 | | | | | | | | X | |
| 7 | | | | | | | | X | |
| 8 | X | X | | X | | | X | X | $V_1$ |
| 9 | X | | | | | | | X | |
| 10 | | X | | X | | | | X | |
| 11 | | | | | | | | X | |
| 12 | | | | | | | | X | |
| 13 | X | | | X | | | | X | $V_2$ |
| 14 | X | X | | X | | | | X | |
| 15 | | | | | | | | X | |
| 16 | | | | | | | | X | |
| 17 | X | | | X | | | | X | $V_3$ |
| 18 | | X | | X | | | | X | |
| 19 | | | | | | | | X | |
| 20 | | | | | | | | X | |
| 21 | X | | | X | | | | X | $V_4$ |
| 22 | | X | | X | | | | X | |
| 23 | | X | X | | | X | X | X | $G_1$ |
| 24 | | X | X | | | X | X | X | $G_2$ |
| 25 | | X | X | | | X | X | X | $G_3$ |
| 26 | | X | X | | | X | X | X | |
| 27 | | X | X | | | X | X | X | $G_4$ |

TABLE 5.—SIGNAL LEVELS

| Conditioning potential | AND | Timer | Gate | Dist. | Flip-flop | Signal |
|---|---|---|---|---|---|---|
| 1014 | 1086 | 7 | 1112 | 3 | ¹1138 | ---- |
| 1016 | 1088 | 7 | 1114 | 3 | ²1136 | ---- |
| 1016 | 1088 | 7 | 1114 | 3 | ²1138 | 1150 |
| 1018 | 1090 | 4 | 1116 | 1 | ¹1058 | 1142 |
| 1018 | ³1092 | 5 | 1118 | 1 | ¹1136 | 1148 |
| 1020 | ---- | --- | 1094 | 1 | ²1140 | ---- |
| 1020 | ---- | --- | 1094 | 1 | ---- | 1156 |
| 1022 | 1096 | 3 | 1120 | 4 | ²1058 | 1144 |
| 1022 | 1096 | 3 | 1120 | 4 | ---- | 1146 |
| 1024 | ---- | --- | ---- | --- | ---- | 1098 |
| 1026 | ³1100 | 6 | 1122 | 1 | ---- | 336 |
| 1026 | ³1102 | 7 | 1124 | 4 | ---- | 340 |
| 1028 | ³1104 | 6 | 1126 | 4 | ¹1136 | 1148 |
| 1030 | 1106 | 3 | 1128 | 4 | ---- | 1152 |
| 894 | ³1108 | 5 | 1130 | 1 | ¹1136 | 1148 |
| 894 | 1110 | 6 | 1132 | 1 | ¹1140 | 1098 |
| ---- | ---- | --- | 1134 | 1 | ---- | 1154 |

¹ Set.  ² Clear.
³ The display level from OR circuit 1112 is also an input to this AND circuit. OR circuit 1112 conducts when conditioned by a TD message display level (line 868) or by an RD message display level from AND circuit 1114 which has an output when conditioned by a signal from OR circuit 1080 and a signal on line 872.

TABLE 6.—RD MESSAGE DISPLAY CYCLE

| Pulse | Timer | Signal level | Command |
|---|---|---|---|
| Start RD | 2 | | |
| WOW (OD4) | | | |
| OD1 | | | |
| OD2 | | | |
| OD3 | 3 | | |
| OD4 | | 1146 | Clear char. reg. |
| OD1 | | 1154 | Transfer. |
| OD2 | | | |
| OD3 | 4 | | |
| OD4 | | | |
| OD1 | | 1142 | Defocused. |
| OD2 | | | |
| OD3 | 5 | | |
| OD4 | | | |
| OD1 | | 1148 | Intensify. |
| OD2 | | | |
| OD3 | 6 | | |
| OD4 | | | |
| OD1 | | 336 | Cond. unblank. |
| OD2 | | | |
| OD3 | 7 | | |
| OD4 | | 340 | Cond. sample. |
| OD1 | | | |
| OD2 | | | |
| OD3 | Clear | 1053, 1143 | Clear and focus. |

Display Circuitry

In FIGS. 18A–18K there are shown the transfer paths of messages from the drums to storage, processing, and distribution elements associated with the display consoles 272, only one of which is shown. The dashed line in FIGS. 18A, B and C indicate where connections to other consoles are made. For example, the CRT 102 discussed in connection with FIG. 1 is shown toward the left of the drawings and the SD Control discussed in connection with FIG. 17 is shown at the lower end thereof. Message words are transferred from the drums through the input gates 318 to an appropriate register where they are processed in accordance with signals from the SD Control 338 and the resultant outputs are utilized to generate a message display on the associated display consoles 272. The input gates perform two functions: They prevent signal and noise pulses from setting flip-flops except during the time when words are read into the display elements, and they act as buffer amplifiers in order to supply the signals being read with enough power to drive the flip-flops. There are 32 input gates, one for each bit position in a word. TD messages utilize all 32 of the gates while RD messages require only 24 gates.

Each word from the drums is delivered to the gate circuits 318 at OD 1 time and the Read Drum level on line 1078, generated from the Word On Way signal in the Situation Display Control, conditions all 32 gates simultaneously to admit the bits of a word for distribution in the display element. The words are distributed by appropriately conditioned capacitor diode admittance gates.

The transfer paths of words of information within the display elements are illustrated in FIGS. 18D–K. All words read from the drums are channelled through the input gate 318 to operation registers, such as the Message Positioning Register 128, the Character Selection Register 134, or the Word Storage Registers 1162, 1164, 1166, 1168, 1170, 1172 and 1174. The operation of the circuitry may be more easily understood from the following description of the successive transfer operations in each type of message.

The single word in an RD message is passed from the input gates through capacitor diode gates 1176 and 1178 which are conditioned by the RD level (line 1067) applied by way of OR circuits 1180 and 1182 respectively. Bits LS–L9 and RS–R9 are passed through gate 1176 to the Message Positioning Register 128 by way of line 1184 and bits L10 and R10 are also passed to Register 128 through gate 1178 and over line 1186. In addition, status (L15) and identity (L14) bits associated with the word are transferred directly to the RD Control 1188 from the input gates over lines 1190 and 1192, respectively.

The eight words of a TD message are transferred from the drums to the display circuitry sequentially. Word zero is admitted to the input gates 318 by the Read Drum pulse and is read therefrom at Symbol Sequencer count of zero (line 0) which conditions gate 1194. Bits RS–12 and LS–12 are stored in the Word Zero Register 1162. Bits R13–15 and L13–15, which generate the E feature, are sent directly to the Character Selection Register 134 over line 1196. Bits LS and RS of word zero are introduced into the SD Control from the Word Zero Register (lines 860, 862, 864 and 866). In addition, bit RS is utilized to control the gating of word one from input gates (lines 1198 and 1199) and is applied to the Format Generator 136 over lines 1200 and 1202.

At Symbol Sequencer count of 1 word one is pulsed into the input gates. If the word is part of a tabular message (bit RS of word zero is 0) gate 1178 is conditioned by the output of AND circuit 1204, gate 1176 is conditioned by the output of OR circuit 1180 and bits LS–L12 and RS–R12 of the word are deposited directly into the Message Positioning Register 128 over lines 1184, 1186. If the word is a portion of a vector type of TD message (but RS of word zero is one) gate 1706 is conditioned by the output of AND circuit 1208, and the bits L10–15 and R10–15 are deposited directly into the Vector Register 1210 over line 1212. Gate 1176 is conditioned by the output of OR circuit 1180 and bits LS–10 and RS–10 are deposited in the Message Positioning Register 128.

At Symbol Sequencer counts of 2, 3, and 4, respectively, words two, three and four of a TD message are transferred from the input gates 318 into Display Assignment Bit (DAB) Storage registers 1164, 1166 and 1168, through gates 1214, 1216 and 1218 respectively.

At Symbol Sequencer count of 5 word five is transferred from the input gates to Word Five Storage register 1170 through gate 1220. If the message is a vector type message (bit RS of word zero is one) bits LS–6 and RS–6 are transferred to the Vector Register 1210 through gate 1222 as conditioned by AND circuit 1224. At Symbol Sequencer counts 6 and 7 words six and seven are transferred through gates 1226 and 1228 to their respective Word Storage registers 1172 and 1174.

In addition, a Display bit, associated with TD messages (bit L5 of word two is one), and a Use Light Gun signal (bit LS of word six is zero) are connected to the Situation Display Control from Storage registers 1164 and 1172 respectively over lines 868 and 870; and the Position bit (bit LS of word seven) is connected to the Format Generator 136 from Word Seven Storage 1174 over lines 1340 and 1342.

The bits which develop particular features in a tabular message format as shown in FIG. 12 are transferred from Storage into the Character Selection Register 134 through gates as indicated in Table 7 when that gate is conditioned by a transfer level from the SD Control on the indicated line at the indicated Symbol Sequencer count.

TABLE 7

| Symbol Sequencer | Feature to be next displayed | Bits | Storage register | Line from SD control | Gate |
|---|---|---|---|---|---|
| 8 | Set point | | | 887 | |
| 10 | A$_1$ | L1–3, R1–3 | 1162 | 899 | 1230 |
| 11 | A$_2$ | L4–6, R4–6 | 1162 | 905 | 1232 |
| 12 | B$_1$ | L1–3, R1–3 | 1172 | 913 | 1234 |
| 13 | A$_3$ | L7–9, R7–9 | 1162 | 917 | 1236 |
| 14 | B$_2$ | L4–6, R4–6 | 1172 | 927 | 1238 |
| 15 | A$_4$ | L10–12, R10–12 | 1162 | 931 | 1240 |
| 16 | B$_3$ | L7–9, R7–9 | 1172 | 937 | 1242 |
| 17 | D$_1$ | L1–3, R1–3 | 1174 | 941 | 1244 |
| 18 | D$_2$ | L4–6, R4–6 | 1174 | 945 | 1246 |
| 19 | A$_5$ | L7–9, R7–9 | 1174 | 951 | 1248 |
| 20 | F$_1$ | L10–12, R10–12 | 1172 | 955 | 1250 |
| 21 | A$_6$ | L10–12, R10–12 | 1174 | 959 | 1252 |
| 22 | F$_2$ | L13–15, R13–15 | 1172 | 965 | 1254 |
| 23 | C$_1$ | L13–15, R13–15 | 1174 | 969 | 1256 |
| 24 | C$_2$ | L7–9, R7–9 | 1170 | 973 | 1258 |
| 25 | C$_3$ | L10–12, R10–12 | 1170 | 979 | 1260 |
| 26 | C$_4$ | L13–15, R13–15 | 1170 | 983 | 1262 |

The bits which develop particular vectors and characters in a vector message are transferred from Storage through gates to particular Operation Registers at Symbol Sequencer counts as indicated below:

| SS count | Vector or feature to be displayed | Bits | Storage register | Gate | Operation register |
|---|---|---|---|---|---|
| 1 | V$_1$ | LS–9, RS–9 | 318 | 1176 | 128 |
| | | L10–15, R10–15 | 318 | 1206 | 1210 |
| 12 | V$_2$ | LS–9, RS–9 | 1170 | 1264 | 128 |
| | | L10–15, R10–15 | 1170 | 1264 | 1210 |
| 16 | V$_3$ | LS–9, RS–9 | 1172 | 1266 | 128 |
| | | L10–15, R10–15 | 1172 | 1266 | 1210 |
| 20 | V$_4$ | LS–9, RS–9 | 1174 | 1268 | 128 |
| | | L10–15, R10–15 | 1174 | 1268 | 1210 |
| 23 | G$_1$ | L1–3, R1–3 | 1162 | 1230 | 134 |
| 24 | G$_2$ | L4–6, R4–6 | 1162 | 1232 | 134 |
| 25 | G$_3$ | L7–9, R7–9 | 1162 | 1236 | 134 |
| 26 | G$_4$ | L10–12, R10–12 | 1162 | 1240 | 134 |

In vector message operation, as indicated in the foregoing, bits LS–9, RS–9 in words one, five, six and seven, which position the first, second, third and fourth vectors respectively are transferred to the Message Positioning Register 128. The XY information for vector one is applied directly from the input gates through a group of capacitor diode gates 1176, these gates being conditioned by a read word one signal from the SD Control (Symbol Sequence count of one). The XY positioning information for vectors two, three and four is contained in words five, six and seven, respectively. These bits are passed through capacitor diode gates 1264, 1266 and 1268 and the information is stored in the Message Positioning Register 128.

Gates in the Transfer circuit 1270 are conditioned by bits L8, 9, 11, 12, 14, 15, R8, 9, 11, 12, 14, 15 from Word Five Storage (features C$_2$, C$_3$, C$_4$); by bits L13–15, R13–15 from Word Seven Storage (feature C$_1$); by bits LS–10, RS–10 from the Message Positioning Register (RD–XY coordinates), and by bit L14 (RD Identity bit) from RD Control. The lines involved in these operations are 1272, 1274, 1276, and 1278, respectively. The gates may be sampled by a Transfer Track Number pulse (line 1072) or a Transfer XY Coordinates pulse (line 1070) from the SD Control 338 and in that case the information stored therein is transferred to the Manual Input Element 278 on line 1280.

Figure 18A:
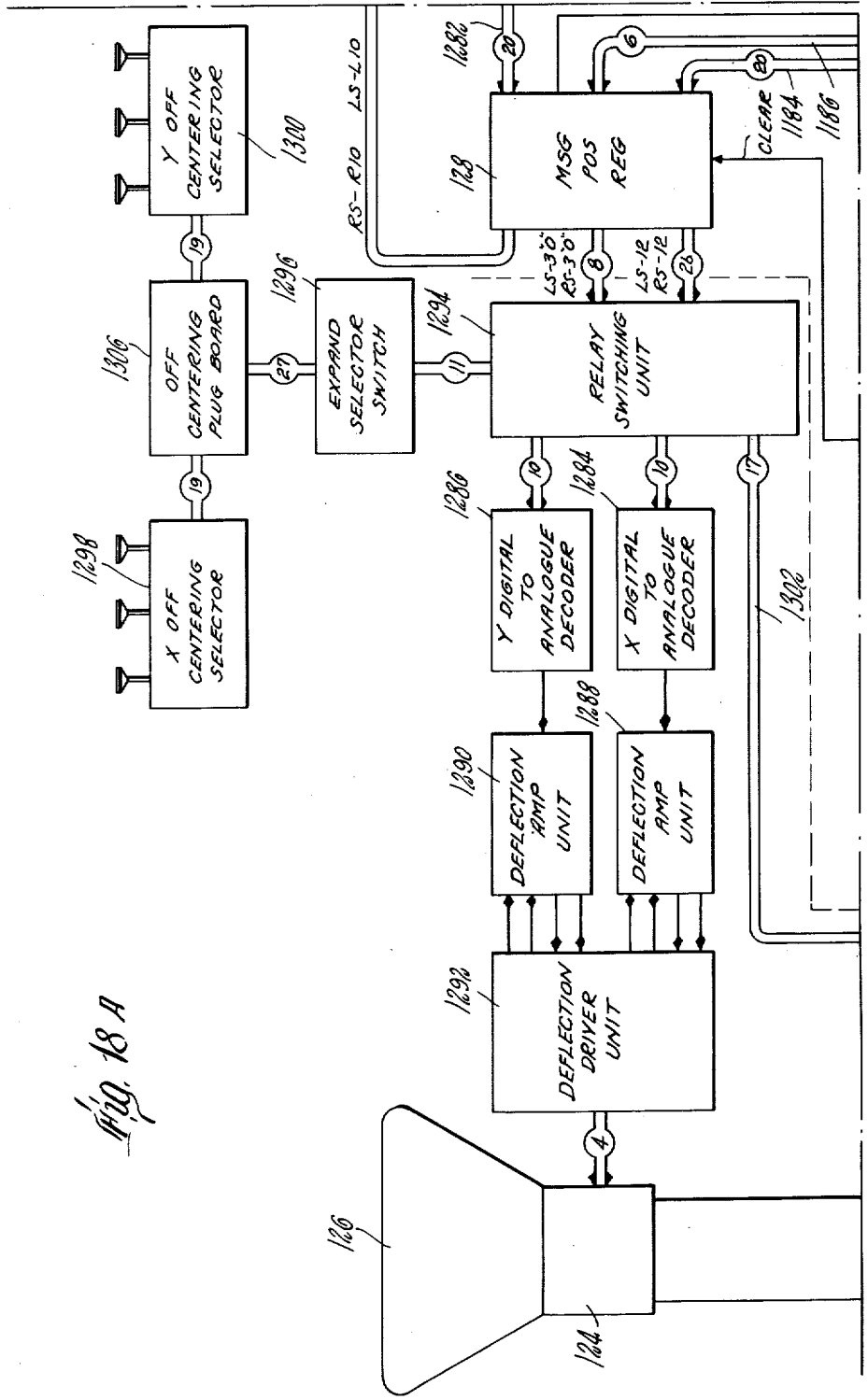
FIGURE 18 (A-K) is a schematic diagram partly in logical block form of the display circuitry associated with the preferred embodiment of the invention.
Figure 18E:
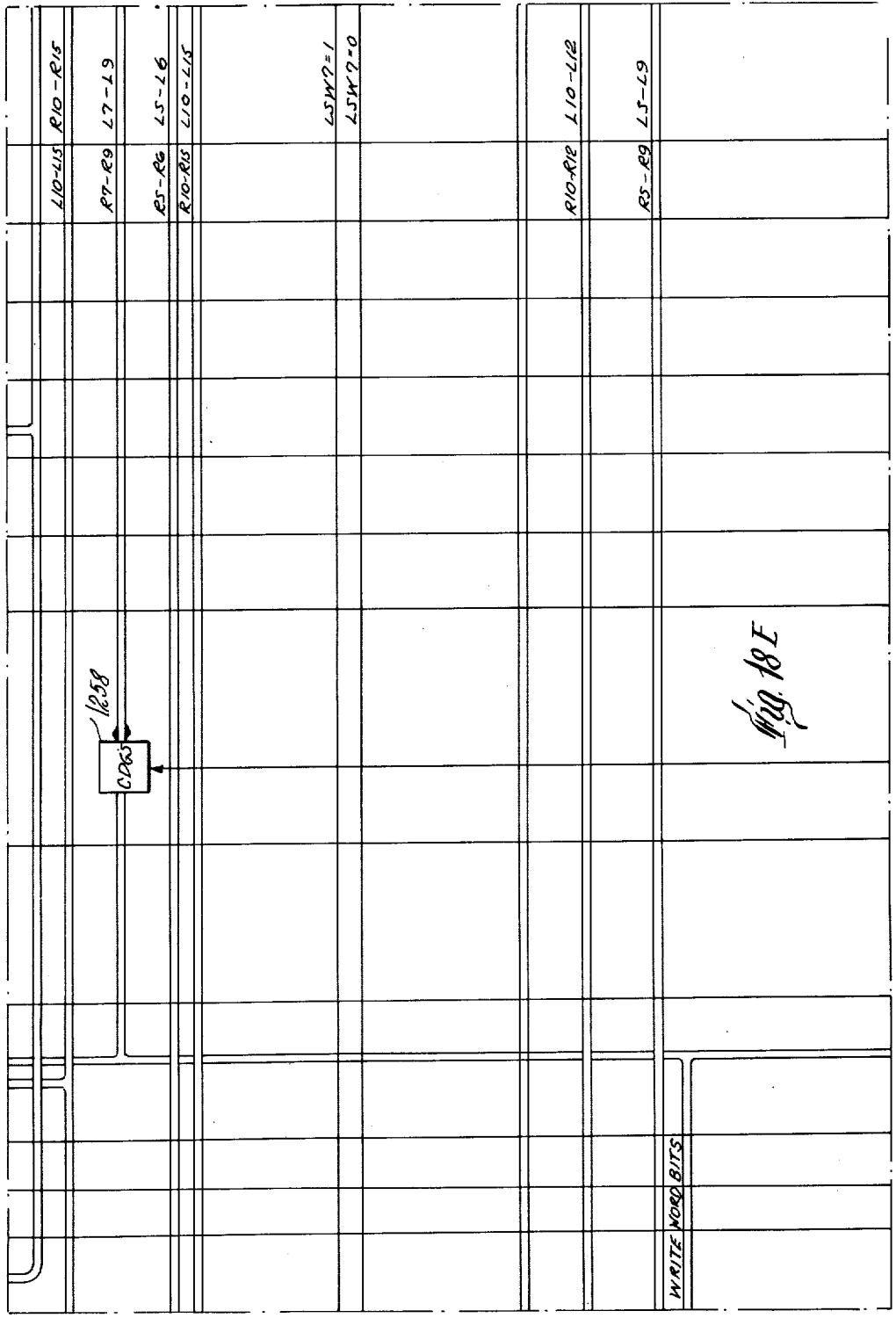
Figure 18J:
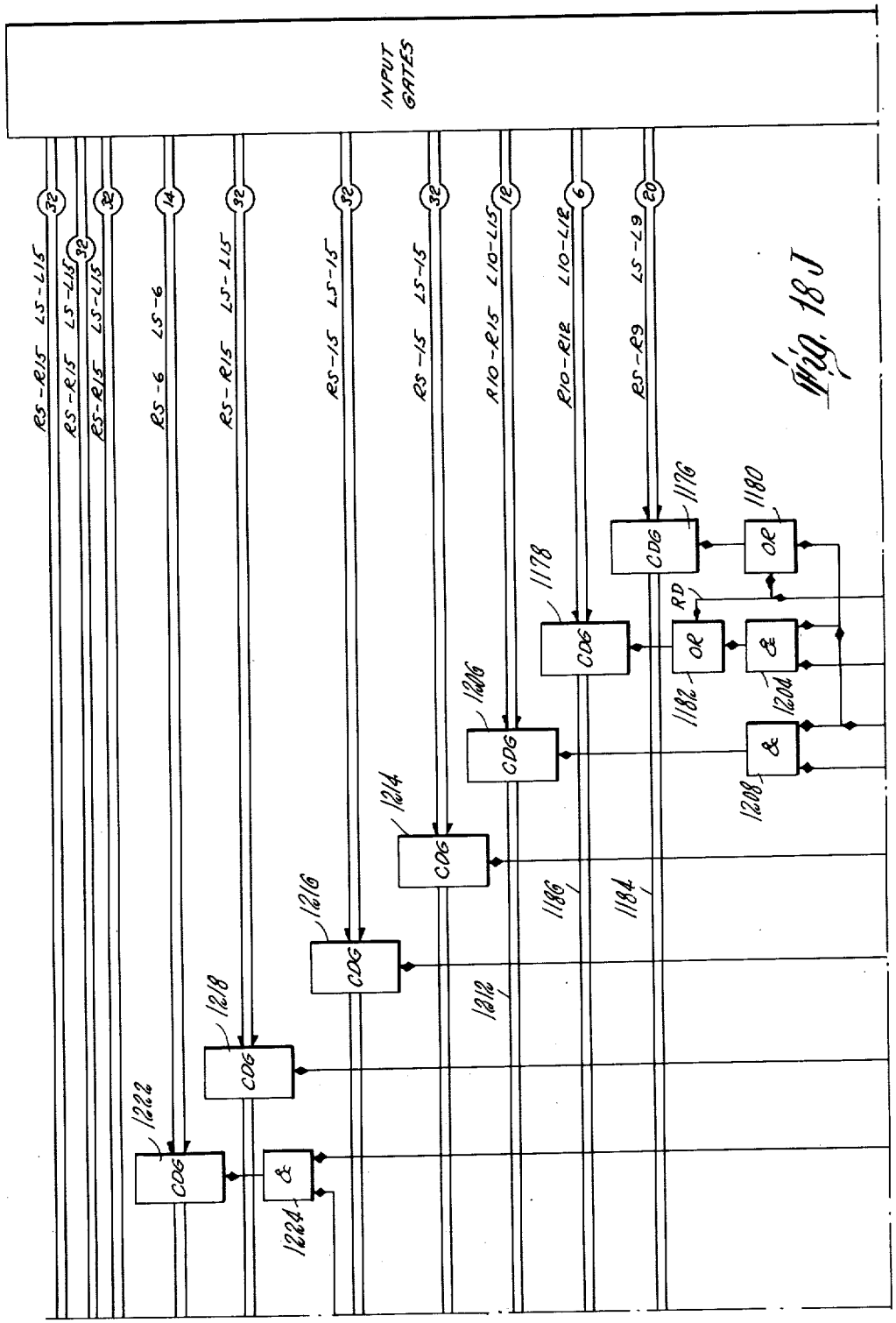

A more detailed showing of the CRT 102 and the units utilized for its operation is provided in FIGS. 18A–C. With reference to FIG. 18A it will be observed that the bits which specify the position of a message are entered into Message Position Register 128 by means of cables 1184, 1186, and 1282, the particular cables involved in each case being dependent upon the type of message to be displayed. In the case of an RD message which comprises a single point or the like, the positional bits are obtained directly from the input gates on lines in cables 1184 and 1186. If the message is of the track type, the positional bits may be obtained directly from the input gates by way of cables 1184 and 1186, or they may be obtained from one of the Word Five, Six and Seven Registers and their associated output lines in cable 1282. The reason why these two different possibilities exist in the case of a track message lies in the two essentially different forms that a track message may take. In the tabular TD message, there is a single vector to show speed and heading together with a group of twelve characters arranged in three rows (as shown in FIG. 12). The point of origin as well as the individual locations of the twelve characters are all dependent upon a single set of positional bits which specify a single location in the display field. In a vector message there are four vectors together with a group of four characters arranged in a single row (as shown in FIG. 15). The point of origin of each vector is uniquely specified by a distinct set of positional bits so that if the vectors are to be displayed in a sequence, then the positional bits associated with the second, third, and fourth vectors must be stored temporarily while the first vector is being developed, the positional bits for the third and fourth vectors must be held in storage while the second vector is being developed and so forth. To accomplish this result, the positional bits for the first vector are obtained directly from the input gate of the display system while the positional bits for the second, third or the fourth vectors are entered into the Word Five, Six and Seven Registers, respectively. Following the display of the first vector, the Message Position Register is cleared and the positional bits for the second vector are then pulsed out of the Word Five Register 1170 into the Message Position Register and so on with respect to the positional bits for the third and fourth vectors until all four vectors have been displayed.

To translate each set of positional bits into appropriate deflection voltages, there are provided decoders 1284 and 1286, the one to derive an X axis deflection voltage and the other a Y axis voltage. Each decoder comprises in essence a multi-section ladder type attenuation network wherein the individual sections are adapted to be selectively coupled to sources of constant current according to the sense of the positional bits. In brief, by means of suitable gating circuits, the final section of the attenuation network, that is the one closest to output end, is selectively coupled to a first current source according to the sense of the most significant positional bit, the next to the last section of the attenuator network is selectively coupled to a second current source according to the sense of the next most significant bit, and so forth. In this way there is produced at the output of each decoder a voltage whose magnitude is proportional to the number represented by the binary digits. These analogue voltages, derived by the decoders, are applied to the units 1288, 1290, and 1292 wherein suitable driving signals are produced for the magnetic deflection yoke 124 which controls the position of messages as they appear on the face of the tube. The lines emanating from deflection drive unit 1292 which appear to be going in the wrong direction are simply to indicate that feed back signals are employed between the units to improve the transient response of the system.

Interposed between the decoders and the Message Position Register is a Relay Switching Unit 1294 which is subject to two complementary modes of manual control. One of these involves the use of an Expand Selector switch 1296 whereby the scale of the geographical area which the display field represents may be expanded or contracted. If an expanded display is desired, this necessarily involves the selection of only a portion of the geographical area for display, since in a two to one expansion by way of example, only one-quarter of the total area can be displayed. By means of Off-Centering Selectors 1298 and 1300 any one of the four quadrants can be selected. In essence two principles are relied on to accomplish these results. The one is that the significances of the bits may be altered according to the degree of expansion desired by a re-arrangement of the bit positions such that portions of the geographical area will be displayed in superposition one upon the other. The second is that Selectors 1298 and 1300 effectively suppress all but the desired one of these superpositional areas so that only this desired portion is displayed. This suppression function is accomplished by means of pulses carried on the lines in cable 1302, which it will be observed are applied to the Intensity Control section 1304. The off-centering plug board 1306, between the XY Selectors 1298 and 1300 has been provided merely to establish the extent of the expansion control that may exercised at the individual consoles.

Selection of the individual characters in a message is accomplished electrostatically by the deflection plates 114 and 116 as shown in FIG. 19B. Thus, each set of character selection bits for a TD message is entered into a Character Selection Register 134 by way of cable 1308 where they are held for decoding into analogue voltages by means of decoders 1310 and 1312. The analogue voltages derived by the decoders 1310 and 1312 are in turn amplified by amplifiers 1314 and 1316 respectively and applied to the X and Y deflection plates. The designation of the particular characters to be displayed in an RD message is somewhat simpler in that all possible RD message characters are located in a single row of the character matrix 108. For this reason, it is only necessary to specify that an RD message is involved in order to uniquely specify the proper row, and this is accomplished automatically in the Character Selection Register on signal from an RD control unit 1188 (FIG. 18C) by way of line 1318. The latter unit has entered therein the bits to designate the particular characters in this matrix row, and this information is likewise transmitted to the Character Selection Register on lines 1320, 1322, and 1324. These lines are pulsed in accordance with the RD symbol specified by the word bits having been entered in the RD control 1188. Their effect on the Register is just like that of the individual lines on cable 1308, in the sense that each line conditions a corresponding channel in the Register. The only other line entering the Character Selection Register that bears a word of explanation is line 1326. This line is pulsed whenever a vector is to be produced in order to specify the address or location in the character matrix of a large circle. The electron beam is focused as will be explained in connection with FIG. 18C before it is passed through the circle so that when the beam is swept in a direction corresponding to a vector direction, and in an amount corresponding to the vector magnitude, a clearly defined trace will be produced on the face of the display tube in the manner of a conventional cathode-ray tube. This mode of operation is to be distinguished from the selection of all other characters in the character matrix 108 which involves an initial defocusing of the electron beam so as to flood each selected character with the beam.

Towards the top of FIG. 18B there is shown a register 1210 which stores temporarily this magnitude and directional information relative to the vectors. This information is specified by the groups of bits as shown in association with cables 1212, 1223, and 1328. Actually, it is the magnitude and direction of departure from the vector origin that is specified by the vector magnitude and direction bits, the point of origin itself being specified by the positional bits in the message position register. That is to say, the vector magnitude and direction bits are decoded in decoders 1330 and 1332, amplified in differential amplifiers 1334 and 1336, and then applied to compensation plates 120 and 122 respectively which, in this instance, are utilized to perform a sub-deflection function from the vector point of origin to the head end of the vector. This function is carried out relatively slowly, by means of a sweep generator 1338 which is adapted to raise the voltage level of the decoders 1334 and 1336 from an initial zero level to the level corresponding to the vector magnitude and direction bits within a finite preselected time. In this way, the point represented by the focused electron beam is swept from one position to another, and the trace of the sweep is caused to represent the body of the vector.

To appropriately position the characters of a track message so that they will not overlie a vector, and at the same time to position the characters one with respect to another in rows and columns, there is provided a Format and Position Generator 136. The Format and Position Generator is adapted to operate in two different modes and these are signalled alternatively according to the sense of the left sign bit (LS) of word zero. A pulse on the line labeled "right sign word zero equal one" (RSW0=1, line 1202) results when a tabular track message is to be displayed whereas the "right sign bit of word zero equals zero" (RSW0=0, line 1200) occurs in the case of a vector message. Depending upon which of these lines is pulsed, there is produced, as an output of the Format Generator, XY deflection voltages adapted to appropriately position the first character of a message with respect to the vector or vectors. This is accomplished by means of a pair of decoders and what is in effect a counting register which is initially conditioned in response to lines 1200 and 1207. The initial condition of the register is likewise subject to the control of pulses from the Vector Register on lines 1344 through 1347 and pulses from the Word Seven Register on lines 1340 and 1342. The former specify the quadrant in which a vector is located and the latter serves to designate to the Format Generator two possible locations in which the tabular message characters may be placed with respect to the vector or vectors so that there will be no mutual interference. These choices between the two locations is arrived at by means of the Computer on the basis of the orientation of other proximately located messages. There is also incorporated in the Format Generator a counter effectively to advance the register by one count in response to a signal on line 1156. When the count is so advanced, the X deflection voltage output will be modified so as to properly locate the second character ($A_2$ or B₁) adjacent the first (A₁). This process continues until after the fourth character (A₄ or B₃) has been displayed, whereupon a change is produced in the Y deflection voltage in order to begin a new row. In essence, therefore, Format Generator 136 combines the functions of a stepping register and a decoder whereby incremental voltages are produced in a sequence which leads to the desired format for the message. The Format Generator also incorporates in its decoder input channels whereby the analogue output voltages may be appropriately modified in accordance with the required compensation needed as a result of the character selection process. Bits for these channels are derived directly from the Character Selection Register by means of the lines in cable 1348.

Finally, there is provided in the portion of the system shown in FIG. 18B a convergence coil 118 and a convergence coil regulator 1350 for powering the same. The function of the convergence coil is to cause the electron beam, once it has been deflected through the character matrix, to cross the longitudinal axis of the tube at a longitudinal position corresponding approximately to the location of the compensation plates. This result is accomplished irrespective of the amount of deflection away from the tube axis that the beam has undergone initially in the character selection process so that the deflection produced by the compensation plates will be capable of re-aligning the beam along the axis. To this end, the current supplied to the coil is closely controlled by the regulator 1350, which in turn is sensitive to a number of variables in the system. Since the details of the operation of the charactron in this respect are immaterial for the purposes of the present invention, no attempt has been made to illustrate the various interconnections to the regulator 1350.

Turning now to FIG. 18C it will be observed that the remaining tube electrodes of significance are the defocusing grid 1352 and the intensity grid 112. The defocusing grid is adapted to be placed in condition either to defocus the electron beam or not by means of a defocusing control 1354 which in turn is responsive to a signal on line 1142 from the Situation Display Control element. This signal is produced according to whether a character or vector point is to be selected in the character matrix since, as aforementioned, the characters require a certain amount of flooding by the electron beam, whereas high definition is preferred in the case of a vector. Although, as shown, intensification unit 1304 which directly controls the operation of the intensification grid is subject to numerous modes of control, its function is merely to select an appropriate voltage level to be applied to the intensity grid, depending upon the type of character and so forth that is to be displayed. However, the option of what is to be displayed lies in part with the console operator who may select for display only certain categories of messages, and indeed only the characters to be found in certain positions of a particular message format. These character positions or features are selected by groups of switches indicated by feature selection blocks 1356 and 1358. Those features which the console operator has no control of are caused to be intensified by signals on line 1098 labeled By-Pass Feature. Similarly a TD category switch 1360 and RD category switch 1362 have been employed to indicate the switching arrangement whereby the console operator may select specific categories of messages. Each of these boxes has two outputs adapted to establish one of two distinct intensity levels (or none at all) which, at times at least, are selected according to predetermined criteria. One example is the relative age of an RD message which is indicated by signals from RD Control 1188 applied by way of one of the lines 1364 so that the intensification unit 1304 may cause the RD message or spot to be displayed brightly or dimly. Similarly in the case of TD messages one of two intensity levels may be selected automatically in accordance with a display assignment bit on line 1366. A still further modification of the intensity level is produced in accordance with the status of the beam, that is whether it is focused or defocused. Signals on lines 1142 and 1144 from the Situation Display Control element serve to condition the intensification unit according to this criterion. The Patch Panels 1368 and 1370 merely provide an added degree of flexibility such that different combinations of categories may be selected at different consoles by means of the switches without the necessity of having permanent wiring that differs from one console to another.

*RD control.*—The RD Control circuitry 1188 develops a first group of signals which are applied to the Character Selection Register 134. These signals produce the proper electron beam positioning voltages to select a specified RD symbol. A second group of signals is developed by the RD Control which are applied to intensification unit 1304 through the category patch panel 1370 and the RD switches 1362. In addition there is developed an RD source identification level which is applied to the Transfer Gates circuit 1270.

One of the four RD symbols is displayed in each RD message: uncorrelated identity 0 radar return (character selection matrix address: 100,101), correlated identity 0 radar return (character selection matrix address: 101, 101), uncorrelated identity 1 radar return (character selection matrix address: 110,101), and correlated identity 1 radar return (character selection matrix address: 111, 101). Eight possible signals are applied over line 1364 through the RD switches to the intensification unit. The operator may select those displays of interest to him. The signal applied to the intensification unit represents a combination of the following: An RD dim or RD bright level, correlated or uncorrelated status, and radar identity information.

The operation of the RD Control circuitry may be understood with reference to FIG. 19. The RD level from the SD Control 338 (line 1066) conditions gate 1372. The pulse passed by this gate on line 1318 conditions the Character Selection Register (Y axis register) to position the electron beam at the Y axis level of 101. The RD Dim or RD Bright level (when present) from the SD Control (line 1082 or 1084) is applied to the decoder 1374. The Identity bit L14 (line 1192) and the Status bit L15 (line 1190) of the RD message word, whenever the value is 1, sets flip-flops 1376 and 1378, respectively. The output levels of the flip-flops are applied to the decoder. Also when set, the output of flip-flop 1376 (bit L14 is 1) is applied to the Transfer Gates 1270. When the decoder 1374 is conditioned by three input levels, one of the eight output levels indicated is produced. The output levels produce conduction in OR circuits 1380, 1382, 1384 as follows:

| Output | Category | OR circuits |
| --- | --- | --- |
| 1. RD Bright | L14, L15 (correlated identity 1) | 1380, 1382, 1384 |
| 2. RD Bright | L15 (correlated identity 0) | 1382, 1384 |
| 3. RD Bright | L14 (uncorrelated identity 1) | 1380, 1382 |
| 4. RD Bright | L14 (uncorrelated identity 0) | 1382 |
| 5. RD Dim | L14, L15 (correlated identity 1) | 1380, 1382, 1384 |
| 6. RD Dim | L15 (correlated identity 0) | 1382, 1384 |
| 7. RD Dim | L14 (uncorrelated identity 1) | 1380, 1382 |
| 8. RD Dim | L14 (uncorrelated identity 0) | 1382 |

Each output is also applied to the Radar Category Patch Panel 1370 over individual lines 1364.

The outputs of OR circuits 1380, 1382 and 1384 condition gates 1386, 1388 and 1390, respectively. The pulse passed by gate 1386 (on line 1320) conditions the Character Selection Register (X axis) to position the electron beam at the X axis level 100; the pulse passed by gate 1388 (on line 1322) positions the beam at the X axis level of 010; and the pulse passed by gate 1390 (on line 1324) positions the beam at the X axis level of 001. The gates 1386, 1388 and 1390 are sampled by a transfer pulse on line 1154, generated in the SD Control 338 at the beginning of each RD message display cycle, and the resultant pulses produce the X and Y levels for the selection of the proper RD display symbol in the Character Selection Matrix 108.

*Format generator.*—The location of the character format of the TD message with respect to a vector and the location of each character within the format is controlled by the Format Generator 136. Input information includes four levels which indicate the vector direction, the Message bit (bit RS of word zero) and the Position bit (bit LS of word seven).

There are eight positions of the character formats with respect to the vector, four positions pertaining to tabular messages (FIG. 13) and four to vector messages (FIG. 16). The position bit of the tabular message, in combination with the X and Y vector direction bits received from the vector generator, locates the format relative to the single vector of that message. If the position bit is a 1 the character format appears above ($Y=0$) the single vector (FIG. 13*d*) or below ($Y=1$) the vector (FIG. 13*c*) and if the position bit is a zero the character format appears to the right ($X=0$) (FIG. 13*b*) or to the left ($X=1$) (FIG. 13*a*) of the single vector. The character format of a vector message is positioned relative to fourth vector in the horizontal direction as determined by the X direction bit (to the left if the bit is one and to the right if the bit is zero) and in the vertical direction as determined by the Y direction bit (above if the bit is one and below if the bit is zero), in one of the four positions shown in FIG. 16.

A character counter circuit produces outputs in digital form which are converted to analogue voltages by the character position decoders. The outputs of these decoders are applied through differential amplifiers to the vector generating and character positioning plates of all the display tubes.

Figure 20B:
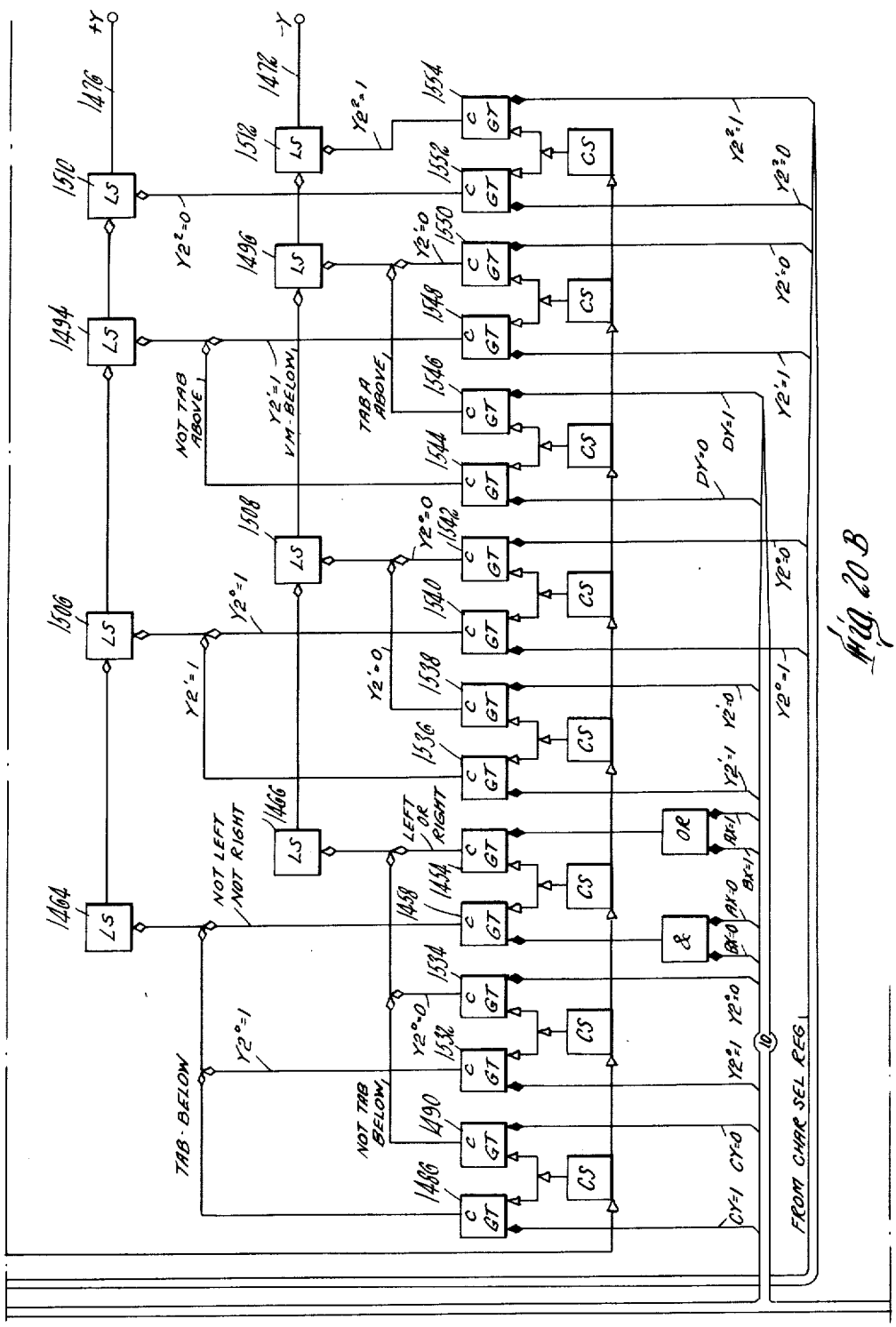
FIGURE 20 (A-C) is a schematic diagram in logical block form of the Format Generator shown as block 136 in FIGURE 18.
Figure 20C:
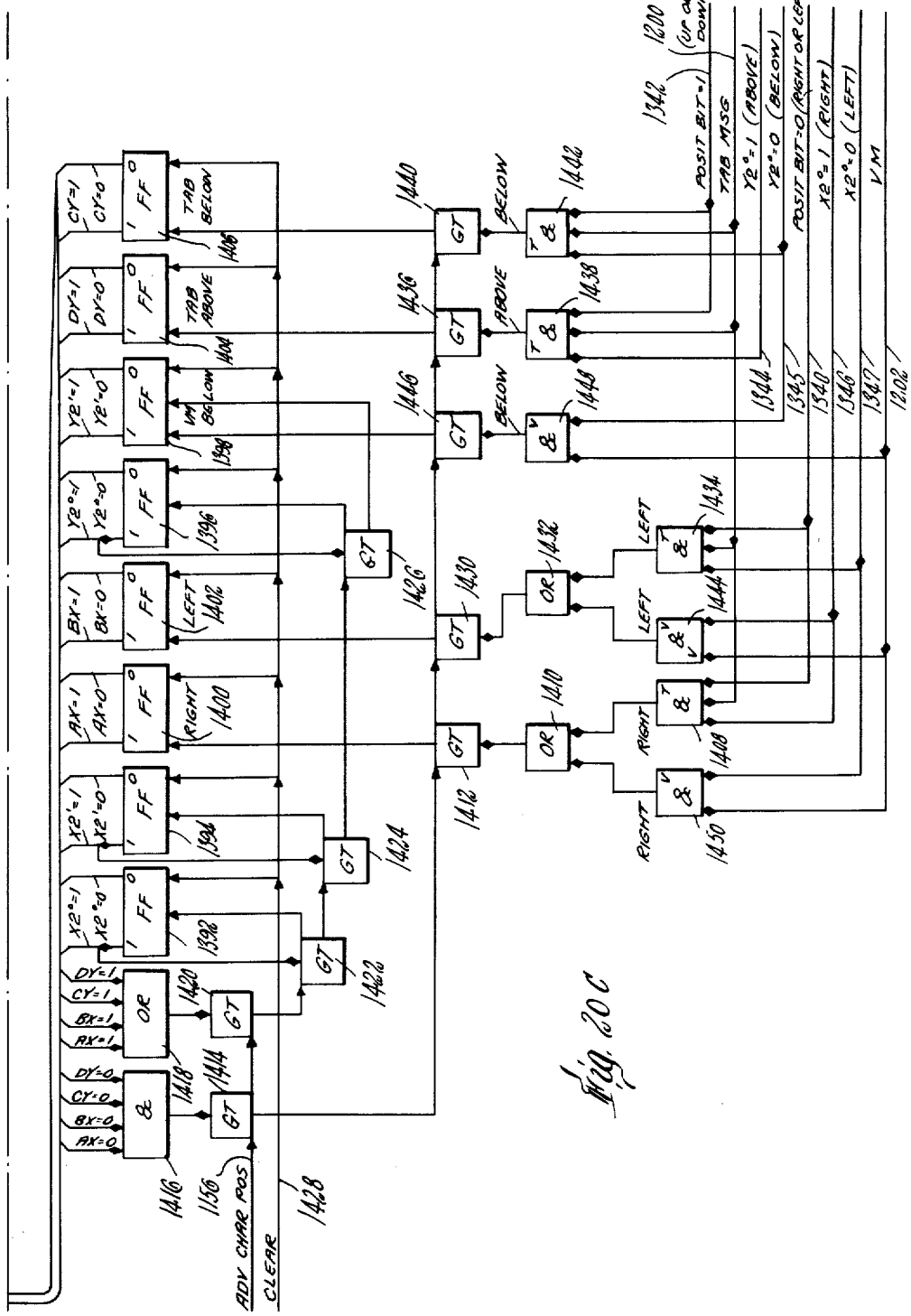

During a tabular message display cycle the character counter outputs are all zero until after the E character or point has been displayed. During a vector message display cycle the counter outputs are all zero until after the four vectors are generated and displayed. After vector generation is completed the Advance Character Position pulse from the SD Control steps the character counter such that digital signals are generated and subsequently decoded to position the characters in the format. The operation of the circuitry may be understood with reference to FIG. 20.

Flip-flops 1400, 1402, 1404 and 1406 determine the position of the character format with respect to the vectors. The outputs of flip-flops 1400 and 1402 control the position $A_1$ or $G_1$ character (the first character displayed in the message format) on the X axis of the display and the flip-flops 1404 and 1406 control the position on $A_1$ or $G_1$ character on the Y axis. Flip-flops 1392 and 1394 comprise the X counter and the flip-flops 1396 and 1398 comprise the Y counter. Successive changes in the condition of these latter four flip-flops are added to the original set condition of the first four flip-flops to produce voltages for positioning the rest of the characters in the format.

The operation of the circuitry may be best understood with the aid of an example. Assume a tabular message in which the positioning bit is zero (line 1340) and the X direction bit is 1 (line 1346). The three input AND circuit 1408 is fully conditioned and its output, through OR circuit 1410, conditions gate circuit 1412. Initially all the flip-flops are cleared and gate 1414 is conditioned by the output of AND circuit 1416. The Advance Character Position pulse (line 1156) is passed through gate tube 1414 and sets through gate tube 1414 and sets the flip-flop 1400. This flip-flop will remain set for the remainder of the message display and flip-flops 1402, 1404 and 1406 will remain cleared. The resultant combination of flip-flops outputs is decoded (as described hereinafter) to provide the positioning of the $A_1$ character. Once flip-flop 1400 has been set gate tube 1414 is no longer conditioned by AND circuit 1416. However, OR circuit 1418 conditions gate tube 1420 for the remainder of the message such that the X and Y counters (flip-flops 1392, 1394, 1396, and 1398, and the associated gate tubes 1422, 1424 and 1426) now function.

The next Advance Character Position pulse is gated through gate 1420 as a complementing pulse to flip-flop 1392 and sets it. The resultant output level is decoded to locate the $A_2$ or $B_1$ character (depending upon which feature is selected at the console) in its proper position in the format. The output of set flip-flop 1392 also conditions the gate tube 1422 and the next Advance Character Position pulse is passed therethrough, complementing flip-flop 1392. Thus, flip-flop 1392 is cleared and flip-flop 1394 is set, providing a digital signal which, when decoded, positions the next character ($A_3$ or $B_2$) in the format. Gate 1422 is deconditioned as flip flop 1392 is cleared. The Next Advance Character Position pulse sets flip-flop 1392 and the output level resulting from the combination of the set flip-flops 1392 and 1394 generates a digital signal which is decoded to position the $A_4$ or $B_3$ character. The next Advance Character Position pulse complements flip-flop 1392, 1394, and 1396. Thus, flip-flops 1392 and 1394 of the X counter are cleared and flip-flop 1396 of the Y counter is set. This results in the proper output condition for the positioning of the $D_1$ character in the second row of characters in the format. The next three Advance Character Position pulses step the X counter such that the three subsequent characters ($D_2$, $A_5$ or $F_1$, and $A_6$ or $F_2$) in the second row will be properly positioned. The ninth Advance Character Position pulse complements flip-flops 1392, 1394, 1396, and 1398 such that only flip-flop 1398 is set, producing a Y counter output level for positioning the third row of characters ($C_1$, $C_2$, $C_3$, and $C_4$). When the last character has been displayed, a clear pulse from the SD Control on line 1428 clears all the flip-flops, and readies the character counter circuitry for the next message.

If a different combination of the positioning and direction bits had been utilized flip-flop 1402, 1404 or 1406 would have been set: Flip-flop 1402 if the message was to be positioned to the left of the vector (position bit=0, X direction bit=0, conditioning gate 1430 through OR circuit 1432 from AND circuit 1434); flip-flop 1404 if the message was to be positioned above the vector (position bit=1, Y direction bit=1, conditioning gate 1436 from AND circuit 1438); and flip-flop 1406 if the message was to be positioned below the vector (position bit=1, Y direction bit=0, conditioning gate 1440 from AND circuit 1442).

In the case of a vector message a single line of characters ($G_1$, $G_2$, $G_3$ and $G_4$) (FIG. 16) is positioned relative to the fourth vector as controlled by the direction bits of that vector. The $G_1$ character can be in any of four places: it can be positioned in the same place as either the $A_1$ or $C_1$ character would be in a tabular message display which was either to the left or to the right of the vector origin. Thus, if the fourth vector is in an upper left direction (X direction bit equals 1 (line 1346), Y direction bit equals 0 (line 1345) gate tube 1430 will be conditioned by the output of AND circuit 1444 and gate 1446 will be conditioned by the output of AND circuit 1448, flip-flops 1402 and 1398 will be set by the first Advance Character Position pulse (through gate 1414) and their outputs are decoded to position the $G_1$ character to the right and below the origin of the fourth vector. OR circuit 1418 is conditioned and the subsequent Advance Character Position pulses are gated into the X counter (flip-flops 1392 and 1394 and associated gate tube 1422) which output is decoded to properly position the four characters of the G feature in the vector message format. After the $G_4$ character has been displayed a Clear pulse from the SD Control 338 clears all the flip-flops and readies the counter circuitry for the next message.

If the vector direction is up to the right ($X=0$, $Y=0$) gates 1412 and 1446 are conditioned; if down to the left ($X=1$, $Y=1$) gate 430 is conditioned; and if down to the right ($X=0$, $Y=1$) gate 1412 is conditioned.

In order to correctly position the characters formed by the beam which is directed through the character matrix 108, position correction information, supplied from the Character Selection Register 134 over line 1348, is necessary in addition to the character counter circuitry output levels. This information provides compensation for the off axis displacement of the electron beam caused by the character selection. Both groups of levels are applied to the decoder circuitry shown in FIGS. 20A and B.

The character selection decoder consists of two similar sections (X—FIG. 20A and Y—FIG. 20B), each of which includes a ladder attenuation network comprising a plurality of resistive ladder sections (LS), each section being connected to at least one gate tube (GT) and its associated current source (CS). A voltage regulator (R) acts on the current sources such that a constant current from each source is provided. Each current source has two gate tubes and two ladder sections associated with it and current from the sources is switched by the current gate tubes into one of the ladder sections by an appropriate flip-flop level applied to a gate tube input. In general, the two gate tubes associated with each current source are connected to the opposite output terminals of one flip-flop. The input to one gate tube therefore will be conditioned by a potential of plus 10 volts when the input to the other gate tube is a deconditioning potential of minus 30 volts. The gate tube which is conditioned by the plus 10 volts level will conduct current from the source to the associated ladder section and its companion gate tube is completely cut off. The current flow through the gate tube into the ladder section causes a corresponding voltage drop in the output voltage which is dependent upon the resistive value of that ladder section. A similar type of double ended decoder is illustrated and described in copending patent application "C," and detailed description of its construction and operation herein may be considered redundant.

The operation of this particular decoder may be best comprehended by means of the following examples. Assume a tabular message display wherein the format is to be positioned to the right of the vector origin (position bit=0, X direction bit=1) (FIG. 13A). Flip-flop 1400 is set by the first Advance Character Position pulse and therefore gates 1452 and 1454 are conditioned (+10 volts applied thereto) to pass current, and gates 1456 and 1458 are deconditioned (−30 volts applied thereto). The current flow in ladder sections 1462, 1464, 1466 and 1468 is changed, resulting in a negative shift in the −X and −Y outputs (1470 and 1472 respectively) and a corresponding positive shift in the +X and +Y outputs (1474 nad 1476 respectively), producing a push-pull analogue voltage which is applied to amplifiers 1334 and 1336. The resultant beam deflection is 1¼ character widths to the right and 1¼ character widths up to the proper position for the first character ($A_1$) in the message format.

If the display is to be to the left of the vector origin (position bit=0, X direction bit=0) (FIG. 13B) flip-flop 1402 is set, gates 1478 and 1454 are conditioned and gates 1480 and 1458 are deconditioned. The changes in current flow in ladder sections 1482, 1484, 1464, and 1466 produce push-pull analogue voltages which deflect the beam up 1¼ character widths and to the left 5 character widths.

Similarly, the tabular display will be above the vector origin (FIG. 13D) when flip-flop 1404 is set producing conduction change in ladder sections 1460, 1462, 1494, and 1496 such that the initial position of the electron beam is deflected up 5 character widths and to the left 1¼ character widths.

The switching of ladder sections produce deflections as listed below; the direction of the change being controlled by which sections conduct.

|  | LS | Deflection (character widths) |
|---|---|---|
| X (FIG. 20A) | 1460, 1462 | 1¼ |
|  | 1498, 1500 | 2½ |
|  | 1482, 1484 | 5 |
|  | 1502, 1504 | 10 |
| Y (FIG. 20B) | 1464, 1466 | 1¼ |
|  | 1506, 1508 | 2½ |
|  | 1494, 1496 | 5 |
|  | 1510, 1512 | 10 |

The deflection of 10 character widths is utilized only as a compensating deflection for the deflection introduced by the Character Selection Matrix.

The source of the conditioning potential for each gate tube may be determined with reference to the following table. The condition of the flip-flop (either set or cleared) is indicated by a (1) or a (0) following the reference numeral in column three and the location of the flip-flop is indicated in column four.

TABLE 8

| Decoder | Gate tube | Source (flip-flop) | Location |
|---|---|---|---|
| X (FIG. 20A) | 1452 | 1400(1) | Character counter (CC). |
|  | 1456 | 1400(0) | CC. |
|  | 1514 | 1392(1) | CC. |
|  | 1516 | 1392(0) | CC. |
|  | 1492 | 1406(0) and 1404(0) | CC. |
|  | 1488 | 1406(1) or 1404(1) | CC. |
|  | 1516 | 1394(1) | CC. |
|  | 1518 | 1394(0) | CC. |
|  | 1520 | $X°=0$ | Char. sel. reg. 134 (CSR). |
|  | 1522 | $X°=1$ | CSR. |
|  | 1480 | 1402(0) | CC. |
|  | 1478 | 1402(1) | CC. |
|  | 1524 | $X^1=0$ | CSR. |
|  | 1526 | $X^1=1$ | CSR. |
|  | 1528 | $X^2=1$ | CSR. |
|  | 1530 | $X^2=0$ | CSR. |
| Y (FIG. 20B) | 1486 | 1406(1) | CC. |
|  | 1490 | 1406(0) | CC. |
|  | 1532 | 1396(1) | CC. |
|  | 1534 | 1396(0) | CC. |
|  | 1458 | 1400(0) and 1402(0) | CC. |
|  | 1454 | 1400(1) or 1402(1) | CC. |
|  | 1536 | 1398(1) | CC. |
|  | 1538 | 1398(0) | CC. |
|  | 1540 | $Y°=1$ | CSR. |
|  | 1542 | $Y°=0$ | CSR. |
|  | 1544 | 1404(0) | CC. |
|  | 1546 | 1404(1) | CC. |
|  | 1548 | $Y^1=1$ | CSR. |
|  | 1550 | $Y^1=0$ | CSR. |
|  | 1552 | $Y^2=0$ | CSR. |
|  | 1554 | $Y^2=1$ | CSR. |

*Vector generator.*—The Vector Generator is a device which converts binary voltage inputs into analogue voltage outputs having substantially linear rise times to provide vector magnitude and direction information for application to the vector generating plates 120, 122 through differential amplifiers 1334, 1336. The Vector Generator consists of a Vector Register 1210 which stores vector coordinate information in binary form, two decoders 1330 and 1332 which convert the binary voltages present in the Vector Register into two sets of analogue voltages which define the terminal point (with reference to an origin) of the desired vector, and a sweep generator 1338 which controls the decoder voltage level in a manner such that the decoder output voltage when applied to the vector generating plates, sweeps the electron beam between the origin and the terminal point of the vector.

Figure 21A:
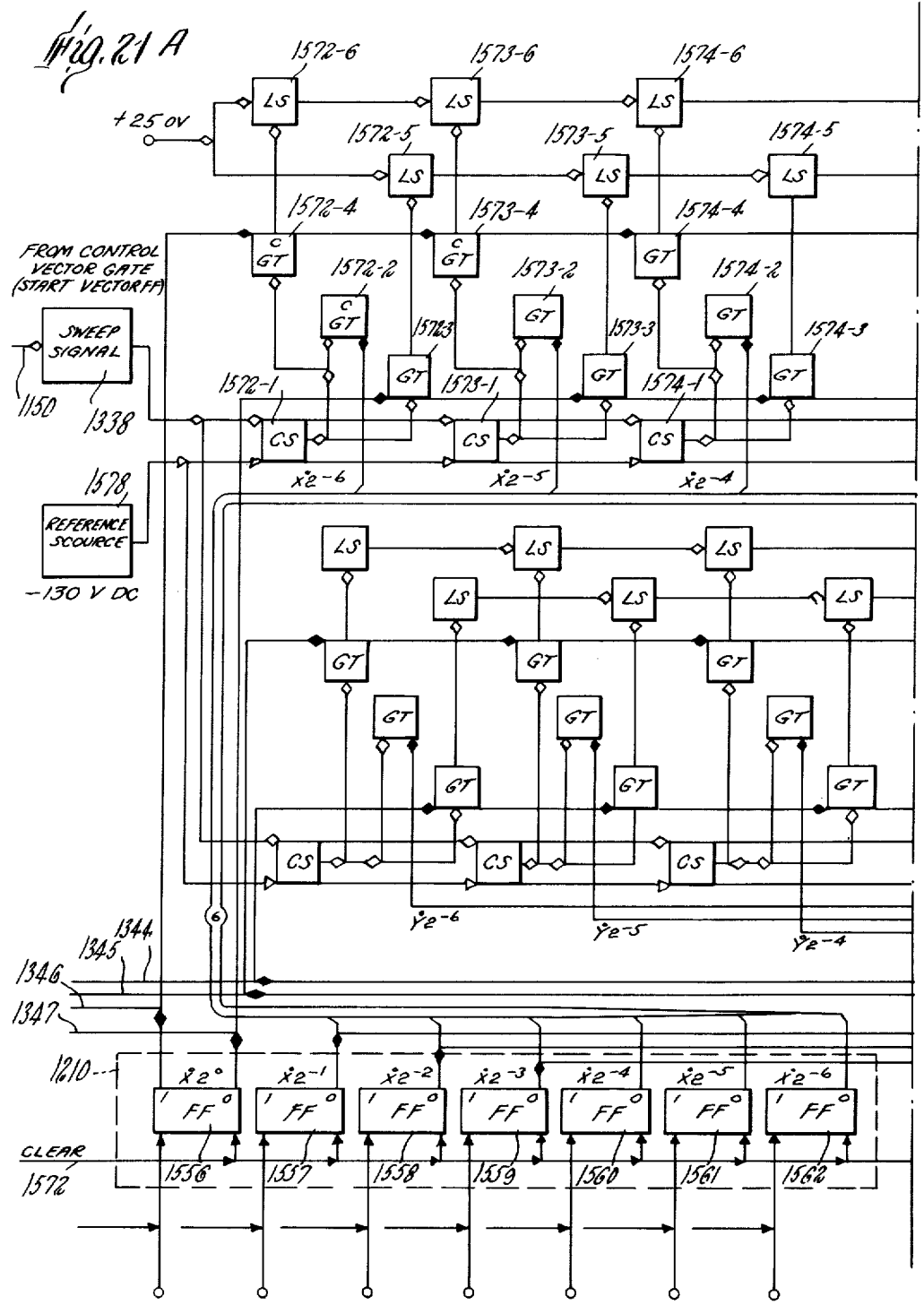
FIGURE 21 (A-B) is a schematic diagram in logical block form of the Vector Generator shown as blocks 1210, 1330, 1332, and 1338 in FIGURE 18.
Figure 63A:
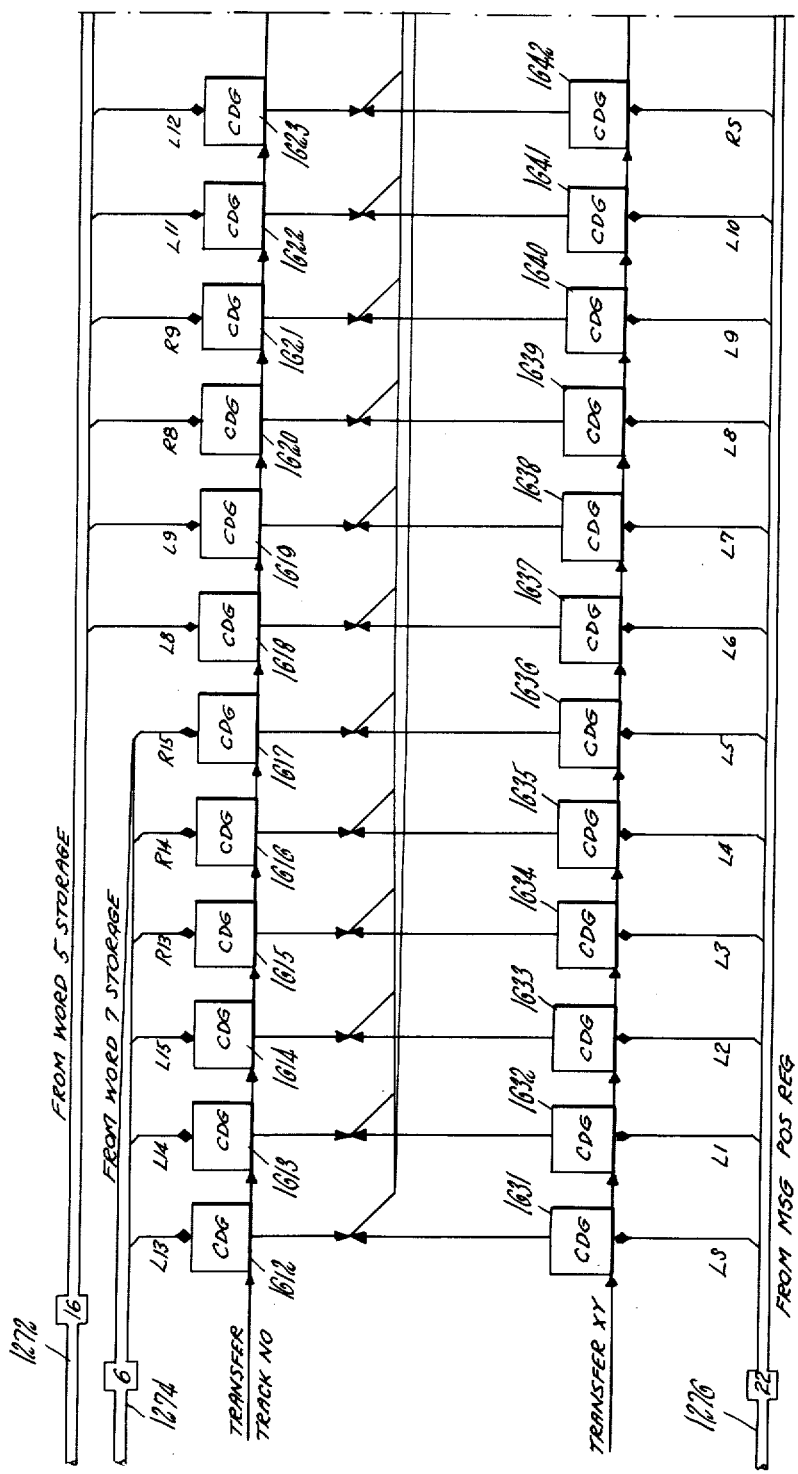

The operation of the Vector Generator may be understood with reference to FIG. 21. The Vector Register 1210 consists of fourteen flip-flops 1556 through 1569. In a tabular message display, bits LS–6 of word five are applied to flip-flops 1556 through 1562 and bits RS–6 of word five are applied to flip-flops 1563 through 1569 directly from the input gates. In a vector message display, bits L10–15 of words one, five, six and seven are applied to flip-flops 1556 through 1562 and bits R10–15 of words one, five, six and seven are applied to flip-flops 1563 through 1569. The "1" and "0" outputs of flip-flop 1556 and the "0" outputs of flip-flops 1557 through 1562 are applied to X axis digital to analogue decoder 1330 whereas the "1" and "0" outputs of flip-flop 1563 and the "0" outputs of flip-flops 1564 through 1569 are applied to the Y axis digital to analogue decoder 1332. The outputs of flip-flops 1556 and 1563 are also connected to the Format Generator 136 where they are utilized, together with other inputs, for determining the positioning voltages for the first character of the message format. The Vector Register flip-flops are cleared by a signal from the SD Control 338, applied to the Register over a single line 1572. In addition, the output levels of flip-flops 1558–1560 and 1564–1566 are applied to a Vector Intensity Modulator 1570. The output of the Vector Intensity Modulator is a signal which varies with a vector length and is applied to Intensification Unit 1304 such that vectors of varying length will be displayed with uniform intensity.

The two decoders 1330 and 1332 develop two single-sided analogue voltages by determining the sense and magnitude of each vector from the digital information stored in the Vector Register. The operation of the decoders is identical and the ensuing description therefore will be limited to the X decoder 1330. The digital information from flip-flops 1557 through 1562 is applied to the decoder, the signal from each flip-flop being associated with one of the decoder stages 1572–1577. Each decoder stage consists of one current source 1, one current gate tube 2, which acts as a switch tube, and two parallel gate tubes 3 and 4 (for a positive or negative X output) each of which feed an associated ladder section 5, 6 consisting of a resistive network. The components of each stage are identified by the stage number and the component number as the switch tube in the first stage 1572-2. The analogue output voltage, developed across the resistors of the ladder sections, is proportional to the digital value of the input information, the value of the resistance networks in the ladder sections being graded in accordance with well known criteria for the design of digital to analogue decoders. The current source produces a current as controlled by a reference source 1578 and a sweep generator 1338. Current is supplied to the gate tubes 3 and 4 only during the time that sweep signal is raised as controlled by the Vector Start level from the Situation Display control 338 on line 1150. When the Vector Start signal is raised the sweep generator produces a sweep voltage starting with a slight initial jump and then a linear rise. The jump is introduced to bring the current source tubes 1 quickly out of cutoff and the linear rise modulates the current flow from the current source tubes.

The output level of flip-flop 1556 determines the group of ladder sections which will be operative. If it is set gate tubes 4 are conditioned and if it is cleared gate tubes 3 are conditioned.

In each decoder stage the switch tube will conduct if it has plus 10 volts conditioning potential applied to it. When a switch tube is conducting it biases both gate tubes associated with it such that the individual decoder stage will have no current flow in either ladder section. The switch tube will not conduct if it has a conditioning potential of minus 30 volts on its grid. Under that circumstance the properly conditioned gate tube will conduct such that a voltage will be produced across the ladder section. Thus the condition of flip-flop 1556 determines which group of gates may conduct and the condition of flip-flops 1557 through 1562 determines which gates in that group conduct as the switch tube permits conduction in the gates when the connected flip-flop is set.

The value of the most significant bit, as indicated by the output of flip-flop 1556, together with the output of the corresponding flip-flop 1563 in the Y decoder section determines the quadrant of the origin of the vector.

The outputs of flip-flops 1557 through 1562 determine the X magnitude of the vector and are applied to the switch tubes 2. When the bit stored in a flip-flop is one the switch tube is cut off as a potential of minus 30 volts is applied to it, and the decoder stage conducts through the gate tube that is conditioned by flip-flop 1556.

The voltage drops in the ladder sections are added and the resultant output at lines 1580 and 1582 applied to the differential amplifier 1334.

The maximum length of the vector produced by the Vector Generator in the preferred embodiment is approximately two inches. Thus, when all the magnitude bits are 1, (flip-flops 1557 through 1562) the length of the X (or a Y) component alone is approximately 1½ inches The deflection produced by the decoder stage in the most significant position in the ladder network (connected to flip-flop 1557) is approximately ¾ of an inch, the stage in the next most significant location produces a deflection approximately ⅜ of an inch, etc.

*Message positioning register.*—The Message Positioning Register 128 stores the digital information which controls the positioning of each message in the tabular and RD message displays and the four vectors in a vector message display while that information is being manipulated and applied to the deflection yoke 124. In addition, its contents are also applied to condition gates in the Transfer circuit 1270 for possible transfer of the XY coordinates of an RD message to the Manual Input element.

The register 128 and its operation may be best understood with reference to FIG. 22. It consists of twenty-six flip-flops 1584 through 1609. When the value of a bit applied to a flip-flop is one, the flip-flop is set and the resultant output level, or its absence, thus indicates the value of that particular bit. The X coordinates of an RD message (bits LS–L10) are applied to flip-flops 1584 through 1594 and the Y coordinates of an RD message (bits RS–R10) are applied to flip-flops 1597 through 1607; the X coordinates (bits LS–L12) of a tabular message are applied to flip-flops 1584 through 1596 and the Y coordinates (bits RS–R12) of a tabular message are applied to flip-flops 1597 through 1609; the X coordinates of each vector in a vector message (bits LS–L9) are applied to flip-flops 1584 through 1593 and the Y coordinates of each vector are applied to flip-flops 1597 through 1606. The X and Y coordinates of all RD and tabular messages are applied to the flip-flops directly from the input gates 318. The X and Y coordinates of the first vector are applied directly from the input gates 318, of the second vector from Word Five Storage 1170, of the third vector from Word Six Storage 1172 and of the fourth vector from Word Seven Storage 1174.

The one outputs of flip-flops 1584 through 1594 are applied to OR circuit 1610, the output of which raises the display level in the SD Control 338 during the display of an RD message. The one outputs of flip-flops 1584 through 1594 and 1597 through 1607 are applied to the Transfer Circuit 1270. The "zero" outputs of flip-flops 1584 through 1587 and 1597 through 1600 are applied to the Relay Switching Unit 1294 for display suppression control, and the "one" outputs of flip-flops 1584 through 1609 are applied to the Relay Switching Unit for expansion manipulation if desired, decoding and application to the deflection yoke 124 of the display tube.

A clear pulse from the SD Control 338 on line 1428 clears all the flip-flops at the end of each vector display in a vector message and at the end of each display cycle, resetting the register.

*Transfer circuits.*—Information which has been generated by the Computer may be re-entered into the Computer for additional processing or to produce more refined or additional results by means of the Manual Input element 144. The Transfer circuit 1270 channels this information from the display element to the Manual Input element upon a request therefrom. In the described embodiment this information may consist of the track number of a TD message (characters $C_1$, $C_2$, $C_3$, $C_4$) or the XY coordinates of an RD message. Other types of information may, of course, be so transferred in accordance with the program which is utilized with the Computer.

Figure 23B:
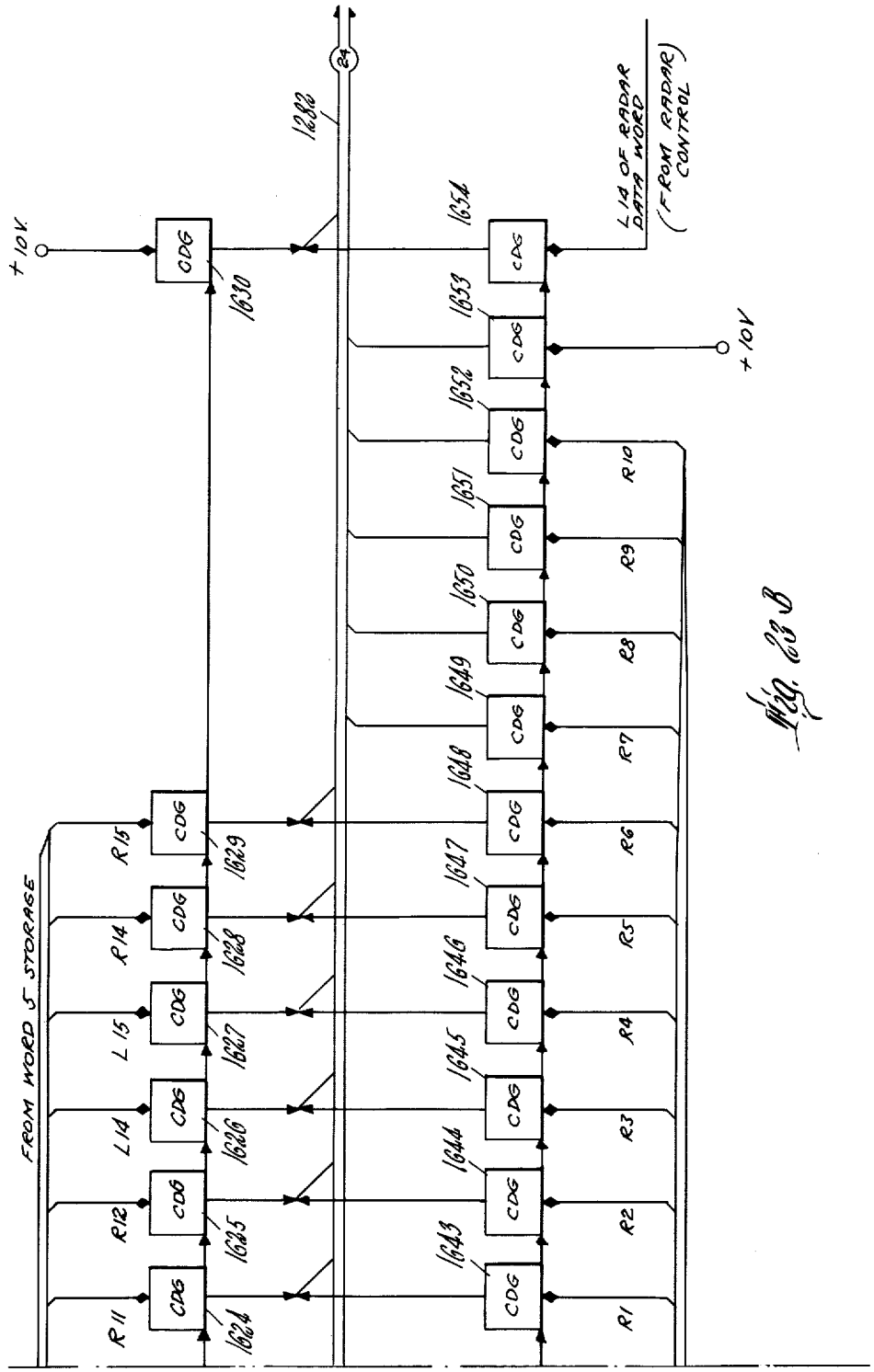
FIGURE 23 (A-B) is a schematic diagram in logical block form of the Transfer Circuits shown as block 1270 of FIGURE 18.

The operation of the Transfer circuit 1270 may be understood with reference to FIG. 23.

The Transfer circuit includes forty-three capacitor diode gates 1612 through 1654. Gates 1612 through 1617 are associated with the six bits of the $C_1$ character (L13–15, R13–15), stored in Word Seven Storage 1174 (FIG. 18); gates 1618 through 1621 with four bits of the $C_2$ character (L8–9, R8–9), stored in Word Five Storage 1170; gates 1622 through 1625 with four bits of the $C_3$ character (L11–12, R11–12), stored in Word Five Storage; gates 1626 through 1629 with four bits of the $C_4$ character (L14–15, R14–15) stored in Word Five Storage; gates 1631 through 1641 with the eleven bits of the X coordinate (LS–L10) from the Message Positioning Register 128; and gates 1642 through 1652 with the eleven bits of the Y coordinate (RS–R10) from Message Positioning Register. In addition, gate 1654 is associated with the L14 identity bit level from the RD Control and gates 1630 and 1653 are conditioned by +10 volt control levels, to provide a message identification bit in the MI word.

Gates 1612 through 1630 are sampled by a Transfer Track Number pulse (line 1072) from the SD Control, and gates 1631 through 1654 are sampled by a Transfer XY pulse (line 1070). The output of the gates is applied to the Manual Input element 144 over line 1282.

Thus, the computer output information which may be re-entered into the Computer upon appropriate request is available for transfer to the Manual Input element during each message display cycle.

*Manual Input Element*

The Manual Input Element controls the insertion of data into the Manual Input Drum 146 for eventual processing by the Computer System. Among the functions of the Manual Input Element are: the provision of an enabling signal for the Light Gun circuitries, whereby their operation is coordinated with the display of targets and with the Manual Input Matrix 140 reading operation; the provision of enabling circuits for the control of the area discriminators; the encoding of the light gun signal into a word of eight bits, the storage of the selected target identification information from the Transfer gates in the display element; and the transfer of the light gun and target identification information to the MI Drum.

The layout of the words transferred to the MI Drum from the MI Element is indicated in FIG. 24. In each word there is a console identification portion which consists of eight bits as encoded in the Manual Input Element and which is positioned at bit locations R6–13. Bit R14 indicates the type of display on which the operator has made a request. If it is a tabular message (FIG. 24A) bit R14 is zero and if it is an RD message bit R14 is one (FIGS. 24B or 24C). Bit R15 is utilized to indicate the source of the display information. (The type of information, however, is dependent on the programming of the Computer and may be changed as desired.) In a request concerning an RD message, the X, Y coordinates of the selected symbol are reentered into the computer as bits LS–R5 of the word, as indicated, and in requests concerning TD messages the track number (C feature) is re-entered as bits LS–R1. Bits R2–5 are not used in the reentry of TD message information. Each of these groups of bits (XY coordinates or C feature) provide sufficient information for the Computer to identify that object concerning which the operator requested additional information or action and the console identification code establishes the console which initiated the request.

Control signals utilized in the Manual Input Element include Conditional Unblank and Conditional Sample pulses from the Situation Display Control 338 on lines 336 and 340, respectively; a Start TD pulse (line 714) from the RD Read Control 266; a Start RD pulse (line 314) from the TD Read Control 260; a Drum Word Demand pulse (line 354) from the Write Status Control 282; Read Area Discriminator commands (lines 348 and 350); Read MI Matrix and Disconnect MI Matrix pulses from the Input-Output Control (lines 288 and 551, respectively); and MI OD1 timing pulses (line 1656). The MI element generates a Pass Light Gun level (line 342), a Transfer SD Information pulse (line 346) and a Data Available pulse (line 352). Light Gun and Area Discriminator information from equipment associated with the situation display CRT's and positional information from the Transfer gates in the display element are composed by the Manual Input Element into a word suitable for writing on the MI Drum.

The operation of the circuitry may be understood with reference to FIGURE 25. The description will deal initially with the transfer of information by means of the Light Guns. Modifications in the operation of the Manual Input Element during Area Discriminator information transfers will then be described.

The light guns are enabled by a Pass Light Gun Signals level (line 342) which is present if the following conditions exist: (1) the MI Register is available, (2) the MI Matrix is not being read and (3) a symbol is being intensified on the faces of the display tubes. The availability of the MI Register 1659 is indicated by flip-flop 1660; the flip-flop, when set, indicating a full register, and when cleared indicating register availability. The status of the MI Matrix 140 is indicated by flip-flop 1662, the Matrix being involved in a reading operation when the flip-flop is set, and being disconnected from the computer when the flip-flop is cleared. The "zero" outputs (clear) of flip-flops 1660 and 1662 are sampled by the Conditional Unblank pulse from the SD Control at gates 1664 and 1666, respectively. This pulse is initiated 15 microseconds after an intensification level is raised. If the proper conditions are met (i.e., the Manual Input Register is available and the Manual Input Core Matrix is not being read), the Conditional Unblank pulse sets flip-flops 1668, 1670 and their respective output levels condition AND circuit 1672 to produce the Pass Light Gun Signals level.

If a light gun is actuated, a signal is transmitted to the Light Gun Encoder circuit 1674 and the signal is coded into a word of eight bits. The word has the unique characteristic of four ones and four zeros when only one light gun has been energized on the particular target. The Conditional Sample pulse from the SD Control (generated 7.5 microseconds after the Conditional Unblank pulse) clears flip-flop 1670 (disabling the light guns) and gates the light gun encoded identity word into the Manual Input Register through gates 1676–1683. In addition, the Conditional Sample pulse samples gate tube 1684, conditioned by OR circuit 1686 (which has an output level if a light gun has been energized). As a result, a Transfer SD Information pulse is transmitted to the Transfer gates via the SD Control circuitry whereby the positional information associated with the selected target is transferred to the MI Register 1658 over line 1282. The gated Conditional Sample pulse also sets flip-flop 1660, and clears flip-flop 1668 indicating that there is a word stored in the MI Register; and it sets the synchronizing flip-flop 1686 which conditions a gate tube 1688 to pass the next MI OD1 timing pulse so as to clear the switch flip-flop 1690 and thereby cause gate tube 1692 to be conditioned. Gate tube 1692, when conditioned, passes the MI Drum Word Demand pulse (at OD3 time) to set the select flip-flop 1694 and clear flip-flops 1686 and 1690. The output level of the set flip-flop 1694 generates an MI Data Available pulse which is sent to the MI Write Status Control. The word held in the MI Register is then transferred to the MI Write Circuits over line 1696 for recording on the MI Drum. In addition, the MI Data Available pulse clears flip-flop 1660. The next MI OD1 pulse passes through gate tube 1698, which is conditioned by the output of set flip-flop 1694, to reset the MI Register and also to clear flip-flop 1694 such that the Manual Input element is prepared to repeat the Light Gun selection cycle.

The Area Discriminators 274, 276 utilize only the Manual Input Element for information transfers to the Computer. All Area Discriminator signals are synchronized with commands from the Computer and their operation is conditioned upon:

(1) The availability of the Manual Input Register and
(2) The intensification of a proper target on the scope face.

As in the case of light gun signals the availability of the MI Register 1658 is indicated by the cleared flip-flop 1660 and the intensification of the target is indicated by the Conditional Unblank pulse. When these two conditions coexist, flip-flop 1668 has an output which conditions one input each of AND circuits 1700 and 1702.

The second input of AND circuit 1700 is conditioned as follows: a Read Area Discriminator No. 1 signal is received from the Input-Output Control which sets flip-flop 1704 and the resultant output level conditions gate tube 1706 to pass the next Start TD pulse. This pulse sets flip-flop 1708 and its output conditions AND circuit 1700 to pass signals from Area Discriminator 274 to the encoding circuit 1674. The encoding of the Area Discriminator identification word, the transfer of the selected target positional information from the display element, and the transfer of both elements of information to the Manual Input Drum occurs in the same manner as described above in conjunction with a Light Gun signal. At the end of the TD cycle during which the Area Discriminator 274 was read, the Start RD pulse, generated by the TD control, is passed through gate tube 1710 and clears flip-flop 1704. At the beginning of the next TD cycle the Start TD pulse from the RD Read Control is passed by gate tube 1712 to clear flip-flop 1708, thus preparing the circuitry for the next Read Area Discriminator No. 1 command from the Computer Input-Output Control.

The AND circuit 1702 is conditioned to pass signals from Discriminator 276 and is cleared in a similar manner: the Read Area Discriminator No. 2 signal sets flip-flop 1714, gate 1716 is conditioned to pass the Start RD pulse to set flip-flop 1718, the resultant level completes the conditioning of AND circuit 1762, and Area Discriminator signals are passed to the Encode circuit 1674. At the end of the RD display cycle, the conditioned Gate 1720 is pulsed by the Start TD signal and the resulting pulse clears flip-flop 1714. The next Start RD pulse is passed through gate 1722 to clear flip-flop 1718.

In conclusion, while there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a digital computer controlled data processing system, which includes means to display simultaneously and in an information conveying manner a plurality of items of information, and means to provide reference information signals related to the display location of each item as that item is being displayed, the combination therewith of a group of circuits, each circuit providing a signal indicating a different action to be performed with respect to said reference information, manually controllable switch means positioned adjacent said display means for selectively activating one circuit of said group of circuits, aimable means disposable in front of and responsive to said display means for selecting an individual one of said displayed items, said aimable means providing an output signal when an item is selected, and means responsive to said output signal to sense said signals representative of action information and reference information, and to initiate the action specified by said action information.

2. The combination of claim 1 wherein said display means includes at least one cathode ray tube and said aimable means includes sensing means responsive to light from individual items displayed by said tube and manually operable means to selectively enable said light responsive means.

3. The combination as claimed in claim 1 wherein said display means includes a plurality of display devices, each said display device having an aimable selecting means, a group of circuits, and a manually controllable switch means associated therewith, and further including first buffer storage means for storing reference information signals related to the selected item in response to each said output signal, second buffer storage means for storing action information signals provided by the associated group of circuits in response to each said output signal, means to sense said first buffer storage means periodically for reference information signals, and means responsive to the detection of reference information signals in said first buffer storage means to sense said action information signals in said second buffer storage means to initiate the action specified by the action signals.

4. A data processing system comprising a digital computer operable to process data in accordance with a stored program of instructions, computer control circuitry operating under the supervision of said program of instructions, a plurality of storage locations in said computer addressable by said computer control circuitry including locations for storing signals representative of data and signals representative of instructions, means to display simultaneously and in an information conveying manner a plurality of items of information representing current results of the operations of said computer, means to store reference information signals related to the display location of each item as that item is being displayed, a group of circuits, each circuit providing a signal indicating a different action to be performed with respect to said reference information, manually controllable switch means positioned adjacent said display means for selectively activating one circuit of said group of circuits, aimable sensing means disposable in front of and responsive to said display means for selecting an individual one of said displayed items, said aimable means providing an output signal when an item is selected, and instruction controlled means responsive to said output signal to sense the reference information signals related to the item selected by said aimable means and the action information signals provided by said group of circuits, and to branch the computer program in accordance with said action information signals to an instruction which causes said computer control circuitry to initiate the action specified by said action information signals.

5. The system as claimed in claim 4 wherein said addressable storage locations further include buffer storage means for receiving reference information signals related to the selected item and action information signals provided by said group of circuits in response to each said output signal, and said instruction controlled means includes first means to sense said buffer storage means periodically for signals stored therein in response to said output signal, and second means responsive to the detection of signals in said storage means by said first means to cause said computer control circuitry to branch to the instruction which initiates the action specified by the entered action information signals.

6. The combination of claim 5 wherein said display means includes at least one cathode ray tube and said aimable means includes sensing means responsive to light from individual items displayed by said tube and manually operable means to selectively enable said light responsive means.

7. The combination of claim 2 wherein said cathode-ray tube has a screen adapted to produce in each activated area thereof radiant light energy to which said sensing means is sensitive for a limited period only following such activation, and to maintain said area visible for a substantially longer period sufficient to display a plurality of items.

8. The combination of claim 7 wherein said cathode-ray tube screen has a phosphorescent coating whose light output undergoes an appreciable change in color during said limited period.

9. In a data processing system which includes a digital computer, the combination of means to produce a luminous visual display of a plurality of items representative of data output of said computer, means to control the brightness of individual items in said display, sensing means manipulatable relative to said display for selectably sensing individual items thereof having a predetermined brightness, said sensing means providing an output signal when an item is selected, means to provide reference information signals related to the display location of each item as that item is being displayed, a group of circuits, each circuit providing a signal indicating a different action to be performed with respect to said reference information, manually controllable switch means positioned adjacent said display means for selectively activating one circuit of said group of circuits, and means responsive to said output signal to sense said signals representative of action information and reference information, and to initiate the action specified by said action information.

10. In a data processing system which includes a digital computer, the combination of buffer storage means to store temporary data output of said computer, means to enter said data in said buffer storage means at time determined by said computer according to a prearranged program, means for continually reading from said buffer storage means the data output having been entered therein and for producing a luminous visual display representative of said data, means to control the brightness of individual items in said display according to their order of entry into said buffer storage means, sensing means manipulatable relative to said display for selectably sensing individual items thereof having a predetermined brightness, said sensing means providing an output signal when an item is selected, means to provide reference information signals related to the display location of each item as that item is being displayed, a group of circuits, each circuit providing a signal indicating a different action to be performed with respect to said reference information, manually controllable switch means positioned adjacent said display means for selectively activating one circuit of said group of circuits, and means responsive to said output signal to sense said signals representative of action information and reference information, and to initiate the action specified by said action information.

11. The data processing system as claimed in claim 4 wherein said reference information storage means is adapted to store identifying address information associated with each of said displayed items, and said sensing means is adapted, upon sensing of a displayed item, to gate the address information associated with the selected item from said storage means for entry into said computer.

12. The data processing system as claimed in claim 11 in which said computer includes a buffer storage adapted to receive the entered address information from said storage means and said program of instructions includes a sense instruction which is arranged to cause the computer to periodically sense said buffer storage and upon detection of address information in said buffer storage to alter the program to perform an action relative to the sensed item.

13. The data processing system as claimed in claim 4 wherein said display means includes a cathode ray tube on which said items are displayed in coordinate locations in accordance with address information associated with the current results supplied by said computer, said reference information storage means being adapted to store said address information identifying said displayed items, and said sensing means includes a manipulatable element adapted to be selectively actuated by individual ones of said displayed items, said sensing means upon actuation being adapted to provide a signal for gating the address information associated with the sensed item for entry into said computer.

References Cited in the file of this patent

UNITED STATES PATENTS

| | | |
|---|---|---|
| 2,415,191 | Rajchman | Feb. 4, 1947 |
| 2,537,427 | Seud et al. | June 12, 1951 |
| 2,556,242 | Van Mierlo | June 12, 1951 |
| 2,624,877 | Chance | Jan. 6, 1953 |
| 2,849,707 | White | Aug. 26, 1958 |
| 2,870,369 | Screiber | Jan. 20, 1959 |
| 2,915,643 | Mork | Dec. 1, 1959 |